US011790602B2

(12) United States Patent
Yano et al.

(10) Patent No.: US 11,790,602 B2
(45) Date of Patent: Oct. 17, 2023

(54) INFORMATION PROCESSING DEVICE AND METHOD

(71) Applicant: SONY GROUP CORPORATION, Tokyo (JP)

(72) Inventors: Koji Yano, Tokyo (JP); Tsuyoshi Kato, Kanagawa (JP); Satoru Kuma, Tokyo (JP); Ohji Nakagami, Tokyo (JP); Hiroyuki Yasuda, Saitama (JP)

(73) Assignee: SONY GROUP CORPORATION, Tokyo (JP)

( * ) Notice: Subject to any disclaimer, the term of this patent is extended or adjusted under 35 U.S.C. 154(b) by 0 days.

(21) Appl. No.: 17/632,044

(22) PCT Filed: Jul. 30, 2020

(86) PCT No.: PCT/JP2020/029185
§ 371 (c)(1),
(2) Date: Feb. 1, 2022

(87) PCT Pub. No.: WO2021/029226
PCT Pub. Date: Feb. 18, 2021

(65) Prior Publication Data

US 2022/0277517 A1 Sep. 1, 2022

(30) Foreign Application Priority Data

Aug. 13, 2019 (JP) ................................ 2019-148369

(51) Int. Cl.
*G06T 17/00* (2006.01)
*G06T 7/11* (2017.01)
(Continued)

(52) U.S. Cl.
CPC .............. *G06T 17/005* (2013.01); *G06T 7/11* (2017.01); *G06T 9/40* (2013.01); *G06T 15/08* (2013.01);
(Continued)

(58) Field of Classification Search
CPC ... G06T 15/08; G06T 17/005; G06T 2200/08; G06T 2207/10028; G06T 2207/20021;
(Continued)

(56) References Cited

U.S. PATENT DOCUMENTS 7,574,031 B2 * 8/2009 Dehmeshki ............. G06T 7/155 378/23
2016/0189373 A1 * 6/2016 Park ......................... G06T 7/187 382/131
(Continued)

FOREIGN PATENT DOCUMENTS

WO WO 2019/065297 A1 4/2019

OTHER PUBLICATIONS

Mammou et al., Look ahead cube for efficient neighbours information retrieval in TMC13, International Organisation for Standardisation ISO/IEC JTC1/SC29/WG11 Coding of Moving Pictures and Audio, Jul. 2018, pp. 1-3, Ljubjana, Slovenia.
(Continued)

*Primary Examiner* — Ming Wu
(74) *Attorney, Agent, or Firm* — Paratus Law Group, PLLC

(57) ABSTRACT

The present disclosure relates to an information processing device and method capable of curbing coding efficiency reduction. On the basis of position information indicating positions of points of a point cloud in units of first regions, for each second region composed of a plurality of first regions, a neighboring pattern of each first region including the points is specified by identifying whether or not each neighboring region adjacent to a processing target region includes the points or is positioned outside the second region including the processing target region, a context is selected according to the specified neighboring pattern, and the position information is coded using the selected context. The
(Continued)

present disclosure can be applied to, for example, an information processing device, an image processing device, a coding device, a decoding device, an electronic apparatus, an information processing method, a program, or the like.

20 Claims, 35 Drawing Sheets

(51) Int. Cl.
*G06T 9/40* (2006.01)
*G06T 15/08* (2011.01)

(52) U.S. Cl.
CPC .................... *G06T 2200/08* (2013.01); *G06T 2207/10028* (2013.01); *G06T 2207/20021* (2013.01); *G06T 2210/12* (2013.01); *G06T 2210/56* (2013.01)

(58) Field of Classification Search
CPC ... G06T 2210/12; G06T 2210/56; G06T 7/11; G06T 9/40; G06T 9/001; G06T 9/005
See application file for complete search history.

(56) References Cited

U.S. PATENT DOCUMENTS

| | | | | |
|---|---|---|---|---|
| 2018/0150960 | A1* | 5/2018 | Derda | G06T 7/0012 |
| 2019/0080483 | A1 | 3/2019 | Mammou et al. | |
| 2020/0380726 | A1* | 12/2020 | Graefling | G06T 7/80 |

OTHER PUBLICATIONS

Lasserre et al., [PCC] Neighbour-dependent entropy coding of occupancy patterns in TMC3, International Organisation for Standardisation ISO/IEC JTC1/SC29/WG11 Coding of Moving Pictures and Audio, Jan. 2018, pp. 1-11, Gwangju, Korea.
Mekuria et al., Design, Implementation and Evaluation of a Point Cloud Codec for Tele-Immersive Video, IEEE Transactions on Circuits and Systems for Video Technology, Jan. 2016, pp. 1-14.

* cited by examiner

Fig. 7

| | |
|---|---|
| METHOD 1 | OUTSIDE OF LOOK-AHEAD CUBE IS IDENTIFIED AND NEIGHBORING PATTERN IS REPRESENTED IN TERNARY VALUES IN SPECIFYING OF NEIGHBORING PATTERN FOR CONTEXT DERIVATION |
| METHOD 1-1 | APPLY TO SOME REGIONS |
| METHOD 1-1-1 | APPLY TO ONLY REGION ADJACENT TO BOUNDARY OF LOOK-AHEAD CUBE |
| METHOD 1-1-2 | APPLY TO ONLY REGIONS AT 8 CORNERS OF LOOK-AHEAD CUBE |
| METHOD 1-2 | TRANSMISSION OF CONTROL FLAG |
| METHOD 1-2-1 | TERNARY USE (ON/OFF) FLAG |
| METHOD 1-2-2 | TERNARY PERMISSION (PROHIBITION) FLAG |
| METHOD 1-3 | OUTSIDE OF BOUNDING BOX IS IDENTIFIED |
| METHOD 1-3-1 | NO POINTS ARE ASSUMED |
| METHOD 1-3-2 | NEIGHBORING PATTERN IS REPRESENTED IN QUATERNARY VALUES |

INFORMATION PROCESSING DEVICE AND METHOD

CROSS REFERENCE TO PRIOR APPLICATION

This application is a National Stage Patent Application of PCT International Patent Application No. PCT/JP2020/029185 (filed on Jul. 30, 2020) under 35 U.S.C. § 371 which claims priority to Japanese Patent Application No. 2019-148369 (filed on Aug. 13, 2019), which are all hereby incorporated by reference in their entirety.

TECHNICAL FIELD

The present disclosure relates to an information processing device and method, and particularly, to an information processing device and method capable of curbing reduction in coding efficiency

BACKGROUND ART

A conventional method of coding 3D data representing a three-dimensional structure such as a point cloud, for example, was devised (refer to NPL 1, for example). Point cloud data is composed of geometry data (also called position information) and attribute data (also called attribute information) of each point. Accordingly, coding of the point cloud is separately performed with respect to the geometry data and the attribute data.

As a method of coding geometry data, there is a method of generating an octree using the geometry data and arithmetically coding the octree data. In order to the improve coding efficiency in such arithmetic coding, a method of switching contexts according to a distribution pattern of neighboring points has been conceived (refer to NPL 2, for example).

Further, in order to limit memory usage, a method of performing processing of detecting a distribution pattern of neighboring points for each predetermined region (look-ahead cube) has also been conceived (refer to NPL 3, for example).

CITATION LIST

Non Patent Literature

[NPL 1]
R. Mekuria, Student Member IEEE, K. Blom, P. Cesar., Member, IEEE, "Design, Implementation and Evaluation of a Point Cloud Codec for Tele-Immersive Video", tcsvt_paper_submitted_february.pdf
[NPL 2]
Sebastien Lasserre, David Flynn, "[PCC] Neighbour-dependent entropy coding of occupancy patterns in TMC3", ISO/IEC JTC1/SC29/WG11 MPEG2018/m42238, January 2018, Gwangju, Korea
[NPL 3]
Khaled Mammou, Jungsun Kim, Valery Valentin, Fabrice Robinet, Alexis Tourapis, Yeping Su, "Look ahead cube for efficient neighbours information retrieval in TMC13", ISO/IEC JTC1/SC29/WG11 MPEG2018/m43591, July 2018, Ljubjana, Slovenia

SUMMARY

Technical Problem

However, in the case of the method described in NPL 3, since points outside the look-ahead cube are handled as if they do not exist when a distribution pattern of neighboring points is detected, an appropriate context cannot be selected when the points actually exist, and thus there is a risk of reducing coding efficiency.

In view of such situations, the present disclosure can curb coding efficiency reduction.

Solution to Problem

An information processing device of one aspect of the present technology is an information processing device including: on the basis of position information representing positions of points of a point cloud that represents an object in a three-dimensional shape as a set of points in units of first regions that are three-dimensional regions that divide an entire area corresponding to a three-dimensional area including the object into a plurality of regions, for each second region that is a three-dimensional region composed of a plurality of the first regions, a neighboring pattern specifying unit that identifies whether or not each neighboring region that is the first region adjacent to a processing target region that is the first region to be processed includes points or is positioned outside the second region including the processing target region and specifies a neighboring pattern that is a pattern of an identification result of each neighboring region, for each of the first regions including the points; a context selection unit that selects a context according to the neighboring pattern specified by the neighboring pattern specifying unit with respect to each of the first regions including the points; and a coding unit that codes the position information for each of the first regions using the context selected by the context selection unit to generate coded data of the position information.

An information processing method of one aspect of the present technology is an information processing method including: on the basis of position information representing positions of points of a point cloud that represents an object in a three-dimensional shape as a set of points in units of first regions that are three-dimensional regions that divide an entire area corresponding to a three-dimensional area including the object into a plurality of regions, for each second region that is a three-dimensional region composed of a plurality of the first regions, identifying whether or not each neighboring region that is the first region adjacent to a processing target region that is the first region to be processed includes points or is positioned outside the second region including the processing target region and specifying a neighboring pattern that is a pattern of an identification result of each neighboring region, for each of the first regions including the points; selecting a context according to the specified neighboring pattern with respect to each of the first regions including the points; and coding the position information for each of the first regions using the selected context to generate coded data of the position information.

An information processing device of another aspect of the present technology is an information processing device including: on the basis of a decoding result of coded data of position information representing positions of points of a point cloud that represents an object in a three-dimensional shape as a set of points in units of first regions that are three-dimensional regions that divide an entire area corresponding to a three-dimensional area including the object into a plurality of regions, for each second region that is a three-dimensional region composed of a plurality of the first regions, a neighboring pattern specifying unit that identifies whether or not each neighboring region that is the first region adjacent to a processing target region that is the first region to be processed includes points or is positioned outside the second region including the processing target region and specifies a neighboring pattern that is a pattern of an identification result of each neighboring region, for each of the first regions including the points; a context selection unit that selects a context according to the neighboring pattern specified by the neighboring pattern specifying unit with respect to each of the first regions including the points; and a decoding unit that decodes the coded data using the context selected by the context selection unit to generate the position information.

An information processing method of another aspect of the present technology is an information processing method including: on the basis of a decoding result of coded data of position information representing positions of points of a point cloud that represents an object in a three-dimensional shape as a set of points in units of first regions that are three-dimensional regions that divide an entire area corresponding to a three-dimensional area including the object into a plurality of regions, for each second region that is a three-dimensional region composed of a plurality of first regions, identifying whether or not each neighboring region that is the first region adjacent to a processing target region that is the first region to be processed includes points or is positioned outside the second region including the processing target region and specifying a neighboring pattern that is a pattern of an identification result of each neighboring region, for each of the first regions including the points; selecting a context according to the specified neighboring pattern with respect to each first region including the points; and decoding the coded data using the selected context to generate the position information.

In the information processing device and method of one aspect of the present technology, on the basis of position information representing positions of points of a point cloud that represents an object in a three-dimensional shape as a set of points in units of first regions that are three-dimensional regions that divide an entire area corresponding to a three-dimensional area including the object into a plurality of regions, for each second region that is a three-dimensional region composed of a plurality of first regions, it is identified whether or not each neighboring region that is a first region adjacent to a processing target region that is a first region to be processed includes points or is positioned outside a second region including the processing target region and a neighboring pattern that is a pattern of an identification result of each neighboring region is specified for each of the first regions including points, a context according to the specified neighboring pattern is selected with respect to each first region including points, and the position information is coded for each of the first regions using the selected context to generate coded data of the position information.

In the information processing device and method of another aspect of the present technology, on the basis of a decoding result of coded data of position information representing positions of points of a point cloud that represents an object in a three-dimensional shape as a set of points in units of first regions that are three-dimensional regions that divide an entire area corresponding to a three-dimensional area including the object into a plurality of regions, for each second region that is a three-dimensional region composed of a plurality of first regions, it is identified whether or not each neighboring region that is a first region adjacent to a processing target region that is a first region to be processed includes points or is positioned outside a second region including the processing target region and a neighboring pattern that is a pattern of an identification result of each neighboring region is specified for each first region including points, a context according to the specified neighboring pattern is selected with respect to each first region including points, and the coded data is decoded using the selected context to generate the position information.

BRIEF DESCRIPTION OF DRAWINGS

FIG. 7 is a diagram for describing an example of a method to which the present technology is applied.

DESCRIPTION OF EMBODIMENTS

Hereinafter, modes for carrying out the present disclosure (hereinafter referred to as embodiments) will be described. The description will be made in the following order.

1. Ternary representation of neighboring patterns
2. First embodiment (coding device)
3. Second embodiment (decoding device)
4. Third embodiment (modified examples)
5. Supplement

1. Ternary Representation of Neighboring Patterns

Literature and the Like Supporting Technical Details and Technical Terms

The scope disclosed in the present technology includes not only details described in embodiments but also details described in the following NPL known at the time of filing the application.

NPL 1: (Aforementioned)
NPL 2: (Aforementioned)
NPL 3: (Aforementioned)

That is, details described in the aforementioned NPL are also grounds for determination of support requirements.

<Point Cloud>

Conventionally, there are 3D data such as a point cloud representing a three-dimensional structure according to position information, attribute information, and the like of a point group, and a mesh composed of vertexes, edges, and surfaces and defining a three-dimensional shape using polygon representation.

For example, in the case of a point cloud, a three-dimensional structure (an object in a three-dimensional shape) may be represented as a set of a plurality of points (point group). That is, data of the point cloud (also referred to as point cloud data) is composed of geometry data (also referred to as position information) and attribute data (also referred to as attribute information) of each point of the point group. Attribute data can include arbitrary information. For example, color information, reflectance information, normal line information, and the like may be included in attribute data. Accordingly, a data structure is relatively simple and an arbitrary three-dimensional structure can be represented with sufficient accuracy using a sufficiently large number of points.

<Coding of Geometry Data>

Since the amount of such point cloud data is relatively large, compression of the amount of data by coding or the like was conceived. In such a case, geometry data and attribute data are respectively coded. The geometry data is coded as follows, for example.

Figure 1:
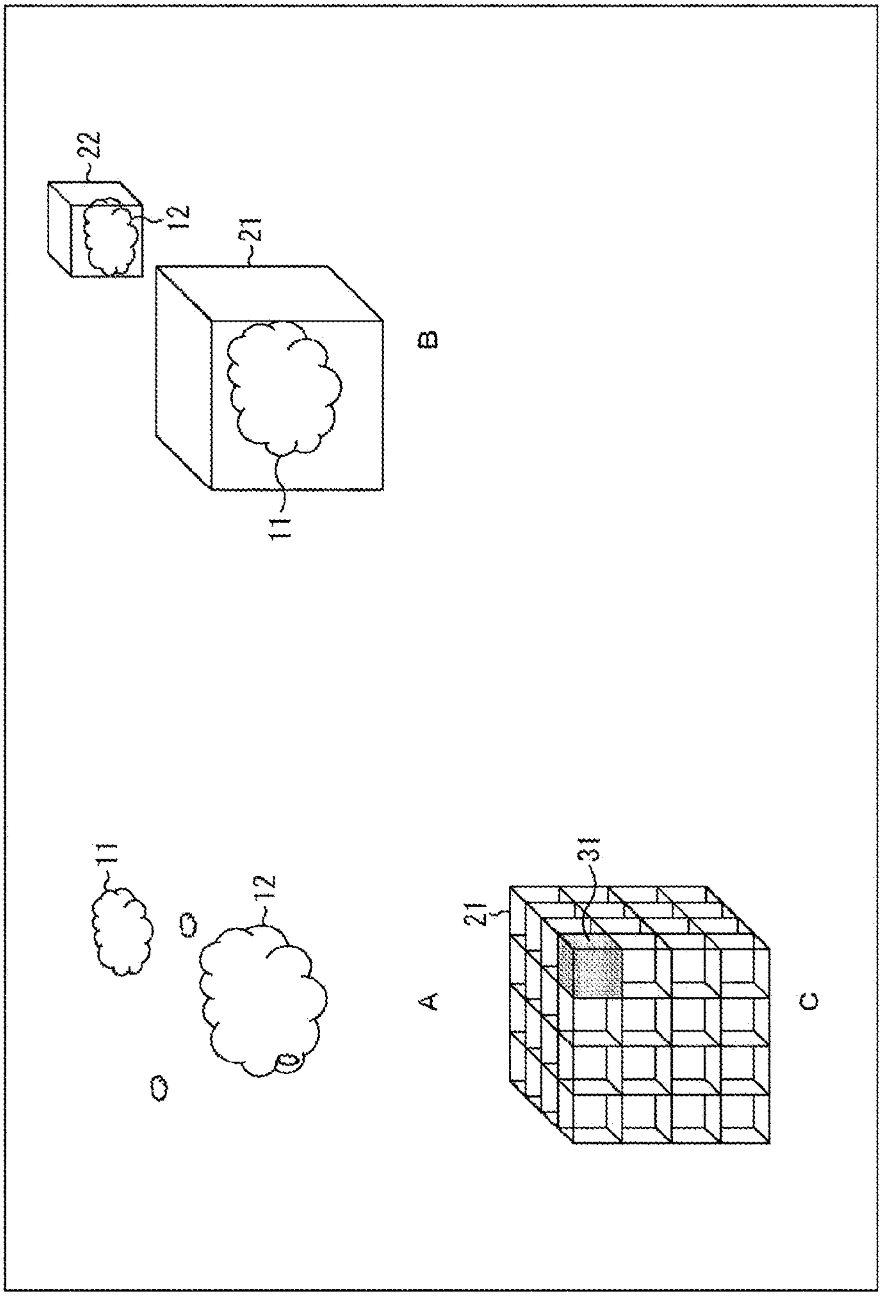
FIG. 1 is a diagram for describing an outline of a geometry data coding procedure.

First, a three-dimensional area (also called a bounding box) including an object represented by a point cloud is set. For example, it is assumed that geometry data of point clouds representing an object 11 and an object 12 shown in A of FIG. 1 is coded. In this case, a bounding box 21 including the object 11 and a bounding box 22 including the object 12 are set, as shown in B of FIG. 1.

Next, the point cloud data is voxelized. That is, each bounding box is divided into a plurality of three-dimensional regions (also referred to as voxels), and presence or absence of points in the point cloud is indicated for each voxel. For example, the bounding box 21 (B of FIG. 1) is divided as shown in C of FIG. 1 and thus a plurality of voxels 31 are set. That is, the position of each point is indicated for each voxel. That is, the geometry data (the position of each point) is quantized by voxelization. Therefore, it is possible to curb an increase in the amount of information (typically, reduce the amount of information).

Setting of voxels (dividing a bounding box) is hierarchically performed. For example, a voxel 31 including points set in a certain layer is divided into eight (divided into two in each of directions of up, down, left, right, front and back) as shown in A of FIG. 2 and thus voxels one layer under the certain layer are set. Then, whether points are included is indicated for each voxel. Then, the same processing is recursively repeated for each voxel including points. In the case of the example of A of FIG. 2, a voxel 41 and a voxel 42 include points, these voxels are further divided into eight, and presence or absence of points is indicated for each voxel.

One voxel indicating the same three-dimensional region as a bounding box is set first, and recursive processing as described above is repeated up to a highest resolution to form a hierarchical voxel structure.

By hierarchizing and coding geometry data in this manner, it is possible to cope with scalable decoding.

<Octree>

Next, the geometry data that has been voxelized as described above is converted into data in a tree structure (for example, octree). An octree is data of an octa-tree structure. As shown in A of FIG. 2, since the hierarchical structure of voxels also has an octa-tree structure, each node of the octree corresponds to a voxel and presence or absence of points can be indicated by the value ("0" or "1") thereof. An example of modeling octree data is shown in B of FIG. 2. As shown in B of FIG. 2, a hierarchical structure is constructed by forming child nodes for a node having a value of "1", which is a node representing a voxel having points, as in the case of a voxel.

By performing coding using such an octree, it is possible to curb an increase in a code amount (typically reduce a code amount).

<Context Switch>

An octree is coded by arithmetic coding using a context such as context-based adaptive binary arithmetic code (CABAC). NPL 2 proposes a method of switching contexts according to a distribution pattern of neighboring points.

A neighboring distribution pattern is detected (specified) for each predetermined three-dimensional region called a cube. The cube may be of any size and shape. Since the above-mentioned voxel is a unit indicating presence or absence of a point and also a processing unit for coding, processing becomes simple by using this voxel as a cube. In the following, a voxel will be described as a cube for convenience of explanation.

Figure 3:
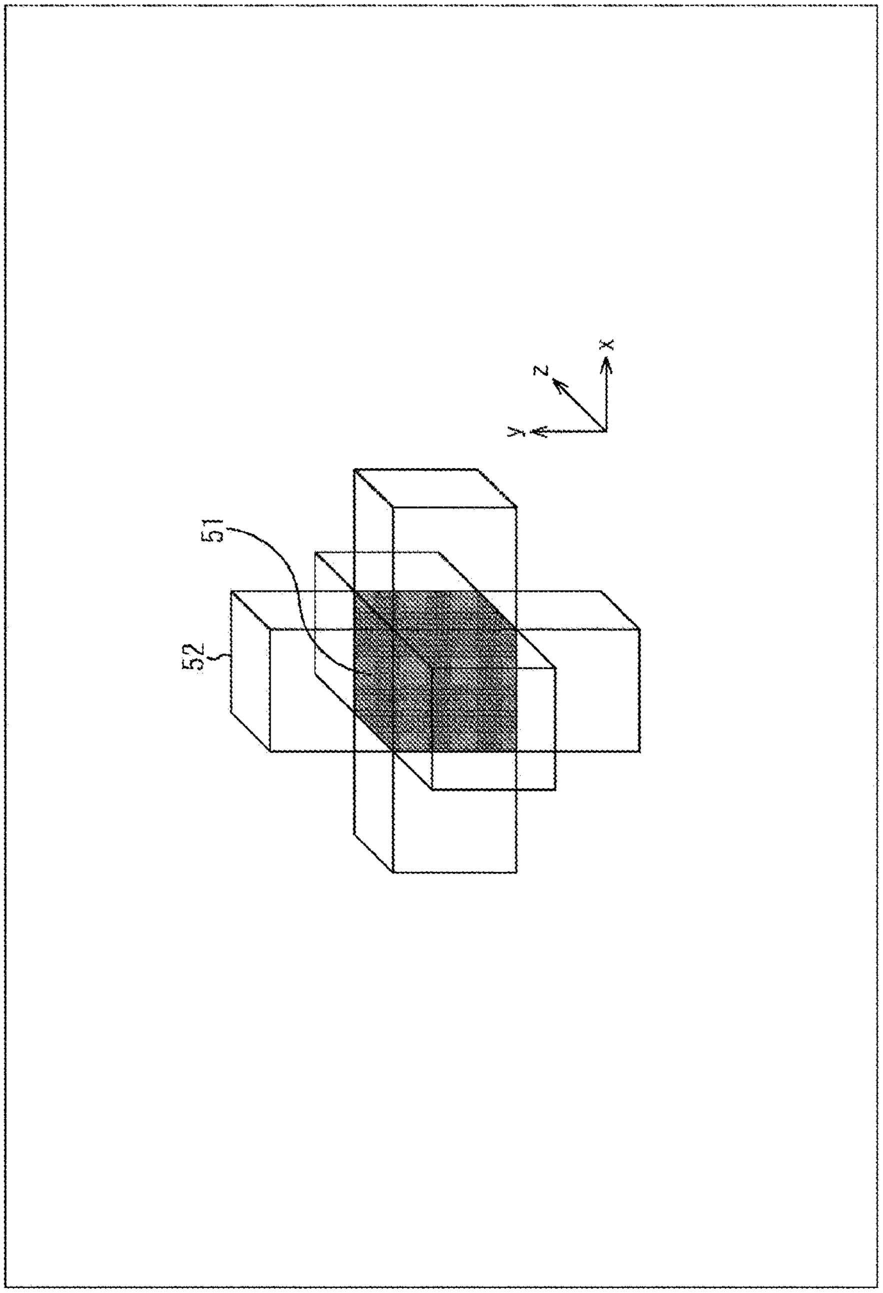
FIG. 3 is a diagram for describing a method of switching contexts of arithmetic coding.

For example, as shown in FIG. 3, voxels 52 adjacent to each of the top, bottom, left, right, front, and rear faces of a voxel 51 to be processed are set as neighboring voxels. Then, contexts are switched according to presence or absence of points of each voxel 52. That is, a context is prepared in advance for each pattern (pattern with or without points of each voxel 52) that becomes a model of a distribution of neighboring points, it is determined whether the pattern of a distribution of points around the voxel 51 to be processed corresponds to any of the model patterns, and a context associated with that pattern is applied to arithmetic coding of the voxel 51 to be processed. Therefore, the same context is set for voxels having the same distribution pattern.

Figure 4:
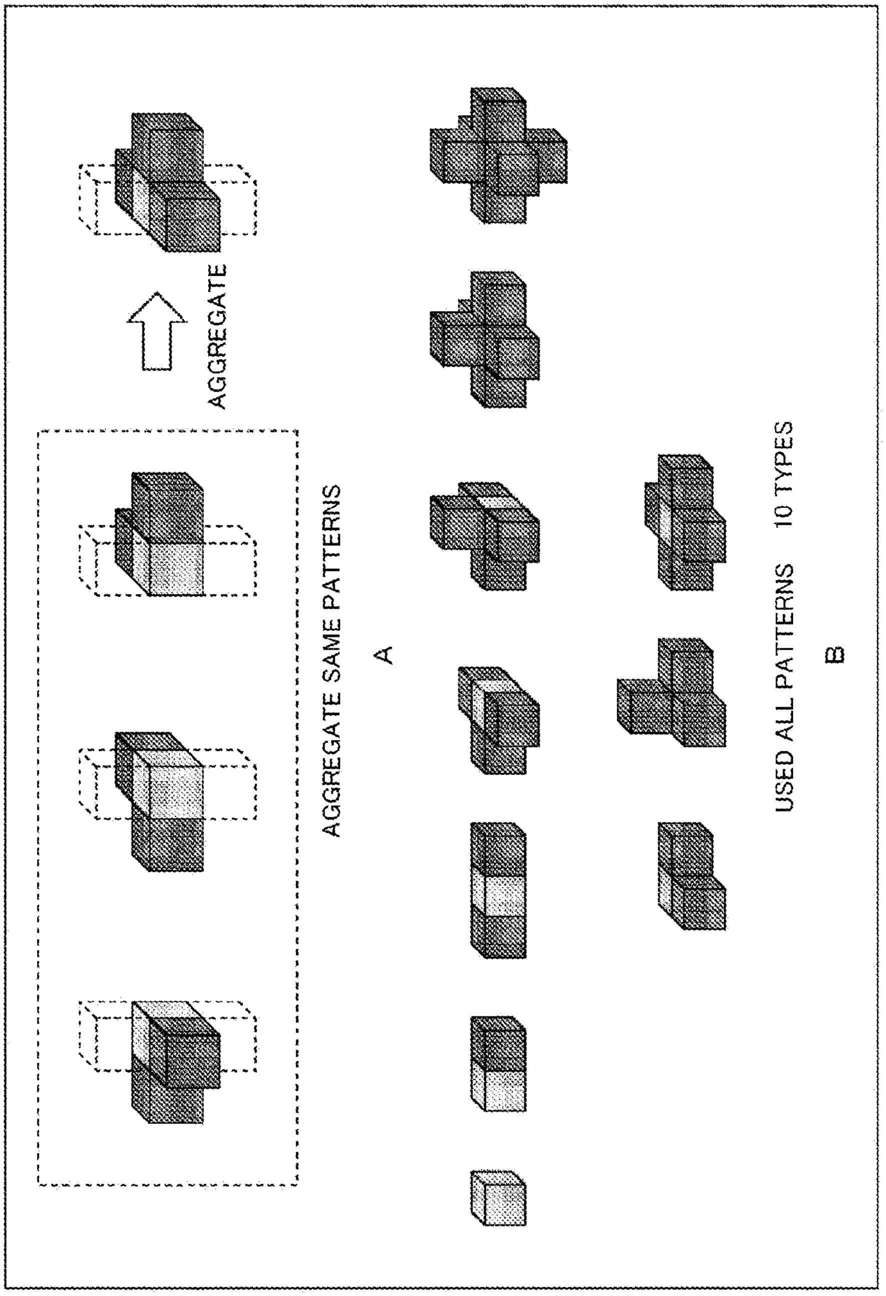
FIG. 4 is a diagram for describing the method of switching contexts of arithmetic coding.

The model pattern has the same patterns aggregated without considering directions, as in an example shown in A of FIG. 4. That is, distribution patterns are classified into 10 patterns shown in B of FIG. 4. Different contexts are associated with these 10 patterns, and the contexts corresponding to the classified patterns are applied to arithmetic coding of the voxel 51 to be processed.

By doing so, it is possible to curb coding efficiency reduction (typically, improve coding efficiency).

<Look-Ahead Cube>

However, in order to detect (specify) a distribution pattern of neighboring points as described above, information on each voxel is required, which may increase a processing load.

Figure 5:
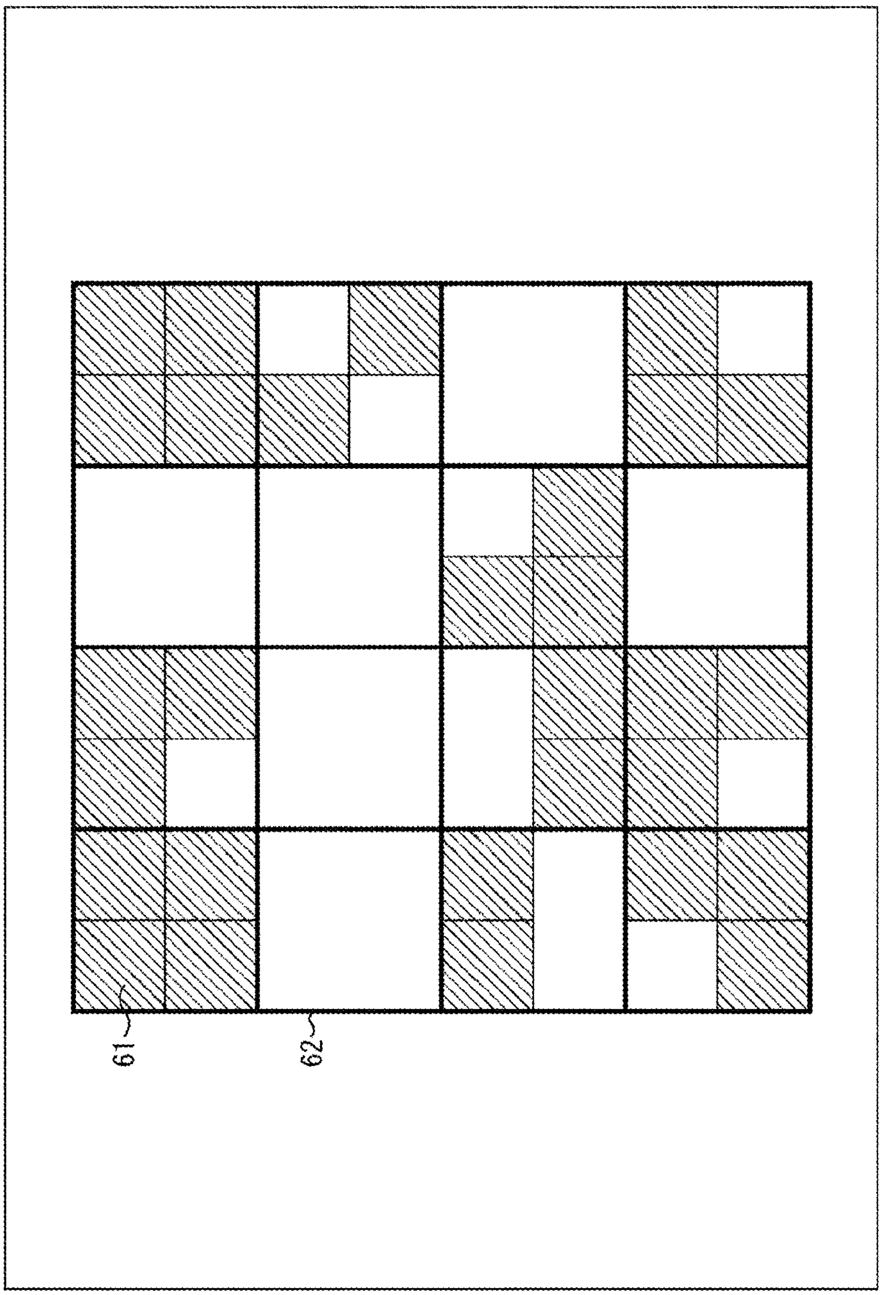
FIG. 5 is a diagram for describing a method of using a look-ahead cube.

Accordingly, NPL 3 proposes a method of performing the aforementioned processing on each predetermined partial region (look-ahead cube). That is, in the case of this method, a partial region (look-ahead cube) that divides a bounding box into a plurality of parts is set. In other words, as shown in FIG. 5, a look-ahead cube 62 composed of a plurality of voxels 61 is set. For each look-ahead cube 62, a distribution pattern of points around each voxel 61 is detected (specified).

By doing so, maximum memory usage for detecting (specifying) a distribution pattern is limited, and thus an increase in load can be curbed.

Although the geometry data is represented in two dimensions in FIG. 5 for convenience of description, the voxels 61 and the look-ahead cube 62 actually have a three-dimensional structure. Further, in FIG. 5, voxels 61 represented as shaded patterns indicate voxels including points and white voxels 61 indicate voxels that do not include points. Although the look-ahead cube 62 is composed of 2×2 (actually 2×2×2) voxels 61 in FIG. 5, the shape and size of the look-ahead cube 62 are arbitrary. For example, the look-ahead cube 62 may be composed of 512×512×512 voxels 61, 256×256×256 voxels 61, or 128×128×128 voxels 61, or may have any other size. Further, the numbers of voxels in respective directions of the look-ahead cube 62 may not be equal.

However, in the case of this method, points outside a look-ahead cube are handled as if they do not exist at the time of detecting a distribution pattern of neighboring points. Accordingly, even if points actually exist, there is a risk that they will be classified as a pattern in which points do not exist. Therefore, an appropriate context cannot be selected, which may reduce coding efficiency.

Figure 6:
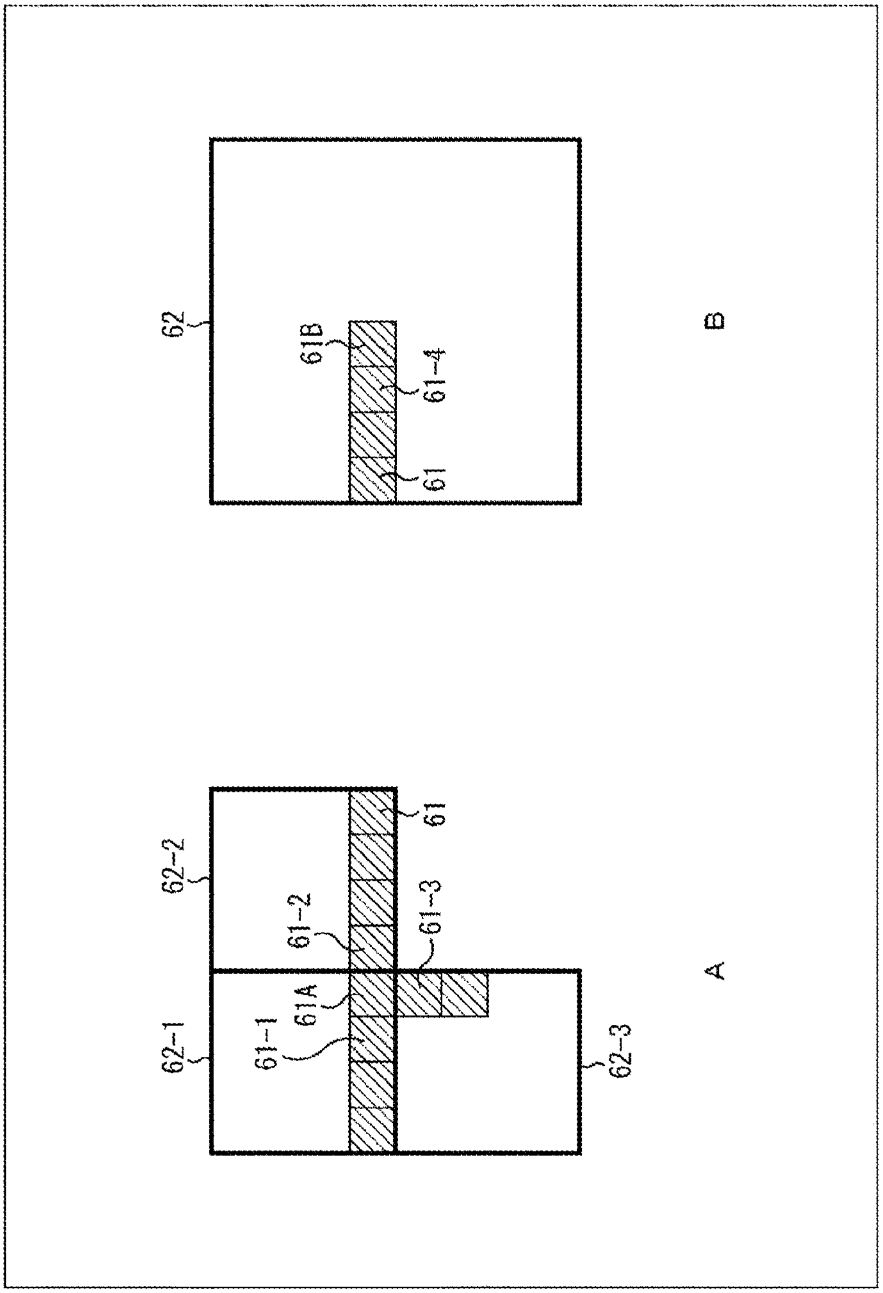
FIG. 6 is a diagram for describing the method of using a look-ahead cube.

For example, as shown in A of FIG. 6, it is assumed that voxels 61 (shaded squares) including points exist in look-ahead cubes 62-1 to 62-3, as shown in the figure. In FIG. 6, geometry data is represented in two dimensions as in the case of FIG. 5 for convenience of description.

In this case, among voxels around a voxel 61A positioned in the look-ahead cube 62-1, voxels 61-1 to 61-3 include points. The voxel 61-1 is adjacent to the left of the voxel 61A in the figure and is positioned in the same look-ahead cube 62-1. The voxel 61-2 is adjacent to the right of the voxel 61A in the figure and is positioned in the look-ahead cube 62-2. Further, the voxel 61-3 is adjacent to the bottom of the voxel 61A in the figure and is positioned in the look-ahead cube 62-3.

However, since the voxels 61-2 and voxels 61-3 are positioned outside the look-ahead cube 62-1, they are handled as if they do not include points. That is, as a distribution pattern of points around the voxel 61A, a pattern in which points exist only in the voxel 61 adjacent to the left in the figure is selected.

On the other hand, in the case of an example of B of FIG. 6, four voxels 61 (shaded squares) including points exist in the look-ahead cube 62 as shown in the figure. Among voxels around a voxel 61B, a voxel 61-4 includes points. The voxel 61-4 is adjacent to the left of the voxel 61B in the figure and is positioned in the same look-ahead cube 62. That is, as a distribution pattern of points around the voxel 61B, a pattern in which points exist only in the voxel 61 adjacent to the left in the figure is selected.

That is, the same context is applied to the voxel 61A of A of FIG. 6 and the voxel 61B of B of FIG. 6. However, as shown in FIG. 6, distribution patterns of points around the voxels 61A and 61B when the look-ahead cube 62 is not considered are different from each other. In this manner, an appropriate context cannot be selected, which may reduce coding efficiency.

<Ternary Representation of Neighboring Patterns>

Therefore, not only presence or absence of points but also positioning of neighboring voxels outside a look-ahead cube in which a voxel to be processed exists is identified. That is, as in "method 1" shown in the uppermost row of a table shown in FIG. 7, neighboring patterns are represented by ternary values in detecting (specifying) distribution patterns of neighboring points (also called neighboring patterns) for context derivation used for arithmetic coding of such geometry data.

That is, on the basis of position information representing positions of points of a point cloud that represents an object in a three-dimensional shape as a set of points in units of first regions that are three-dimensional regions that divide an entire area corresponding to a three-dimensional area including the object into a plurality of regions, for each second region that is a three-dimensional region composed of a plurality of first regions, it is identified whether or not each neighboring region that is a first region adjacent to a processing target region that is a first region to be processed includes points or is positioned outside a second region including the processing target region, and a neighboring pattern that is a pattern of an identification result of each neighboring region is specified for each first region including points, a context according to the specified neighboring pattern is selected with respect to each first region including points, and the position information is coded for each first region using the selected context to generate coded data of the position information.

For example, an information processing device includes, on the basis of position information representing positions of points of a point cloud that represents an object in a three-dimensional shape as a set of points in units of first regions that are three-dimensional regions that divide an entire area corresponding to a three-dimensional area including the object into a plurality of regions, for each second region that is a three-dimensional region composed of a plurality of first regions, a neighboring pattern specifying unit that identifies whether or not each neighboring region that is a first region adjacent to a processing target region that is a first region to be processed includes points or is positioned outside a second region including the processing target region and specifies a neighboring pattern that is a pattern of an identification result of each neighboring region for each first region including points, a context selection unit that selects a context according to the neighboring pattern specified by the neighboring pattern specifying unit with respect to each first region including points, and a coding unit that codes the position information for each first region using the context selected by the context selection unit to generate coded data of the position information.

In the case of the example of FIG. 6, the bounding box is set as an entire area, a voxel is set as the first region (processing target region, neighboring region), the look-ahead cube 62 is set as the second region, and neighboring patterns are specified. In that case, it is identified whether or not each voxel around the voxel 61A includes points or is positioned outside the look-ahead cube 62-1 including the voxel 61A. Then, neighboring patterns of the voxel 61A are represented by ternary values using the identification result, as in an example of FIG. 8.

Figure 8:
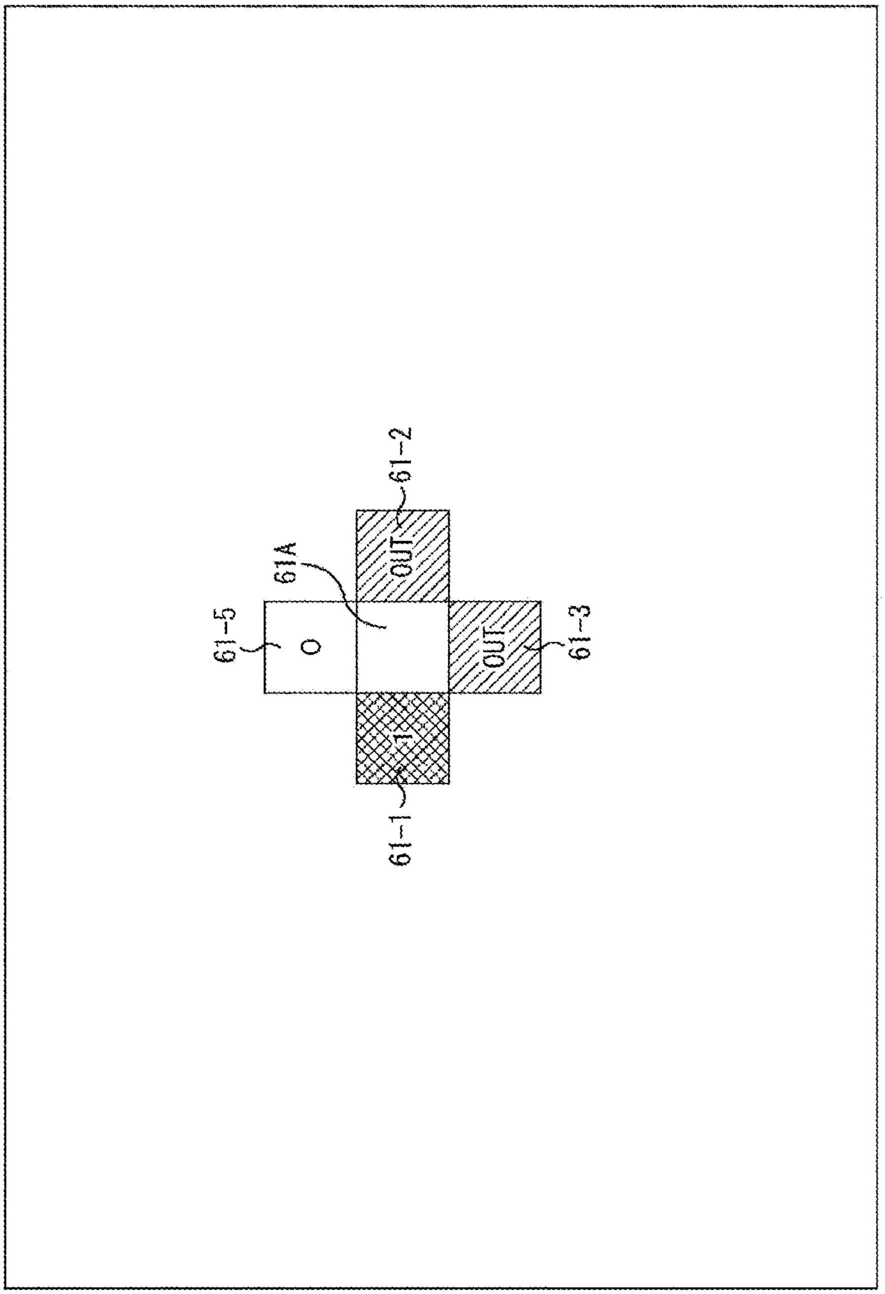
FIG. 8 is a diagram showing an example of neighboring patterns represented by ternary representation.

In the case of FIG. 8, since the voxel 61-1 adjacent to the left of the voxel 61A to be processed in the figure includes points, a value (for example, "1") indicating that fact is set. Further, since the voxel 61-5 adjacent to the top of the voxel 61A to be processed in the figure do not include points, a value (for example, "0") indicating that fact is set.

On the other hand, since the voxel 61-2 adjacent to the right of the voxel 61A to be processed in the figure is positioned in the look-ahead cube 62-2, that is, outside the look-ahead cube 62-1, a value "OUT" (for example, "2") indicating that fact is set. Similarly, since the voxel 61-3 adjacent to the bottom of the voxel 61A to be processed in the figure is positioned in the look-ahead cube 62-3, that is, outside the look-ahead cube 62-1, a value "OUT" (for example, "2") indicating that fact is set.

By representing neighboring patterns by ternary values in this manner, it is possible to represent, for example, a difference between neighboring patterns of the voxel 61A and the voxel 61B. For example, in the case of the voxel 61B, a value (for example, "0") indicating that points are not included is set for the voxel adjacent to the right in the figure and the voxel adjacent to the bottom in the figure.

It is determined which of model patterns corresponds to neighboring patterns represented by ternary values specified (detected) as described above as in the case of neighboring patterns represented by binary values described in NPL 2 and NPL 3, and a context associated with the model pattern in advance is applied as a context of a processing target region corresponding to the neighboring patterns.

Accordingly, different contexts can be applied to the voxel 61A and the voxel 61B. That is, since a context more suitable for actual neighboring patterns can be applied, it is possible to curb coding efficiency reduction (typically, improve coding efficiency).

Although voxels and the like are represented in two dimensions for convenience of description in FIG. 8 as in FIG. 6 and the like, a three-dimensional region is used as a processing target region and a neighboring region as in the case of FIG. 3 in reality Further, values corresponding to states of neighboring patterns are arbitrary as long as they can be distinguished from each other and are not limited to the above example.

In the case of ternary representation, there are $3^6=729$ types of model patterns. However, these model patterns may be aggregated as in the case of binary representation. An aggregation method is arbitrary. For example, model patterns may be aggregated without considering the directions thereof. Further, a value indicating positioning outside the look-ahead cube 62-1, for example, cannot be set for two neighboring regions opposite each other with a processing target region positioned therebetween. Patterns may be aggregated on the basis of such predetermined constraints. By aggregating model patterns, it is possible to curb an increase in memory usage.

Moreover, the shape and size of the first region are arbitrary. For example, as in the above-described example of voxels, the first region may be a rectangle (rectangular parallelepiped or cube) and a neighboring region may be a first region adjacent to six faces (top, bottom, left, right, front, and back faces) of a processing target region (first region to be processed) as in the case of FIG. 3. By doing so, a positional relationship between first regions can be simplified and a positional relationship between the neighboring region and the processing target region can be ascertained more easily, and thus neighboring patterns can be specified more easily.

Further, geometry data may be hierarchized as in the above-described examples. That is, geometry data may have a tree structure, and neighboring patterns in ternary representation may be specified for each layer of the tree structure as described above. By doing so, it is possible to cope with scalable decoding (realize scalable decoding).

Further, the tree structure may be an octree described above. That is, coded geometry data may be voxelized into an octree as described above. In such a case, a bounding box may be an entire area and voxels may be first regions. That is, in cases where context switching described in NPL 2 or a look-ahead cube described in NPL 3 is applied, the present technology may be applied and neighboring patterns may be represented by ternary values. By doing so, it is possible to curb a decrease in coding efficiency (typically, improve coding efficiency) while curbing an increase in processing load.

Meanwhile, decoding is also able to cope with neighboring patterns in ternary representation (that is, "method 1" shown in the uppermost row of the table shown in FIG. 7).

That is, on the basis of a decoding result of coded data of position information representing positions of points of a point cloud that represents an object in a three-dimensional shape as a set of points in units of first regions that are three-dimensional regions that divide an entire area corresponding to a three-dimensional area including the object into a plurality of regions, for each second region that is a three-dimensional region composed of a plurality of first regions, it is identified whether or not each neighboring region that is a first region adjacent to a processing target region that is a first region to be processed includes points or is positioned outside a second region including the processing target region, and a neighboring pattern that is a pattern of an identification result of each neighboring region is specified for each first region including points, a context according to the specified neighboring pattern is selected with respect to each first region including points, and the coded data is decoded using the selected context to generate the position information.

For example, an information processing device includes, on the basis of a decoding result of coded data of position information representing positions of points of a point cloud that represents an object in a three-dimensional shape as a set of points in units of first regions that are three-dimensional regions that divide an entire area corresponding to a three-dimensional area including the object into a plurality of regions, for each second region that is a three-dimensional region composed of a plurality of first regions, a neighboring pattern specifying unit that identifies whether or not each neighboring region that is a first region adjacent to a processing target region that is a first region to be processed includes points or is positioned outside a second region including the processing target region and specifies a neighboring pattern that is a pattern of an identification result of each neighboring region for each first region including points, a context selection unit that selects a context according to the neighboring pattern specified by the neighboring pattern specifying unit with respect to each first region including points, and a decoding unit that decodes the coded data using the context selected by the context selection unit to generate the position information.

As in the case of coding, it is possible to apply a context as in the case of coding by specifying neighboring patterns by ternary representation as shown in FIG. 8 and arithmetically decoding coded data by applying a context corresponding to the neighboring patterns. Accordingly, it is possible to correctly decode data coded by applying the present technology. That is, it is possible to curb coding efficiency reduction (typically, improve coding efficiency).

Meanwhile, a value corresponding to each state of a neighboring pattern is arbitrary as long as it is the same as in the case of coding and is not limited to the above example.

Further, the shape and size of the first region are arbitrary as long as they are the same as in the case of coding. As in the above-described example of voxels, the first region may be a rectangle and a neighboring region may be a first region adjacent to six faces of a processing target region. By doing so, a positional relationship between the neighboring region and the processing target region can be ascertained more easily, and thus neighboring patterns can be specified more easily.

Further, coded geometry data may have a hierarchical structure, and a tree structure of the decoded geometry data may be constructed on the basis of the hierarchical structure. In such a case, neighboring patterns in ternary representation may be specified for each layer of the tree structure as described above. By doing so, it is possible to obtain geometry data of an arbitrary layer (resolution) without decoding the entire geometry data. That is, the geometry data can be decoded in a scalable manner.

Further, the tree structure may be an octree described above. That is, an octree may be constructed from decoded geometry data. In such a case, a bounding box may be an entire area and voxels may be first regions. That is, in cases where context switching described in NPL 2 or a look-ahead cube described in NPL 3 is applied, the present technology may be applied and neighboring patterns may be represented by ternary values. By doing so, it is possible to curb a decrease in coding efficiency (typically, improve coding efficiency) while curbing an increase in processing load.

<Partial Application of Ternary Representation>

As in the case of "method 1-1" shown in the second row from the top of the table shown in FIG. 7, "method 1" as described above may be applied to some regions.

In general, the number of patterns associated with contexts is greater in a case where neighboring patterns in ternary representation are specified by applying "method 1" than in a case where neighboring patterns in binary representation are specified as described in NPL 2 and NPL 3, and thus a memory use amount increases to that extent. Accordingly, "method 1" may be applied only to a more effective region (a region in which an increase in coding efficiency can be curbed more). By doing so, it is possible to curb an increase in unnecessary memory usage and curb an increase in processing load.

<Applying to Boundary Adjacency>

For example, as in "method 1-1-1" shown in the third row from the top of the table shown in FIG. 7, "method 1" as described above may be applied only to a region adjacent to the boundary of a look-ahead cube.

That is, when a processing target region is a first region adjacent to the boundary of a second region, whether or not each neighboring region includes points or is positioned outside a second region including the processing target region may be identified to specify neighboring patterns, and when the processing target region is a first region that is not adjacent to the boundary of the second region, whether or not each neighboring region includes points may be identified to specify neighboring patterns.

For example, as in the case of FIG. 6, neighboring patterns are specified on the assumption that the bounding box is an entire area, voxels are first regions, and look-ahead cubes are second regions. In such a case, as shown in A of FIG. 9, "method 1" is applied only to voxels 61C (shaded regions in the figure) adjacent to the boundary of the look-ahead cube 62 and neighboring patterns are specified by ternary representation. For other voxels 61 (regions represented by white squares in the figure), neighboring patterns are specified by binary representation indicating whether or not points are included, as described in NPL 2 and NPL 3.

Figure 9:
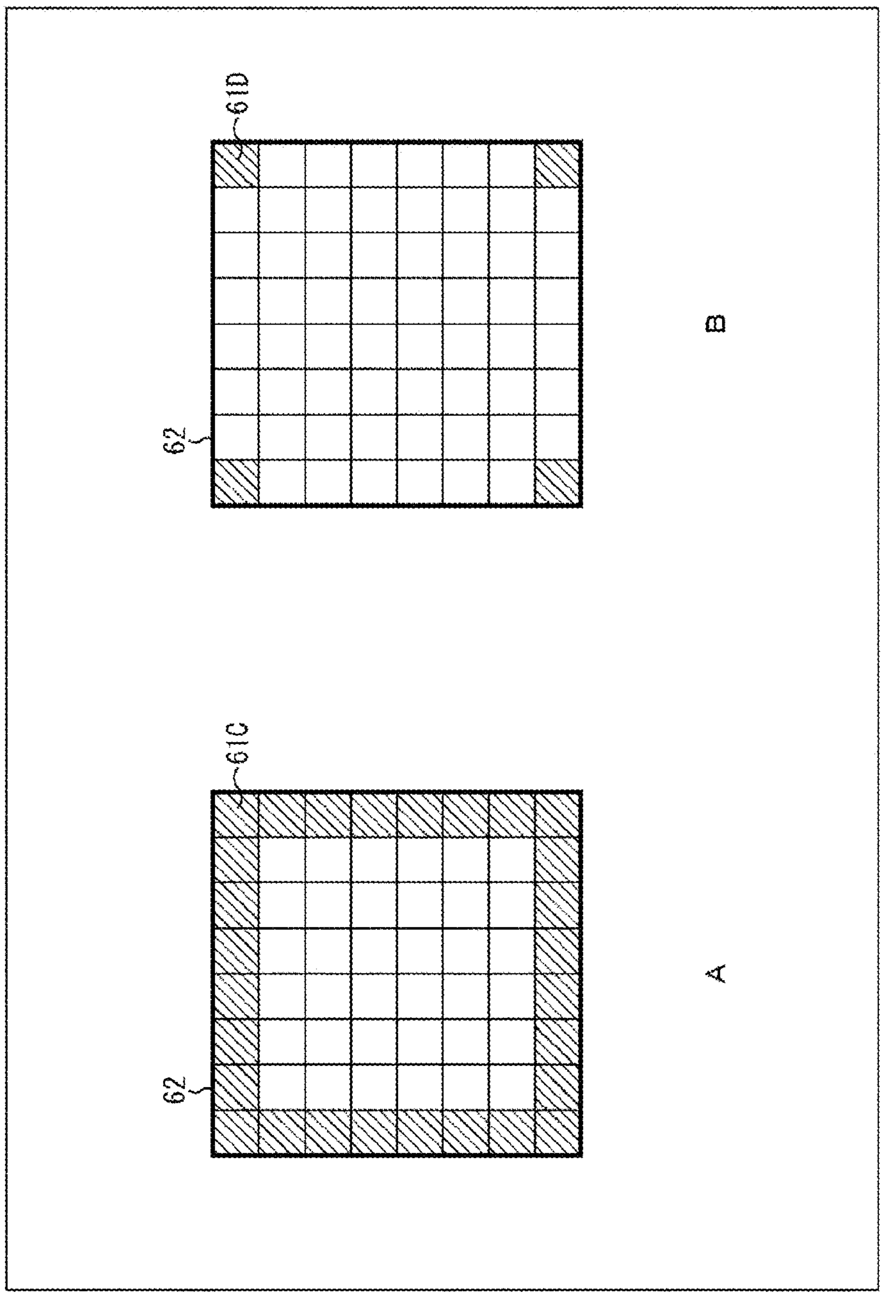
FIG. 9 is a diagram showing an example of an area to which the present technology is applied within a look-ahead cube.

Although the look-ahead cube 62 and the voxels 61 are represented in two dimensions for convenience of description in FIG. 9, they have a three-dimensional structure as in the case of FIG. 6 and the like. That is, neighboring patterns are specified by ternary representation for voxels adjacent to the respective faces (six faces) of the look-ahead cube 62 and neighboring patterns are specified by binary representation for voxels that are not adjacent to the faces.

In a voxel 61 that is not adjacent to the boundary of the look-ahead cube 62, there is no possibility that neighboring voxels are positioned outside the look-ahead cube 62. That is, a binary pattern is sufficient for these voxels 61. Therefore, it is possible to curb an increases in memory usage by specifying neighboring patterns by binary representation for voxels that are not adjacent to the boundary of the look-ahead cube 62.

The position of each voxel can be specified from its hierarchical structure and the like. That is, the position of a voxel to be processed (position in a look-ahead cube) can be easily specified on the basis of geometry data, a processing order, and the like. Accordingly, it is possible to easily specify whether or not the voxel to be processed is adjacent to the boundary of the look-ahead cube.

<Applying to Eight Corners>

Further, as in "method 1-1-2" shown in the fourth row from the top of the table shown in FIG. 7, for example, "method 1" as described above may be applied only to regions of eight corners of a look-ahead cube (regions adjacent to the corners of the look-ahead cube).

That is, when a processing target region is a first region adjacent to a corner of a second region, whether or not each neighboring region includes point or is positioned outside a second region including the processing target region is identified to specify neighboring patterns, and when the processing target region is a first region that is not adjacent to a corner of the second region, whether or not each neighboring region includes points is identified to specify neighboring patterns.

For example, as in the case of FIG. 6, neighboring patterns are specified on the assumption that the bounding box is an entire area, voxels are first regions, and look-ahead cubes are second regions. In such a case, as shown in B of FIG. 9, "method 1" is applied only to voxels 61D (shaded regions in the figure) adjacent to the corner of the look-ahead cube 62, and neighboring patterns are represented by ternary representation. For other voxels 61 (regions represented as white squares in the figure), neighboring patterns are specified by binary representation indicating whether or not points are included, as described in NPL 2 and NPL 3.

Although the look-ahead cube 62 and the voxels 61 are represented in two dimensions for convenience of description in FIG. 9, they have a three-dimensional structure as in the case of FIG. 6 and the like. That is, neighboring patterns are specified by ternary representation for voxels adjacent to the corners of the look-ahead cube 62 (voxels at the eight corners) and neighboring patterns are specified by binary representation for voxels that are not adjacent to the corners.

Among voxels adjacent to the corners, the number of adjacent voxels positioned outside the look-ahead cube 62 is the largest. That is, when the method described in NPL 2 or NPL 3 is applied to specify neighboring patterns by binary representation, the coding efficiency is most likely to be reduced. Accordingly, "method 1" may be applied only to such voxels. By doing so, it is possible to curb an increase in the number of patterns for associating contexts with other voxels, and thus it is possible to curb an increase in memory usage.

As described above, the position of a voxel to be processed (position in a look-ahead cube) can be easily specified on the basis of geometry data, a processing order, and the like. Accordingly, it is possible to easily specify whether or not the voxel to be processed is adjacent to a corner of the look-ahead cube.

<Control Flags>

Further, as in "method 1-2" shown in the fifth row from the top of the table shown in FIG. 7, for example, control flags related to application of "method 1" (specifying neighboring patterns in ternary representation) may be transmitted.

For example, a coding side may generate control information for controlling specifying of neighboring patterns in ternary representation, include the control information in a bitstream, and transmit the same to a decoding side. Then, the decoding side may acquire the transmitted control information and specify neighboring patterns in ternary representation according to the control information.

By applying such control information, it is possible to realize control in a wider variety of methods regarding specifying of neighboring patterns in ternary representation.

<Ternary Use Flag>

For example, as in "method 1-2-1" shown in the sixth row from the top of the table shown in FIG. 7, a control flag (for example, out_of_bounds_flag) that controls whether or not "method 1" described above is applied (whether ternary representation is applied) to specifying of neighboring patterns may be transmitted as such control information.

When this out_of_bounds_flag is true (for example, "1"), it indicates that ternary representation is applied (that is, "method 1" is applied) in specifying of neighboring patterns. When this out_of_bounds_flag is false (for example, "0"), it indicates that ternary representation is not applied in specifying of neighboring patterns (that is, binary representation is applied as in the method described in NPL 2 and NPL 3).

This out_of_bounds_flag may be set for each arbitrary data unit. For example, as shown in A of FIG. 10, this out_of_bounds_flag may be set for each look-ahead cube. By performing processing according to out_of_bounds_flag set in this manner, it is possible to control whether or not "method 1" is applied for each look-ahead cube. Accordingly, neighboring patterns in binary representation can be specified in a look-ahead cube for which out_of_bounds_flag is false, for example, and thus it is possible to curb an increase in memory usage as compared to a case where "method 1" is applied in all regions.

<Ternary Permission Flag>

Further, as in "method 1-2-2" shown in the seventh row from the top of the table shown in FIG. 7, for example, a control flag (for example, out_of_bounds_enabled_flag) that controls whether or not to permit (in other words, whether or not to prohibit) specifying of neighboring patterns in ternary representation in a data unit that is a target may be transmitted as control information regarding specifying of neighboring patterns in such ternary representation.

When this out_of_bounds_enabled_flag is true (for example, "1"), it indicates that application of ternary representation (i.e., application of "method 1") in specifying of neighboring patterns in the data unit that is a target is possible (permitted). When this out_of_bounds_enabled_flag is false (for example, "0"), it indicates that application of ternary representation (i.e., application of "method 1") in specifying of neighboring patterns in the data unit that is a target is not possible (prohibited).

Figure 10:
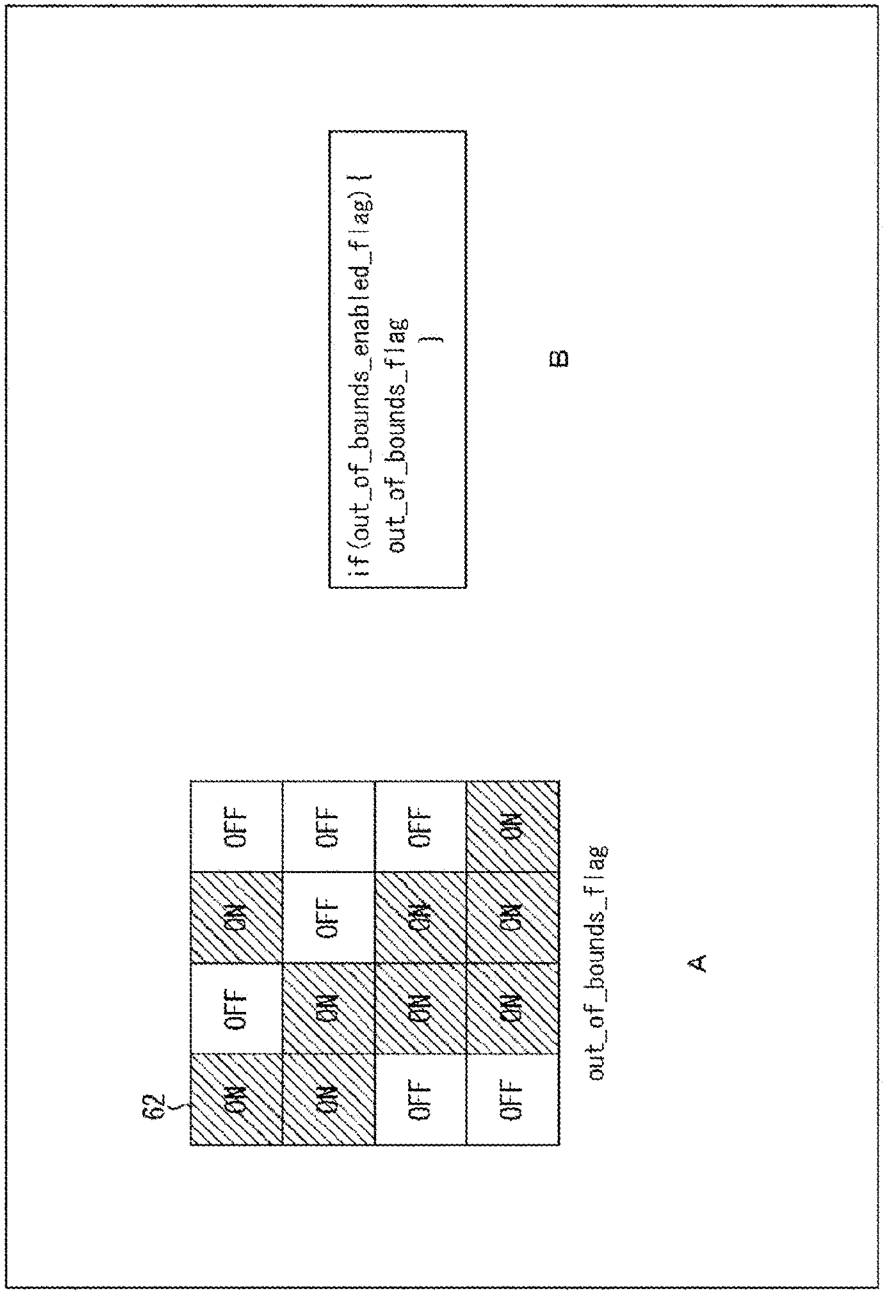
FIG. 10 is a diagram for describing a control flag relating to the present technology.

For example, as in a syntax shown in B of FIG. 10, other control information regarding application of "method 1", such as out_of_bounds_flag, for example, is generated if out_of_bounds_enabled_flag is true (e.g., "1"), and other control information regarding application of "methods 1" may be prevented from being generated if out_of_bounds_enabled_flag is false (e.g., "0"). By doing so, it is possible to omit (skip) processing related another control information (out_of_bounds_flag, or the like) regarding application of "method 1" in a region where out_of_bounds_enabled_flag is false. For example, in the case of coding, it is possible to skip processing such as generation of and reference to the control information, and the like. Further, in the case of decoding, it is possible to skip processing such as reference to the control information, and the like. Accordingly, it is possible to curb an increase in processing load. Further, it is possible to omit transmission of other control information (out_of_bounds_flag, and the like) regarding application of "method 1" for a region where out_of_bounds_enabled_flag is false. Accordingly, it is possible to curb an increase in the amount of code.

A data unit in which this out_of_bounds_enabled_flag is set is arbitrary as long as it is a data unit larger than a data unit in which other control information regarding application of "method 1", such as out_of_bounds_flag, is set. For example, when out_of_bounds_flag is set for each voxel, out_of_bounds_enabled_flag may be set for each predetermined region composed of a plurality of voxels, for each slice, or for each picture.

<Identification Outside Bounding Box>

Further, as in "method 1-3" shown in the eighth row from the top of the table shown in FIG. 7, for example, it may be possible to identify whether or not neighboring voxels are positioned in a bounding box. In the case of "method 1", when a voxel around a voxel to be processed is positioned outside a look-ahead cube including the voxel to be processed, a value "OUT" (for example, "2" or the like) indicating that fact is set, as described with reference to FIG. 8.

However, there is no object outside a bounding box and thus there is a high possibility that there will be no points, in general. Therefore, it is possible to distinguish between a case where voxels around a voxel to be processed are positioned within another look-ahead cube and a case where they are positioned outside the bounding box. By doing so, it is possible to apply a context that is more suitable for actual neighboring patterns, and thus it is possible to curb coding efficiency reduction (typically, improve coding efficiency).

As described above, since a voxel position can be easily ascertained from geometry data, a processing order, and the like, it is also possible to easily ascertain whether or not neighboring voxels are positioned outside a bounding box.

<No Points>

For example, as in "method 1-3-1" shown in the ninth row from the top of the table shown in FIG. 7, it may be assumed that points are not present in neighboring voxels positioned outside a bounding box. That is, in specifying of neighboring patterns, a value (for example, "0") indicating that points are not included in neighboring voxels positioned outside the bounding box may be set. That is, neighboring regions positioned outside the entire area may be regarded as first regions that do not include points and neighboring patterns may be specified.

Figure 11:
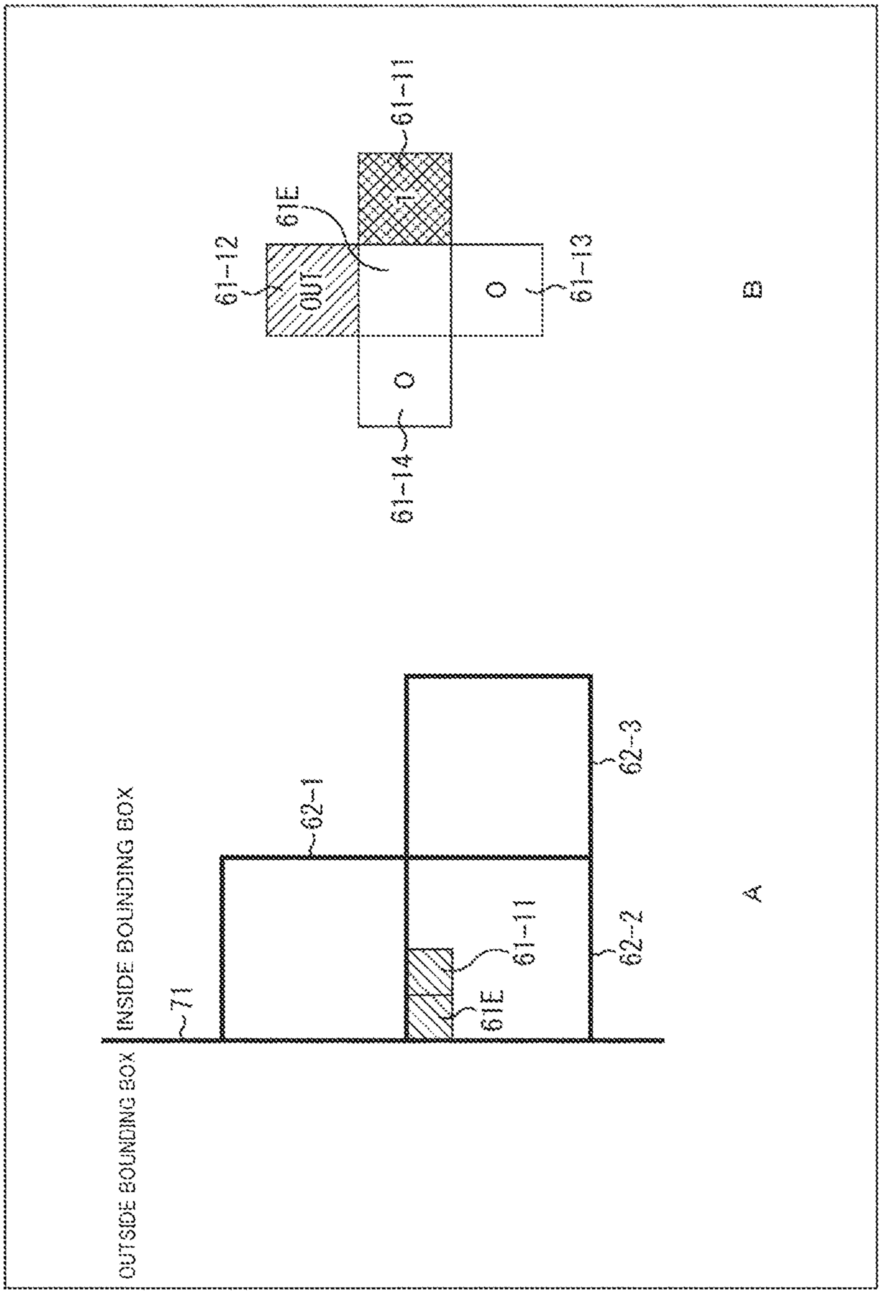
FIG. 11 is a diagram for describing how to handle the outside of a bounding box.

For example, in A of FIG. 11, a look-ahead cube 62-1 is adjacent to the top of a look-ahead cube 62-2 in the figure and a look-ahead cube 62-3 is adjacent to the right of a look-ahead cube 62-2 in the figure. In addition, the look-ahead cube 62-1 and the look-ahead cube 62-2 are adjacent to the boundary of a bounding box, and the left sides of the look-ahead cube 62-1 and the look-ahead cube 62-2 are outside the bounding box.

A voxel 61E to be processed is positioned at the upper left corner of the look-ahead cube 62-2 in the figure. A voxel 61-11 is adjacent to the right of the voxel 61E in the figure. In addition, the voxel 61E and the voxel 61-11 each include points.

In such a case, neighboring patterns of the voxel 61E are specified as shown in B of FIG. 11. That is, since the voxel 61-11 adjacent to the right of the voxel 61E in the figure includes points, a value (for example, "1") indicating that fact is set. Further, since a voxel 61-13 adjacent to the bottom of the voxels 61E in the figure does not include points, a value (for example, "0") indicating that fact is set. Further, since a voxel 61-12 adjacent to the top of the voxel 61E in the figure is positioned outside the look-ahead cube 62-2 (within the look-ahead cube 62-1), a value "OUT" (for example, "2") indicating that fact is set.

On the other hand, since a voxel 61-14 adjacent to the left of the voxel 61E in the figure is positioned outside the bounding box, a value (for example, "0") indicating that points are not included is set.

By doing so, in specifying of neighboring patterns in ternary representation, it is possible to distinguish between a case where neighboring voxels are positioned within another look-ahead cube and a case where they are positioned outside a bounding box. As a result, it is possible to apply a context that is more suitable for actual neighboring patterns while curbing an increase in memory usage.

Although voxels and the like are represented in two dimensions for convenience of description in FIG. 11 as in FIG. 6 and the like, a three-dimensional region is used as a processing target region and a neighboring region as in the case of FIG. 3 in reality. Accordingly, values are set as described above for voxels adjacent to the top, bottom, left, right, front, and rear faces of the rectangular parallelepiped or cubic voxel 61E, for example.

<Quaternary Representation>

Further, in specifying of neighboring patterns, a value different from a value set for a neighboring region positioned within a bounding box may be set for a neighboring region positioned outside the bounding box, as shown in "method 1-3-2" shown in the tenth row from the top of the table shown in FIG. 7. That is, a value (for example, "4") indicating that fact may be set for the neighboring region positioned outside the bounding box. That is, neighboring patterns may be represented by quaternary values.

For example, in a case where a plurality of objects are adjacent to each other, and the like, the possibility that points exist outside a bounding box is not zero. Accordingly, it is possible to apply a context that is more suitable for actual neighboring patterns by representing neighboring patterns by quaternary values as described above.

2. First Embodiment

<Coding Device>

Figure 12:
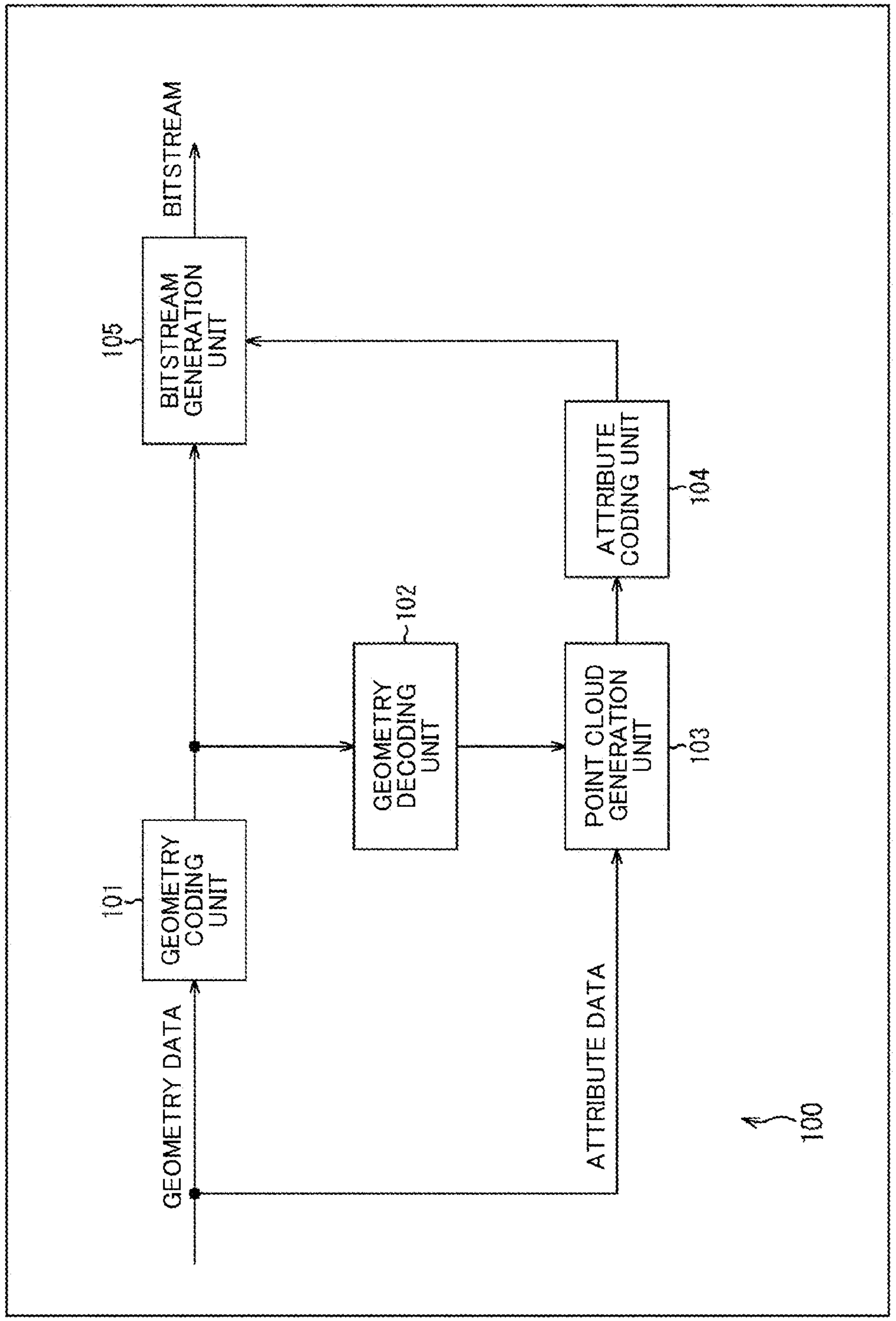
FIG. 12 is a block diagram showing an example of major components of a coding device.

Next, a device to which the present technology described above in <1. Ternary representation of neighboring patterns> is applied will be described. FIG. 12 is a block diagram showing an example of a configuration of a coding device that is an aspect of an information processing device to which the present technology is applied. A coding device 100 illustrated in FIG. 12 is a device that codes a point cloud (3D data). The coding device 100 codes the point cloud by applying the present technology described above in <1. Ternary representation of neighboring patterns>.

Meanwhile, FIG. 12 illustrates major parts such as processing units and data flows, but processing units and data flows are not limited to those illustrated in FIG. 12. That is, processing units that are not illustrated in FIG. 12 as blocks and processing and data flows that are not illustrated in FIG. 12 as arrows and the like may be present in the coding device 100. This also applies to other figures for describing processing units and the like in the coding device 100.

As shown in FIG. 12, the coding device 100 includes a geometry coding unit 101, a geometry decoding unit 102, a point cloud generation unit 103, an attribute coding unit 104, and a bitstream generation unit 105.

The geometry coding unit 101 performs processing related to coding of geometry data. For example, the geometry coding unit 101 acquires geometry data of point cloud data input to the coding device 100. The geometry coding unit 101 codes the geometry data and generate coded data. The geometry coding unit 101 supplies the generated coded data to the geometry decoding unit 102 and the bitstream generation unit 105.

The geometry decoding unit 102 performs processing related to decoding the coded data of the geometry data. For example, the geometry decoding unit 102 acquires the coded data of the geometry data supplied from the geometry coding unit 101. The geometry decoding unit 102 decodes the coded data by a decoding method corresponding to a coding method applied in the geometry coding unit 101 and generates (restores) the geometry data. Details of this decoding method will be described later using a decoding device as an example. The geometry decoding unit 102 supplies the generated geometry data to the point cloud generation unit 103.

The point cloud generation unit 103 performs processing related to generation of point cloud data. For example, the point cloud generation unit 103 acquires attribute data of the point cloud data input to the coding device 100. Further, the point cloud generation unit 103 acquires the geometry data supplied from the geometry decoding unit 102.

Geometry data may change due to processing such as coding and decoding (for example, points may increase or decrease or move). That is, the geometry data supplied from the geometry decoding unit 102 may be different from the geometry data before being coded by the geometry coding unit 101.

Therefore, the point cloud generation unit 103 performs processing (also referred to as recoloring processing) to match the attribute data with the geometry data (decoding result). That is, the point cloud generation unit 103 updates the attribute data so as to correspond to update of the geometry data. The point cloud generation unit 103 supplies the updated attribute data (attribute data corresponding to the geometry data (decoding result)) to the attribute coding unit 104.

The attribute coding unit 104 performs processing related to attribute coding. For example, the attribute coding unit 104 acquires the attribute data supplied from the point cloud generation unit 103. Further, the attribute coding unit 104 codes the attribute data by a predetermined method and generates coded data of the attribute data. This coding method is arbitrary. The attribute coding unit 104 supplies the generated coded data of the attribute data to the bitstream generation unit 105.

The bitstream generation unit 105 performs processing related to generation of a bitstream. For example, the bitstream generation unit 105 acquires the coded data of geometry supplied from the geometry coding unit 101. Further, the bitstream generation unit 105 acquires the coded data of the attribute data supplied from the attribute coding unit 104. The bitstream generation unit 105 generates a bitstream including the coded data. The bitstream generation unit 105 outputs the generated bitstream to the outside of the coding device 100.

Each of these processing units (the geometry coding unit 101 to the bitstream generation unit 105) of the coding device 100 has an arbitrary configuration. For example, each processing unit may be configured as a logic circuit for realizing the aforementioned processing. In addition, each processing unit may include, for example, a central processing unit (CPU), a read only memory (ROM), a random access memory (RAM), and the like and execute a program using these components to realize the aforementioned processing. It goes without saying that each processing unit may have both the aforementioned configurations, realize parts of the aforementioned processing according to a logic circuit, and realize the other part of the processing by executing a program. The processing units may have independent configurations, for example, some processing units may realize parts of the aforementioned processing according to a logic circuit, some other processing units may realize the aforementioned processing by executing a program, and some other processing units may realize the aforementioned processing according to both a logic circuit and execution of a program.

<Geometry Coding Unit>

Figure 13:
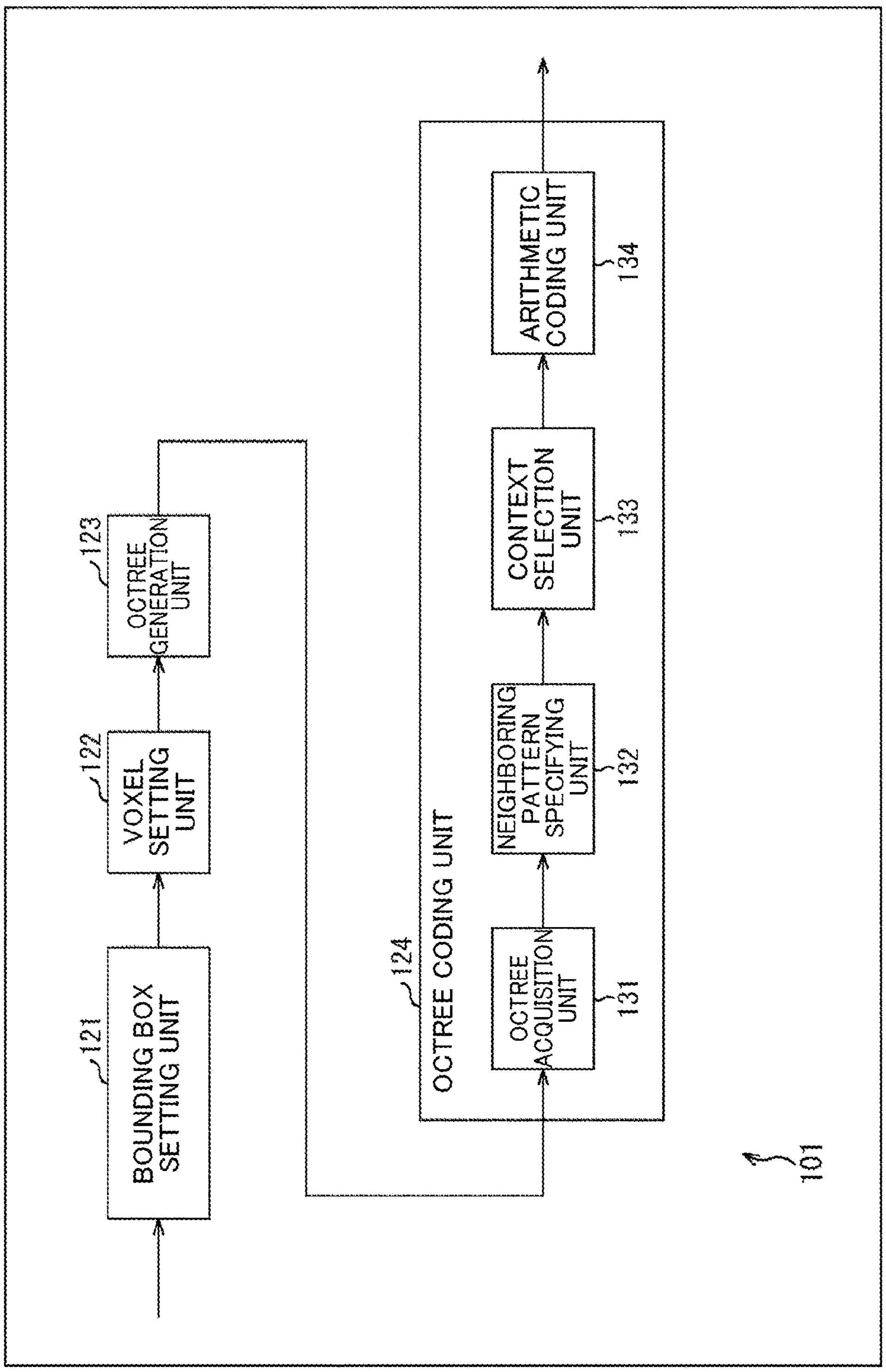
FIG. 13 is a block diagram showing an example of major components of a geometry coding unit.

FIG. 13 is a block diagram showing an example of major components of the geometry coding unit 101 (FIG. 12). As shown in FIG. 13, the geometry coding unit 101 includes, for example, a bounding box setting unit 121, a voxel setting unit 122, an octree generation unit 123, and an octree coding unit 124.

The bounding box setting unit 121 performs processing related to setting of a bounding box. For example, the bounding box setting unit 121 acquires geometry data of point cloud data input to the coding device 100. The bounding box setting unit 121 sets a bounding box for the geometry data. The bounding box is information for normalizing the geometry data to be coded. Voxelization is performed on the basis of this bounding box. The bounding box setting unit 121 supplies information on the bounding box to the voxel setting unit 122 along with the geometry data.

The voxel setting unit 122 performs processing related to setting of voxels. For example, the voxel setting unit 122 acquires the geometry data supplied from the bounding box setting unit 121 and the information on the bounding box. Further, the voxel setting unit 122 sets voxels by dividing the bounding box set for the geometry data on the basis of the information. That is, the voxel setting unit 122 performs voxelization (quantization of the position of each point) of the geometry data. The voxel setting unit 122 supplies voxel data that is the geometry data voxelized in this manner to the octree generation unit 123.

The octree generation unit 123 performs processing related to generation of an octree. For example, the octree generation unit 123 acquires the voxel data supplied from the voxel setting unit 122. Further, the octree generation unit 123 converts the hierarchical structure of the voxel data into an octree (generates an octree). The octree generation unit 123 supplies octree data that is geometry data converted into the octree to the octree coding unit 124.

The octree coding unit 124 performs processing related to coding of octree data. For example, the octree coding unit 124 acquires the octree data supplied from the octree generation unit 123. Further, the octree coding unit 124 performs arithmetic coding (for example, CABAC or the like) using a context on the octree data and generates coded data of the geometry data. The octree coding unit 124 supplies the generated coded data of the geometry data to the geometry decoding unit 102 and the bitstream generation unit 105 (both in FIG. 10).

As shown in FIG. 13, the octree coding unit 124 includes an octree acquisition unit 131, a neighboring pattern specifying unit 132, a context selection unit 133, and an arithmetic coding unit 134.

The octree generation unit 123 supplies octree data (child mask of each node (ChildMask)) to the octree acquisition unit 131 for each layer and for each look-ahead cube in each layer. The octree acquisition unit 131 acquires the octree data supplied from the octree generation unit 123. The octree acquisition unit 131 supplies octree data of a look-ahead cube to be processed to the neighboring pattern specifying unit 132.

The neighboring pattern specifying unit 132 performs processing related to specifying of neighboring patterns for each look-ahead cube. For example, the neighboring pattern specifying unit 132 acquires the octree data of the look-ahead cube to be processed supplied from the octree acquisition unit 131. In addition, the neighboring pattern specifying unit 132 processes octree data of each voxel of the look-ahead cube to be processed in a predetermined order (for example, Morton code order) and specifies neighboring patterns for each voxel including points. The neighboring pattern specifying unit 132 supplies information indicating the specified neighboring patterns to the context selection unit 133 along with the octree data of the look-ahead cube to be processed.

The context selection unit 133 performs processing related to selection of a context used for arithmetic coding. For example, the context selection unit 133 acquires the octree data, the information indicating the neighboring patterns, and the like supplied from the neighboring pattern specifying unit 132. Further, the context selection unit 133 selects a context corresponding to the specified neighboring patterns for each voxel including points on the basis of the information indicating the neighboring patterns. The context selection unit 133 supplies information indicating the selected context to the arithmetic coding unit 134 along with the octree data of the look-ahead cube to be processed.

The arithmetic coding unit 134 performs processing related to arithmetic coding of geometry data (octree data). For example, the arithmetic coding unit 134 acquires the octree data supplied from the context selection unit 133 and the information indicating the selected context. In addition, the arithmetic coding unit 134 performs arithmetic coding (for example, CABAC or the like) of the octree data to generate coded data of the geometry data (octree data). At the time of arithmetic coding, the arithmetic coding unit 134 switches contexts on the basis of the information indicating the selected context. That is, the arithmetic coding unit 134 switches contexts according to a distribution pattern of neighboring points (neighboring patterns) and performs arithmetic coding using the switched context.

The arithmetic coding unit 134 supplies the generated coded data of the geometry data to the geometry decoding unit 102 and the bitstream generation unit 105 (both in FIG. 10).

At the time of such coding, the neighboring pattern specifying unit 132 performs this processing by applying the present technology described above in <1. Ternary representation of neighboring patterns>. For example, the neighboring pattern specifying unit 132 applies "method 1" shown in the uppermost row of the table shown in FIG. 7 to specify neighboring patterns in ternary representation.

That is, the context selection unit 133 selects a context on the basis of the neighboring patterns represented by ternary values. Then, the arithmetic coding unit 134 performs arithmetic coding using the context selected on the basis of the neighboring patterns represented by the ternary values.

That is, on the basis of position information representing positions of points of a point cloud that represents an object in a three-dimensional shape as a set of points in units of first regions that are three-dimensional regions that divide an entire area corresponding to a three-dimensional area including the object into a plurality of regions, for each second region that is a three-dimensional region composed of a plurality of first regions, the neighboring pattern specifying unit 132 identifies whether or not each neighboring region that is a first region adjacent to a processing target region that is a first region to be processed includes points or is positioned outside a second region including the processing target region and specifies a neighboring pattern that is a pattern of an identification result of each neighboring region for each first region including points. In addition, the context selection unit 133 selects a context according to the neighboring pattern specified by the neighboring pattern specifying unit 132 with respect to each first region including points. Further, the arithmetic coding unit 134 codes the position information for each first region using the context selected by the context selection unit to generate coded data of the position information.

Accordingly, the octree coding unit 124 (geometry coding unit 101) can perform arithmetic coding by applying a context more suitable for actual neighboring patterns and thus can curb a reduction in the coding efficiency (typically improve the coding efficiency) of the coded data of the geometry data. That is, the coding device 100 can curb a decrease in the coding efficiency of a bitstream.

Each of these processing units (the bounding box setting unit 121 to the octree coding unit 124 and the octree acquisition unit 131 to the arithmetic coding unit 134) of the geometry coding unit 101 has an arbitrary configuration. For example, each processing unit may be configured as a logic circuit for realizing the aforementioned processing. Further, each processing unit may include, for example, a CPU, a ROM, a RAM, and the like and execute a program using these components to realize the aforementioned processing. It goes without saying that each processing unit may have both the aforementioned configurations, realize parts of the aforementioned processing according to a logic circuit, and realize the other part of the processing by executing a program. The processing units may have independent configurations, for example, some processing units may realize parts of the aforementioned processing according to a logic circuit, some other processing units may realize the aforementioned processing by executing a program, and some other processing units may realize the aforementioned processing according to both a logic circuit and execution of a program.

<Flow of Coding Processing>

The coding device 100 codes geometry data by executing coding processing. An example of a flow of this coding processing will be described with reference to the flowchart of FIG. 14.

When coding processing is started, the geometry coding unit 101 performs geometry coding processing to codes geometry data and generates coded data of the geometry data in step S101. Details of this geometry coding processing will be described later.

In step S102, the geometry decoding unit 102 performs geometry decoding processing to decode the coded data generated in step S101 and generates (restores) the geometry data. Details of this geometry decoding processing will be described in description of a decoding device.

In step S103, the point cloud generation unit 103 performs recoloring processing to associate attribute data with the geometry data generated in step S102.

In step S104, the attribute coding unit 104 codes the attribute data recolored in step S103.

In step S105, the bitstream generation unit 105 generates a bitstream including the coded data of the geometry data generated in step S101 and the coded data of the attribute data generated in step S104.

When processing of step S105 ends, coding processing ends.

<Flow of Geometry Coding Processing>

Next, an example of the flow of geometry coding processing executed in step S101 of FIG. 14 will be described with reference to the flowchart of FIG. 15.

When geometry coding processing is started, the bounding box setting unit 121 of the geometry coding unit 101 sets a bounding box for geometry data (of each object) as described with reference to FIG. 1 in step S121.

Figure 2:
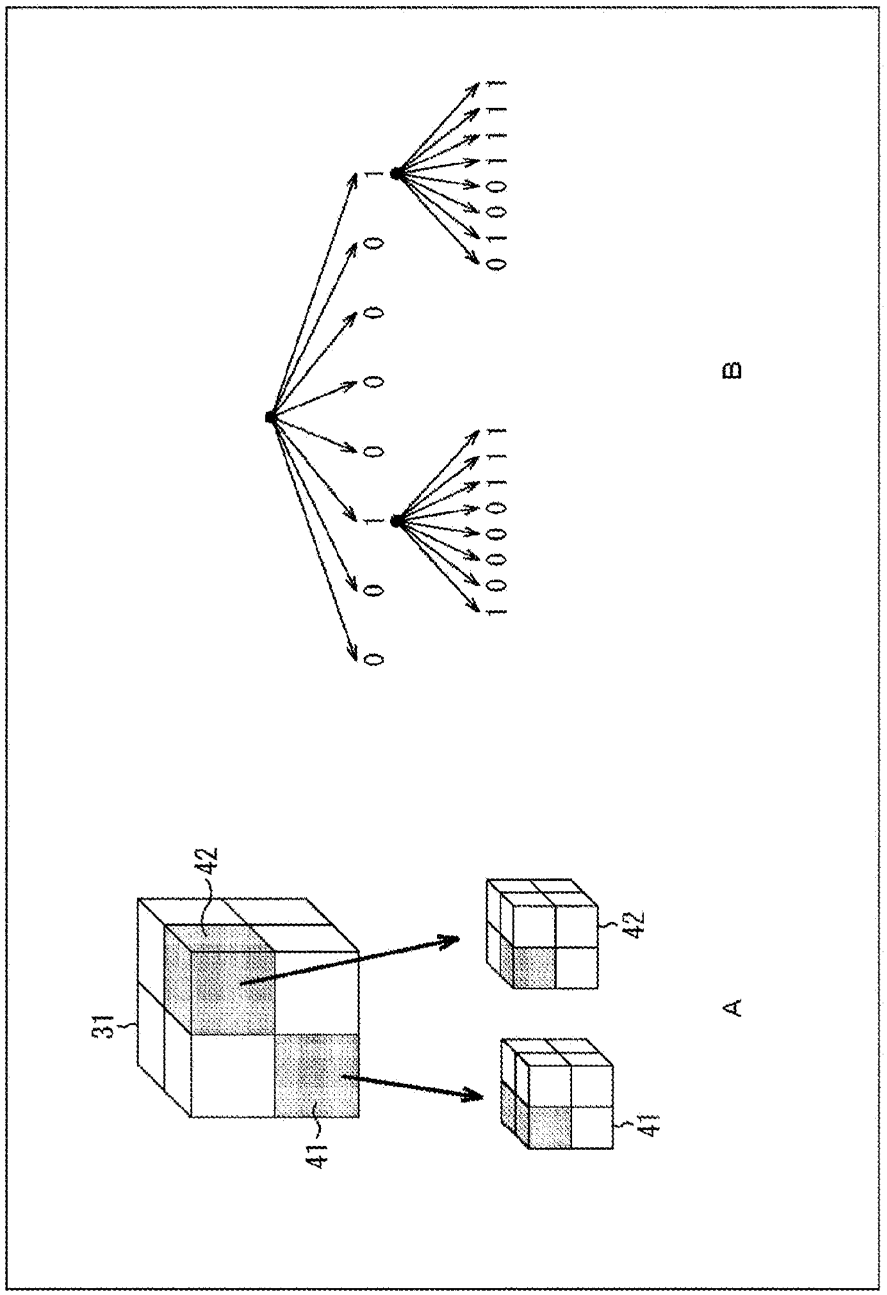
FIG. 2 is a diagram for describing an outline of a geometry data coding procedure.

In step S122, the voxel setting unit 122 divides the bounding box set in step S121 to set voxels and generates voxel data, as described with reference to FIG. 1 and FIG. 2.

In step S123, the octree generation unit 123 generates an octree from the voxel data generated in step S122, as described with reference to FIG. 2.

In step S124, the octree coding unit 124 executes octree coding processing to code the octree generated in step S123 and generates coded data of the geometry data. Details of this octree coding processing will be described later.

Figure 14:
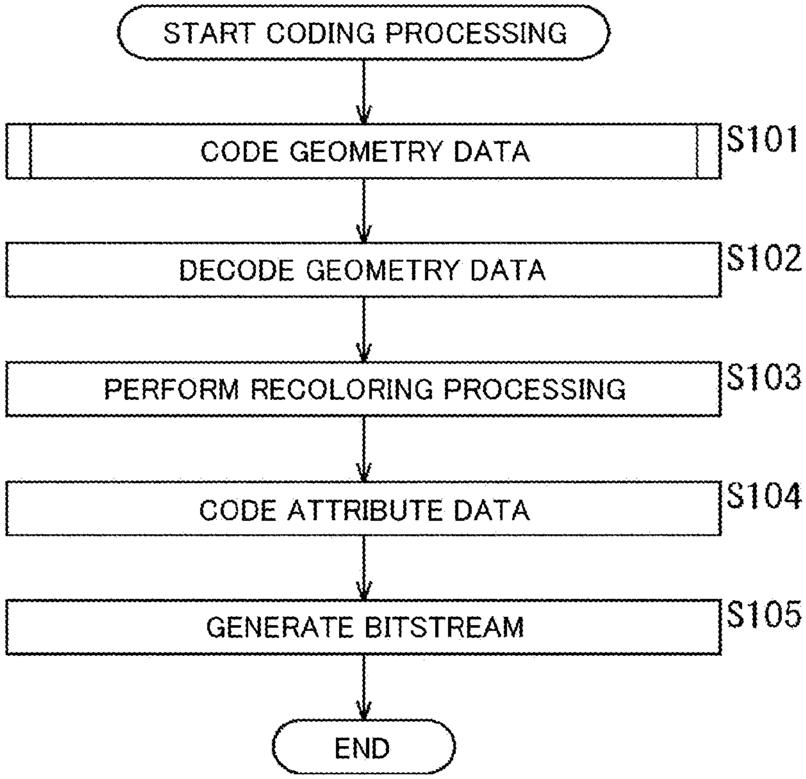
FIG. 14 is a flowchart for describing an example of a coding processing flow.

When processing of step S124 ends, geometry coding processing ends and processing returns to FIG. 14.

<Flow of Octree Coding Processing>

Next, an example of the flow of octree coding processing executed in step S124 of FIG. 15 will be described with reference to the flowchart of FIG. 16.

Figure 15:
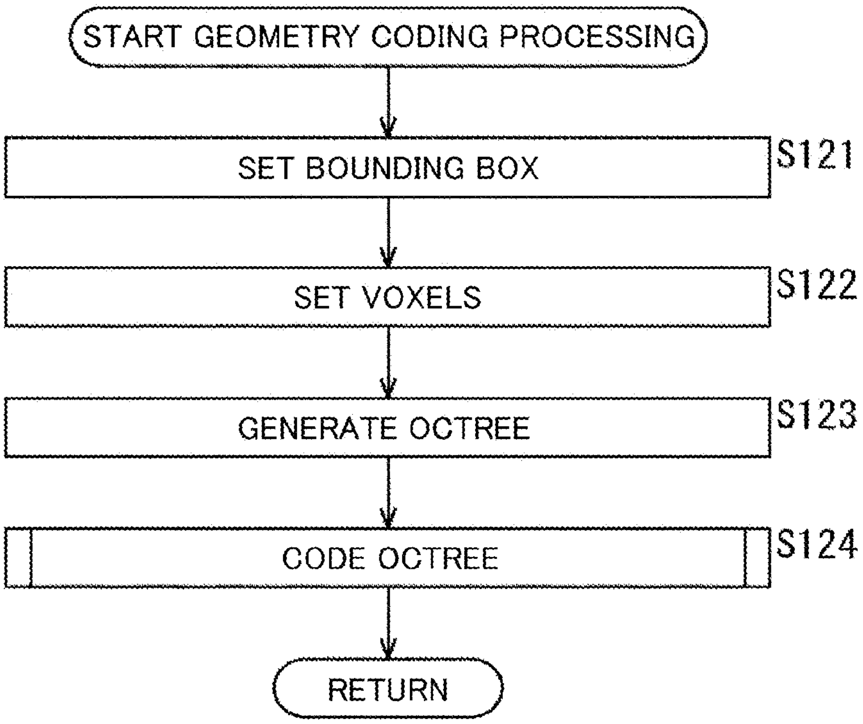
FIG. 15 is a flowchart for describing an example of a geometry coding processing flow.

When octree coding processing is started, the octree acquisition unit 131 of the octree coding unit 124 acquires the octree data generated in step S123 of FIG. 15 for each look-ahead cube in step S141.

The neighboring pattern specifying unit 132 selects a voxel to be processed (that is, a processing target region) from voxels including points in a look-ahead cube to be processed. Then, the neighboring pattern specifying unit 132 executes processing of steps S142 to S146 on the voxel to be processed.

In step S142, the neighboring pattern specifying unit 132 executes neighboring pattern specifying processing to specify (detect) neighboring patterns with respect to the voxel to be processed. At that time, the neighboring pattern specifying unit 132 applies "method 1" shown in the uppermost row of the table shown in FIG. 7 to specify the neighboring patterns by ternary representation.

Details of this neighboring pattern specifying processing will be described later.

In step S143, the neighboring pattern specifying unit 132 aggregates specified neighboring patterns. In the case of neighboring patterns in ternary representation, as in the case of binary representation described with reference to FIG. 4, the same patterns to which a context is assigned are aggregated without considering the directions thereof. Therefore, the neighboring pattern specifying unit 132 specifies which of the aggregated patterns corresponds to the specified neighboring patterns. That is, the neighboring pattern specifying unit 132 specifies which of the aggregated patterns corresponds to the neighboring patterns.

In step S144, the context selection unit 133 selects the context corresponding to the neighboring patterns (aggregated neighboring patterns) specified in step S143 as a context used for arithmetic coding of the voxel to be processed.

In step S145, the arithmetic coding unit 134 arithmetically codes the voxel to be processed using the context selected in step S144.

In step S146, the octree acquisition unit 131 determines whether or not all points have been processed for the look-ahead cube to be processed. If it is determined that there are unprocessed points, processing returns to step S142 and subsequent processing is repeated for new points to be processed.

That is, steps S142 to S146 are executed for each voxel having points in the look-ahead cube to be processed. That is, octree data is coded for each voxel (node).

If it is determined in step S146 that all points in the look-ahead cube to be processed have been processed, processing proceeds to step S147.

In step S147, the octree acquisition unit 131 determines whether or not all look-ahead cubes have been processed. If it is determined that there is an unprocessed look-ahead cube, processing returns to step S141 and subsequent processing is repeated. That is, an octree of a new look-ahead cube is acquired and processing of steps S142 to S147 is executed for the look-ahead cube.

If it is determined in step S147 that all look-ahead cubes have been processed, octree coding processing ends and processing returns to FIG. 15.

<Flow of Neighboring Pattern Specifying Processing>

Next, an example of the flow of neighboring pattern specifying processing executed in step S142 of FIG. 16 will be described with reference to the flowchart of FIG. 17.

When neighboring pattern specifying processing is started, the neighboring pattern specifying unit 132 selects any of neighboring regions of a processing target region (any of voxels adjacent to a voxel to be processed) in step S161. The neighboring pattern specifying unit 132 appropriately executes processing of steps S162 to S166 for the neighboring region.

In step S162, the neighboring pattern specifying unit 132 determines whether or not the neighboring region selected in step S161 is positioned within a look-ahead cube to be processed (a look-ahead cube to which the processing target region belongs). As described above, the position of each voxel can be easily specified. That is, it can be easily determined whether or not the neighboring region is positioned within the look-ahead cube to be processed.

If it is determined that the neighboring region is positioned within the look-ahead cube to be processed, processing proceeds to step S163.

In step S163, the neighboring pattern specifying unit 132 determines whether or not the neighboring region includes points on the basis of geometry data (octree data). If it is determined that the neighboring region does not include points, processing proceeds to step S164.

In step S164, the neighboring pattern specifying unit 132 classifies the neighboring region as a value "0" indicating that the neighboring region does not include points (sets the value "0" for the neighboring region). When processing of step S164 ends, processing proceeds to step S167.

If it is determined in step S163 that the neighboring region includes points, processing proceeds to step S165.

In step S165, the neighboring pattern specifying unit 132 classifies the neighboring region as a value "1" indicating that the neighboring region includes points (sets the value "1" for the neighboring region). When processing of step S165 ends, processing proceeds to step S167.

If it is determined in step S162 that the neighboring region is positioned outside the look-ahead cube to be processed, processing proceeds to step S166.

In step S166, the neighboring pattern specifying unit 132 classifies the neighboring region as a value "2" indicating that the neighboring region is positioned outside the look-ahead cube (set the value "2" for the neighboring region). When processing of step S166 ends, processing proceeds to step S167.

In step S167, the neighboring pattern specifying unit 132 determines whether or not to end neighboring pattern specifying processing. If there are unprocessed neighboring regions (neighboring regions for which no value is set) and it is determined that neighboring pattern specifying processing does not end, processing returns to step S161 and subsequent processing is repeated.

That is, any of the unprocessed neighboring regions is newly selected in step S161 and processing of steps S161 to S166 is executed as necessary for the newly selected neighboring region.

When processing of steps S161 to S167 is appropriately executed for each neighboring region and all the neighboring regions are processed, neighboring patterns of the processing target region are specified in step S167 and it is determined that neighboring pattern specifying processing ends. In that case, neighboring pattern specifying processing ends and processing returns to FIG. 16.

As described above, the neighboring pattern specifying unit 132 can specify neighboring patterns by ternary representation by executing this neighboring pattern specifying processing.

Accordingly, by executing processing as described above, the coding device 100 can curb coding efficiency reduction (typically, improve coding efficiency).

It has been described above that it is determined whether or not each neighboring region is positioned within a look-ahead cube to be processed in neighboring pattern specifying processing. However, which neighboring region is positioned within a look-ahead cube to be processed is determined by the position of a processing target region (voxel to be processed) in the look-ahead cube. As described above, the position of the processing target region in the look-ahead cube can be easily specified on the basis of geometry data, a processing order, and the like. Accordingly, by obtaining the position of the processing target region (voxel to be processed) in the look-ahead cube, it is possible to collectively determine whether or not all neighboring regions are positioned within the look-ahead cube to be processed.

In that case, processing of step S166 may be performed on a neighboring region determined to be positioned outside the look-ahead cube to be processed, and processing of steps S163 to S165 may be appropriately performed on a neighboring region determined to be positioned within the look-ahead cube to be processed.

3. Second Embodiment

<Decoding Device>

Figure 18:
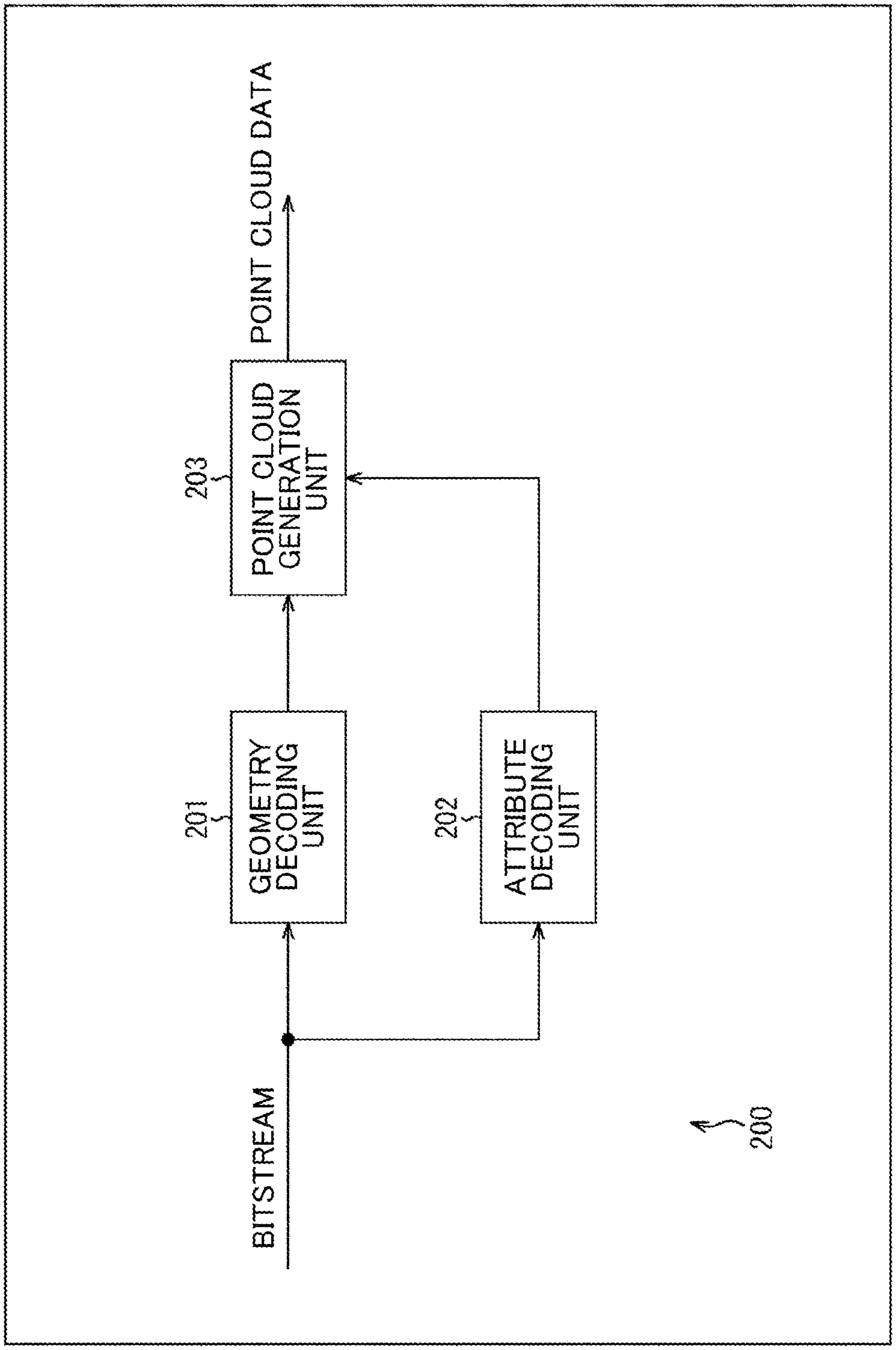
FIG. 18 is a block diagram showing an example of major components of a decoding device.

Next, another example of a device to which the present technology described above in <1. Ternary representation of neighboring patterns> is applied will be described. FIG. 18 is a block diagram showing an example of a configuration of a decoding device that is one aspect of an information processing device to which the present technology is applied. A decoding device 200 shown in FIG. 18 is a device that decodes coded data of a point cloud (3D data). The decoding device 200 decodes coded data of a point cloud by applying the present technology described above in <1. Ternary representation of neighboring patterns>. The decoding device 200 corresponds to, for example, the coding device 100 (FIG. 12) and can correctly decode the coded data generated by the coding device 100.

Meanwhile, FIG. 18 illustrates major parts such as processing units and data flows, but processing units and data flows are not limited to those illustrated in FIG. 18. That is, processing units that are not illustrated in FIG. 18 as blocks and processing and data flows that are not illustrated in FIG. 18 as arrows and the like may be present in the decoding device 200. This also applies to other figures illustrating processing units and the like in the decoding device 200.

As shown in FIG. 18, the decoding device 200 includes a geometry decoding unit 201, an attribute decoding unit 202, and a point cloud generation unit 203.

The geometry decoding unit 201 performs processing related to decoding the coded data of the geometry data. For example, the geometry decoding unit 201 acquires a bitstream input to the decoding device 200. The geometry decoding unit 201 decodes coded data of geometry data included in the bitstream to generate (restore) the geometry data.

The geometry decoding unit 201 performs decoding by a decoding method corresponding to the coding method applied by the geometry coding unit 101 (FIG. 12). The geometry decoding unit 102 (FIG. 12) has the same configuration as the geometry decoding unit 201 and performs the same processing. That is, description regarding the geometry decoding unit 201 can also be applied to the geometry decoding unit 102.

The geometry decoding unit 201 supplies the generated geometry data to the point cloud generation unit 203.

The attribute decoding unit 202 performs processing related to decoding of coded data of attribute data. For example, the attribute decoding unit 202 acquires a bitstream input to the decoding device 200. The attribute decoding unit 202 decodes coded data of attribute data included in the bitstream to generate (restore) the attribute data.

The attribute decoding unit 202 performs decoding by a decoding method corresponding to the coding method applied by the attribute coding unit 104 (FIG. 12). The attribute decoding unit 202 supplies the generated attribute data to the point cloud generation unit 203.

The point cloud generation unit 203 performs processing related to generation of a point cloud. For example, the point cloud generation unit 203 acquires the geometry data supplied from the geometry decoding unit 201. Further, the point cloud generation unit 203 acquires the attribute data supplied from the attribute decoding unit 202. Then, the point cloud generation unit 203 associates the geometry data with the attribute data to generate point cloud data. The point cloud generation unit 203 outputs the generated point cloud data to the outside of the decoding device 200.

Each of these processing units (the geometry decoding unit 201 to the point cloud generation unit 203) of the decoding device 200 has an arbitrary configuration. For example, each processing unit may be configured as a logic circuit for realizing the aforementioned processing. Further, each processing unit may include, for example, a CPU, a ROM, a RAM, and the like and execute a program using these components to realize the aforementioned processing. It goes without saying that each processing unit may have both the aforementioned configurations, realize parts of the aforementioned processing according to a logic circuit, and realize the other part of the processing by executing a program. The processing units may have independent configurations, for example, some processing units may realize parts of the aforementioned processing according to a logic circuit, some other processing units may realize the aforementioned processing by executing a program, and some other processing units may realize the aforementioned processing according to both a logic circuit and execution of a program.

<Geometry Decoding Unit>

Figure 19:
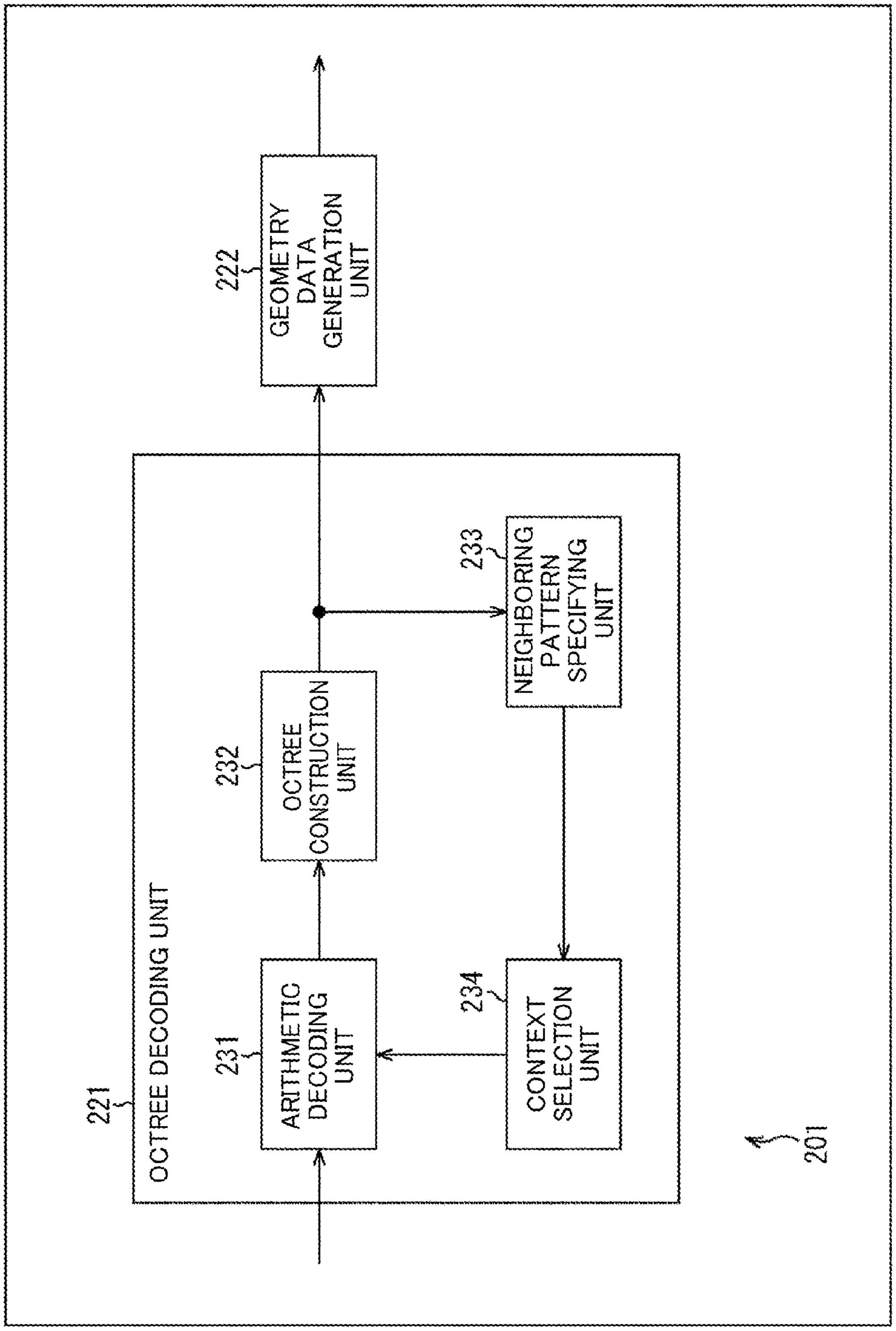
FIG. 19 is a block diagram showing an example of major components of a geometry decoding unit.

FIG. 19 is a block diagram showing an example of major components of the geometry decoding unit 201 (FIG. 18). As shown in FIG. 19, the geometry decoding unit 201 includes an octree decoding unit 221 and a geometry data generation unit 222.

The octree decoding unit 221 performs processing related to decoding of coded data of geometry data (octree data). For example, the octree decoding unit 221 acquires a bitstream input to the decoding device 200. The octree decoding unit 221 decodes coded data of geometry data included in the bitstream to generate (restore) the octree data. The octree decoding unit 221 supplies the generated octree data to the geometry data generation unit 222.

The geometry data generation unit 222 performs processing related to generation (restoration) of geometry data. For example, the geometry data generation unit 222 acquires the octree data supplied from the octree decoding unit 221. The geometry data generation unit 222 generates geometry data indicating the position of each point in coordinates (converts the octree data into geometry data) using the octree data. The geometry data generation unit 222 supplies the generated geometry data to the point cloud generation unit 203.

As shown in FIG. 19, the octree decoding unit 221 includes an arithmetic decoding unit 231, an octree construction unit 232, a neighboring pattern specifying unit 233, and a context selection unit 234.

The arithmetic decoding unit 231 performs processing related to arithmetic decoding of coded data of geometry data (octree data). For example, the arithmetic decoding unit 231 acquires a bitstream input to the decoding device 200. The arithmetic decoding unit 231 decodes coded data of geometry data included in the bitstream for each node (for each voxel) to generate the geometry data for each node (for each voxel).

In this decoding, the arithmetic decoding unit 231 performs arithmetic decoding using a context such as CABAC. This arithmetic decoding is a decoding method corresponding to the coding method of the arithmetic coding unit 134. At that time, the arithmetic decoding unit 231 performs arithmetic decoding using the context supplied from the context selection unit 234 as appropriate.

The arithmetic decoding unit 231 supplies the generated geometry data for each node (for each voxel) to the octree construction unit 232.

The octree construction unit 232 performs processing related to construction of an octree. For example, the octree construction unit 232 acquires the geometry data for each node (for each voxel) supplied from the arithmetic decoding unit 231. The octree construction unit 232 constructs an octree using the geometry data of each node (each voxel) with respect to a look-ahead cube to be processed and generates (restores) octree data. That is, the octree construction unit 232 hierarchizes the octree data of each node generated by the arithmetic decoding unit 231 and generates position information (octree data) having a tree structure. The octree construction unit 232 supplies the generated octree data of the look-ahead cube to be processed to the geometry data generation unit 222 and the neighboring pattern specifying unit 233.

The neighboring pattern specifying unit 233 performs processing related to specifying of neighboring patterns of a node (voxel) that is the next arithmetic decoding processing target. For example, the neighboring pattern specifying unit 233 acquires octree data of a look-ahead cube to be processed, which has been decoded up to that time and is supplied from the octree construction unit 232.

The neighboring pattern specifying unit 233 has basically the same configuration as the neighboring pattern specifying unit 132 (FIG. 13) and performs basically the same processing. That is, the neighboring pattern specifying unit 233 specifies neighboring patterns of a node (voxel) that is the next arithmetic decoding processing target using the acquired octree data of the look-ahead cube to be processed. The neighboring pattern specifying unit 233 supplies information indicating the specified neighboring patterns to the context selection unit 133.

The context selection unit 234 has the same configuration as the context selection unit 133 (FIG. 13) and performs the same processing. That is, the context selection unit 234 performs processing related to selection of a context used for arithmetic decoding. For example, the context selection unit 234 acquires information or the like indicating the neighboring patterns supplied from the neighboring pattern specifying unit 233. Further, the context selection unit 234 select a context corresponding to the specified neighboring patterns as a context used for arithmetic decoding of the next node (voxel) that will be an arithmetic decoding processing target on the basis of the information indicating the neighboring patterns. The context selection unit 234 supplies information indicating the selected context to the arithmetic decoding unit 231.

At the time of such decoding, the neighboring pattern specifying unit 233 perform this processing by applying the present technology described above in <1. Ternary representation of neighboring patterns>. For example, the neighboring pattern specifying unit 233 applies "method 1" shown in the uppermost row of the table shown in FIG. 7 to specify neighboring patterns in ternary representation.

That is, the context selection unit 234 selects a context on the basis of the neighboring patterns represented by ternary values. Then, the arithmetic decoding unit 231 performs arithmetic coding using the context selected on the basis of the neighboring patterns represented by ternary values.

That is, on the basis of a decoding result of coded data of position information representing positions of points of a point cloud that represents an object in a three-dimensional shape as a set of points in units of first regions that are three-dimensional regions that divide an entire area corresponding to a three-dimensional area including the object into a plurality of regions, for each second region that is a three-dimensional region composed of a plurality of first regions, the neighboring pattern specifying unit 233 identifies whether or not each neighboring region that is a first region adjacent to a processing target region that is a first region to be processed includes points or is positioned outside a second region including the processing target region for each first region including points and specifies a neighboring pattern that is a pattern of an identification result of each neighboring region. In addition, the context selection unit 234 selects a context according to the neighboring pattern specified by the neighboring pattern specifying unit 233 with respect to each first region including points. Further, the arithmetic decoding unit 231 decodes the coded data using the context selected by the context selection unit 234 to generate the position information.

Accordingly, the octree decoding unit 221 (geometry decoding unit 201) can apply the same context as in the case of coding and thus can correctly decode coded data coded by applying the present technology. That is, the octree decoding unit 221 (geometry decoding unit 201) can curb a decrease in coding efficiency of coded data of the geometry data (typically, improve coding efficiency). That is, the decoding device 200 can curb a decrease in the coding efficiency of a bitstream.

Each of these processing units (the octree decoding unit 221, the geometry data generation unit 222, and the arithmetic decoding unit 231 to the context selection unit 234) of the geometry decoding unit 201 has an arbitrary configuration. For example, each processing unit may be configured as a logic circuit for realizing the aforementioned processing. Further, each processing unit may include, for example, a CPU, a ROM, a RAM, and the like and execute a program using these components to realize the aforementioned processing. It goes without saying that each processing unit may have both the aforementioned configurations, realize parts of the aforementioned processing according to a logic circuit, and realize the other part of the processing by executing a program. The processing units may have independent configurations, for example, some processing units may realize parts of the aforementioned processing according to a logic circuit, some other processing units may realize the aforementioned processing by executing a program, and some other processing units may realize the aforementioned processing according to both a logic circuit and execution of a program.

<Flow of Decoding Processing>

The decoding device 200 decodes coded data by executing decoding processing. An example of the flow of this decoding processing will be described with reference to the flowchart of FIG. 20.

When decoding processing is started, the geometry decoding unit 201 performs geometry decoding processing in step S201 to decode coded data of geometry data and generate (restore) the geometry data. Details of this geometry decoding processing will be described later.

In step S202, the attribute decoding unit 202 decodes coded data of attribute data to generate (restore) the attribute data.

In step S203, the point cloud generation unit 203 generates point cloud data by associating the geometry data generated in step S201 with the attribute data generated in step S202.

When processing of step S203 ends, decoding processing ends.

<Flow of Geometry Decoding Processing>

Next, an example of the flow of geometry decoding processing executed in step S201 of FIG. 20 will be described with reference to the flowchart of FIG. 21.

When geometry decoding processing is started, the octree decoding unit 221 executes octree decoding processing in step S221 to decode coded data of geometry data (octree data) and constructs an octree. Details of octree decoding processing will be described later.

In step S222, the geometry data generation unit 222 generates geometry data using the octree constructed in step S221.

Figure 20:
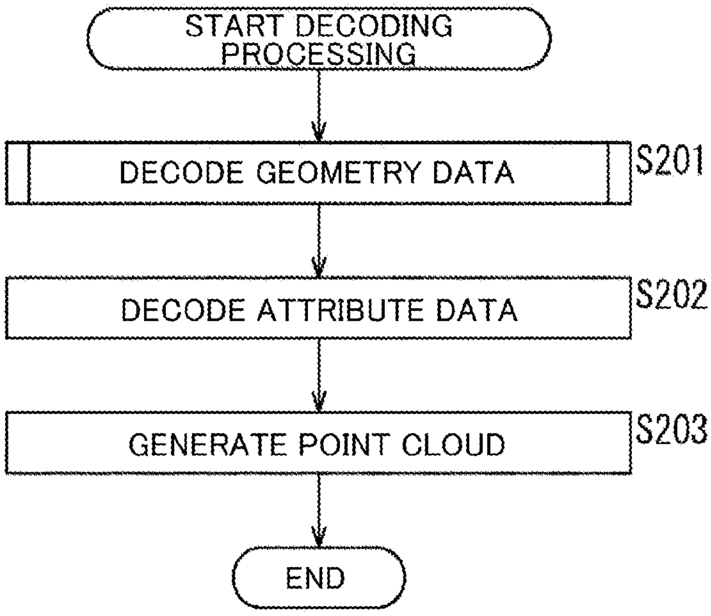
FIG. 20 is a flowchart for describing an example of a flow of decoding processing.

When processing of step S222 ends, geometry decoding processing ends and processing returns to FIG. 20.

<Flow of Octree Decoding Processing>

Next, an example of the flow of octree decoding processing executed in step S221 of FIG. 21 will be described with reference to the flowchart of FIG. 22.

When octree decoding processing is started, the octree decoding unit 221 acquires coded data of geometry data (octree data) for each look-ahead cube in step S241.

The octree decoding unit 221 selects a voxel (that is, a processing target region) that is an arithmetic decoding processing target in a look-ahead cube to be processed and extracts coded data of the processing target voxel.

In step S242, the arithmetic decoding unit 231 arithmetically decodes the coded data of the processing target region (processing target voxel) using a context and generates octree data of the processing target voxel (node). This decoding method corresponds to the coding method (for example, CABAC or the like) applied in step S145 of FIG. 16. If a context selected in step S247, which will be described later, is present, the arithmetic decoding unit 231 performs arithmetic decoding using this context.

In step S243, the octree construction unit 232 constructs (generates) an octree using the octree data of the processing target node generated in step S242 and octree data of another node decoded before that.

In step S244, the octree decoding unit 221 determines whether or not to end octree decoding processing. If there is an unprocessed point and it is determined that octree decoding processing does not end, processing proceeds to step S245.

In step S245, the neighboring pattern specifying unit 233 executes neighboring pattern specifying processing and specifies (detects) neighboring patterns of a voxel that is the next arithmetic decoding processing target using the decoded octree data (octree constructed by the octree construction unit 232 up to that time). At that time, the neighboring pattern specifying unit 132 applies "method 1" shown in the uppermost row of the table shown in FIG. 7 to specify the neighboring patterns by ternary representation. This neighboring pattern specifying processing is performed through basically the same flow on the coding side, that is, as described with reference to the flowchart of FIG. 17.

In step S246, the neighboring pattern specifying unit 233 aggregates the specified neighboring patterns. As in the case of the coding side, that is, as in the case of step S143 of FIG. 16, the neighboring pattern specifying unit 233 specifies which of the aggregated model patterns corresponds to the specified neighboring patterns.

In step S247, the context selection unit 234 selects a context corresponding to the neighboring patterns (aggregated neighboring patterns) specified in step S143 as a context used for arithmetic decoding of the next processing target voxel.

In step S248, the octree decoding unit 221 determines whether or not all points have been processed for the look-ahead cube to be processed. If it is determined that there are unprocessed points, processing returns to step S242 subsequent processing is repeated for new points to be processed.

That is, processing of step S242 to step S247 is executed for each voxel in the look-ahead cube to be processed. That is, the coded data of the octree data is decoded for each voxel (node).

If it is determined in step S248 that all points in the look-ahead cube to be processed have been processed, processing returns to step S241 subsequent processing is repeated for a new look-ahead cube to be processed.

That is, processing of step S241 to step S247 is executed for each look-ahead cube. That is, the coded data of the octree data is decoded for each voxel (node).

Figure 21:
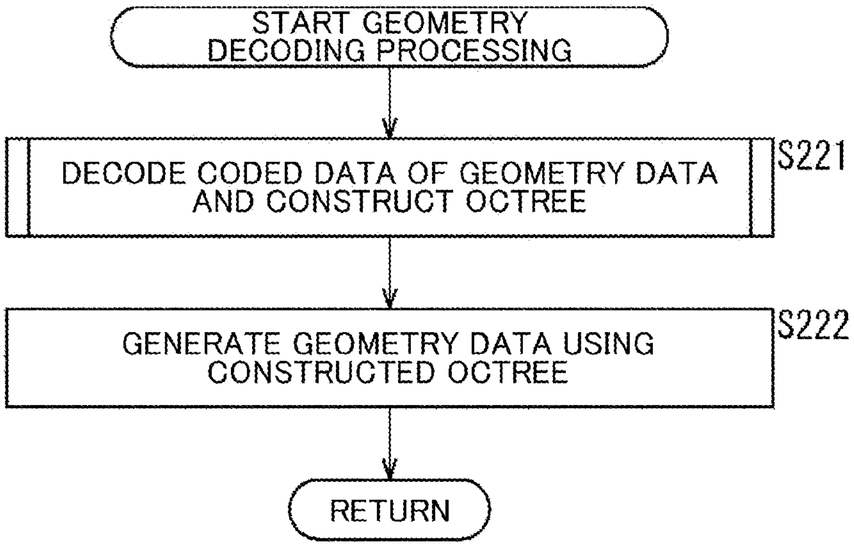
FIG. 21 is a flowchart for describing an example of a flow of geometry decoding processing.

If it is determined in step S244 that all points are processed in all look-ahead cubes and octree decoding processing ends, octree decoding processing ends and processing returns to FIG. 21.

As described above, the octree decoding unit 221 (geometry decoding unit 201) can apply the same context as in the case of coding by executing the processing and thus can correctly decode coded data by applying the present technology. That is, the octree decoding unit 221 (geometry decoding unit 201) can curb a decrease in coding efficiency of coded data of the geometry data (typically, improve coding efficiency). That is, the decoding device 200 can curb a decrease in the coding efficiency of a bitstream.

4. Third Embodiment

Modified Examples

In the coding device 100 described in the first embodiment and the decoding device 200 described in the second embodiment, the various present technologies described in <1. Ternary representation of neighboring patterns> can be applied. That is, methods other than the above-described "method 1" can also be applied.

<Applying to Eight Corners>

For example, "method 1-1-2" shown in the fourth row from the top of the table shown in FIG. 7 may be applied.

That is, in specifying of neighboring patterns, neighboring patterns in ternary representation ("method 1") may be applied to the eight corner regions of a look-ahead cube (regions adjacent to the corners of the look-ahead cube) and neighboring patterns in binary representation may be applied to other regions.

<Flow of Octree Coding Processing>

In such a case, the coding device 100 has the same configuration (FIG. 12) as that described in the first embodiment. Further, the geometry coding unit 101 has the same configuration (FIG. 13) as that described in the first embodiment.

The coding device 100 performs coding processing through the same flow as in the case described in the first embodiment (FIG. 14). Further, the geometry coding unit 101 performs geometry coding processing through the same flow as in the case described in the first embodiment (FIG. 15).

However, the octree coding unit 124 performs octree coding processing in the following flow. An example of the flow of octree coding processing in this case will be described with reference to the flowchart of FIG. 23.

Figure 16:
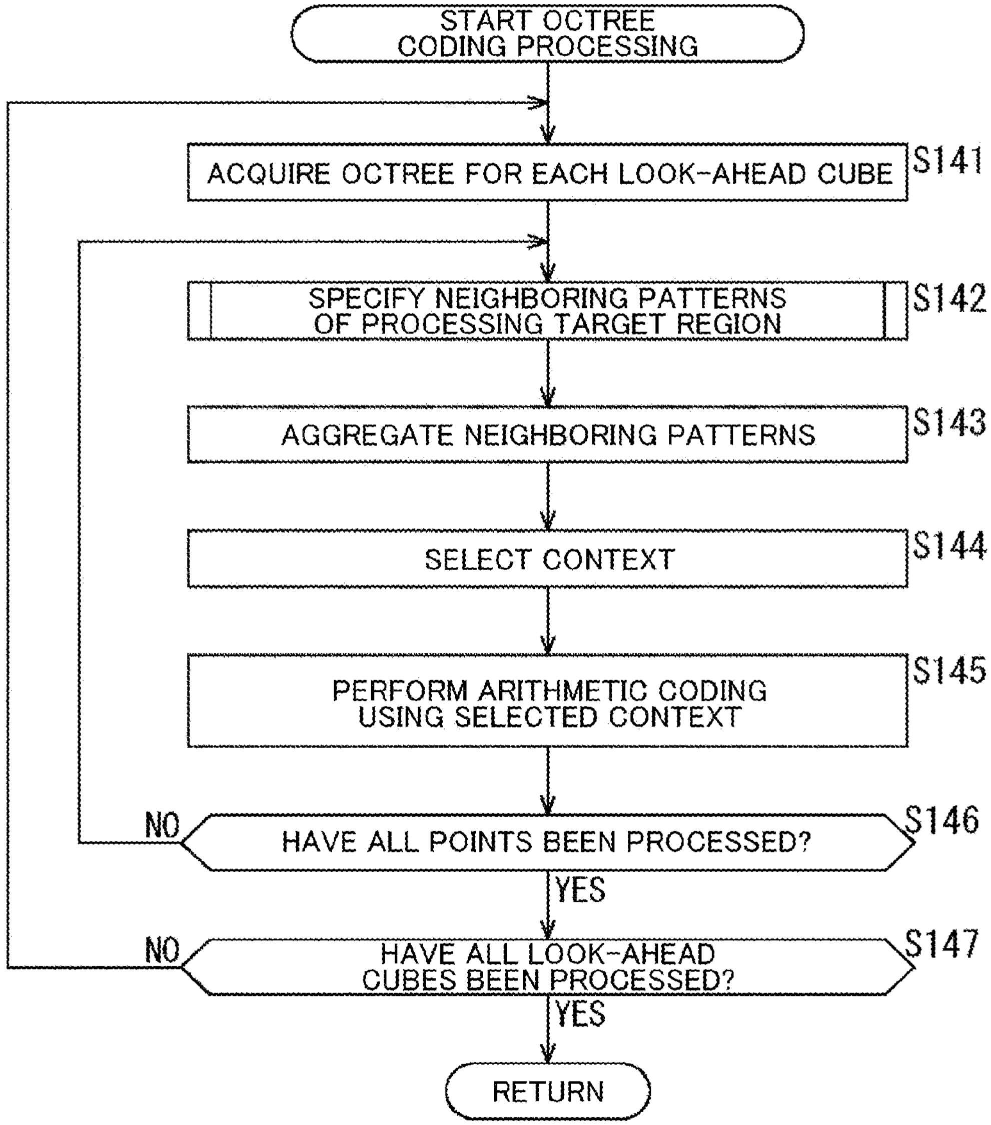
FIG. 16 is a flowchart for describing an example of an octree coding processing flow.
Figure 17:
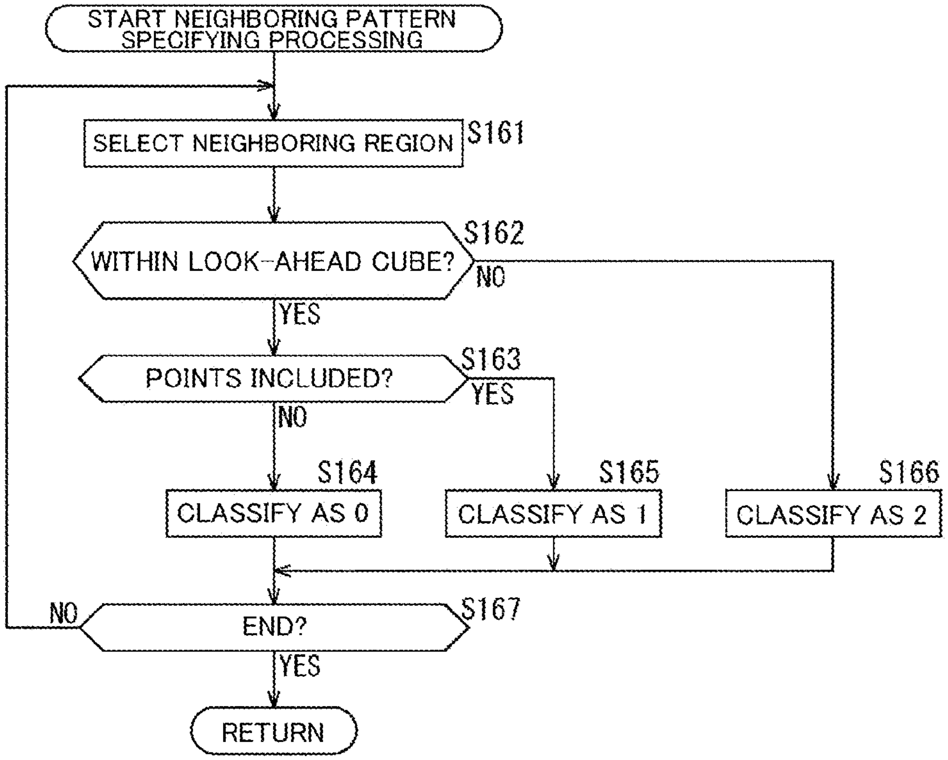
FIG. 17 is a flowchart for describing an example of a flow of neighboring pattern specifying processing.

In this case, the same processing as step S141 of FIG. 16 is executed in step S301.

In step S302, the neighboring pattern specifying unit 132 determines whether or not a processing target region is a region at the eight corners of a look-ahead cube (a region adjacent to a corner of the look-ahead cube) on the basis of a processing order, geometry data, and the like. If it is determined that a voxel to be processed is a voxel adjacent to a corners of the look-ahead cube, processing proceeds to step S303.

In step S303, the neighboring pattern specifying unit 132 executes neighboring pattern specifying processing to specify (detect) neighboring patterns with respect to the voxel to be processed. In this case, the neighboring pattern specifying unit 132 applies "method 1" shown in the uppermost row of the table shown in FIG. 7 to specify the neighboring patterns in ternary representation. That is, this neighboring pattern specifying processing is performed through the same flow as in the case described with reference to the flowchart of FIG. 17. That is, the same processing as step S142 of FIG. 16 is executed in step S303.

When processing of step S303 ends, processing proceeds to step S305.

If it is determined in step S302 that the voxel to be processed is a voxel that is not adjacent to a corner of the look-ahead cube, processing proceeds to step S304.

In step S304, the neighboring pattern specifying unit 132 executes neighboring pattern specifying processing to specify (detect) neighboring patterns with respect to the voxel to be processed. In this case, the neighboring pattern specifying unit 132 specifies the neighboring patterns by binary representation in the same manner as the method described in NPL 2 and NPL 3 without applying "method 1" shown in the uppermost row of the table shown in FIG. 7. Details of neighboring pattern specifying processing in this case will be described later.

When processing of step S304 ends, processing proceeds to step S305.

In steps S305 to S309, the same processing as steps S143 to S147 of FIG. 16 is executed.

If it is determined in step S309 that octree coding processing ends, octree coding processing ends and processing returns to FIG. 15.

<Flow of Neighboring Pattern Specifying Processing>

Figure 23:
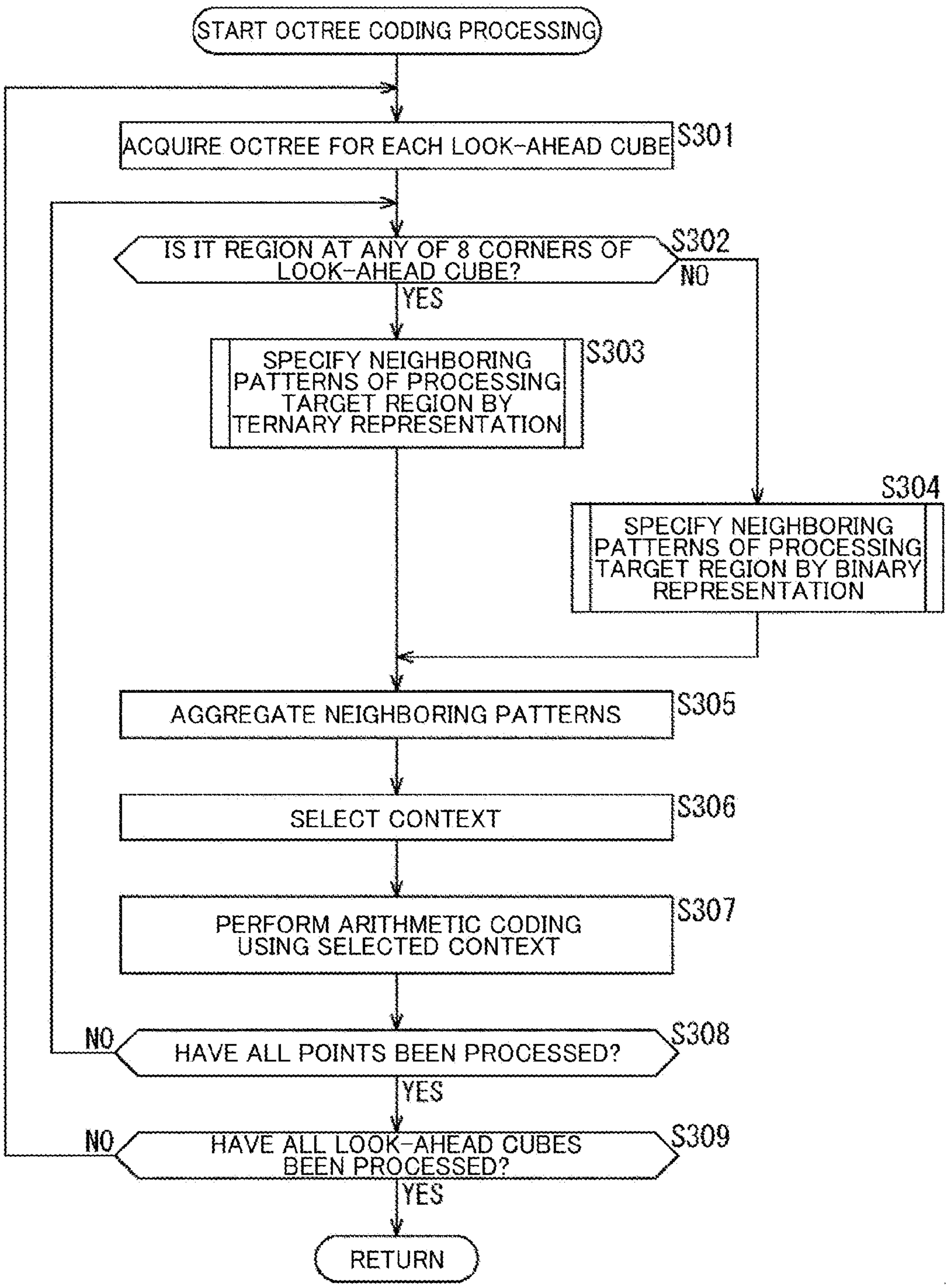
FIG. 23 is a flowchart for describing an example of a flow of octree coding processing.
Figure 24:
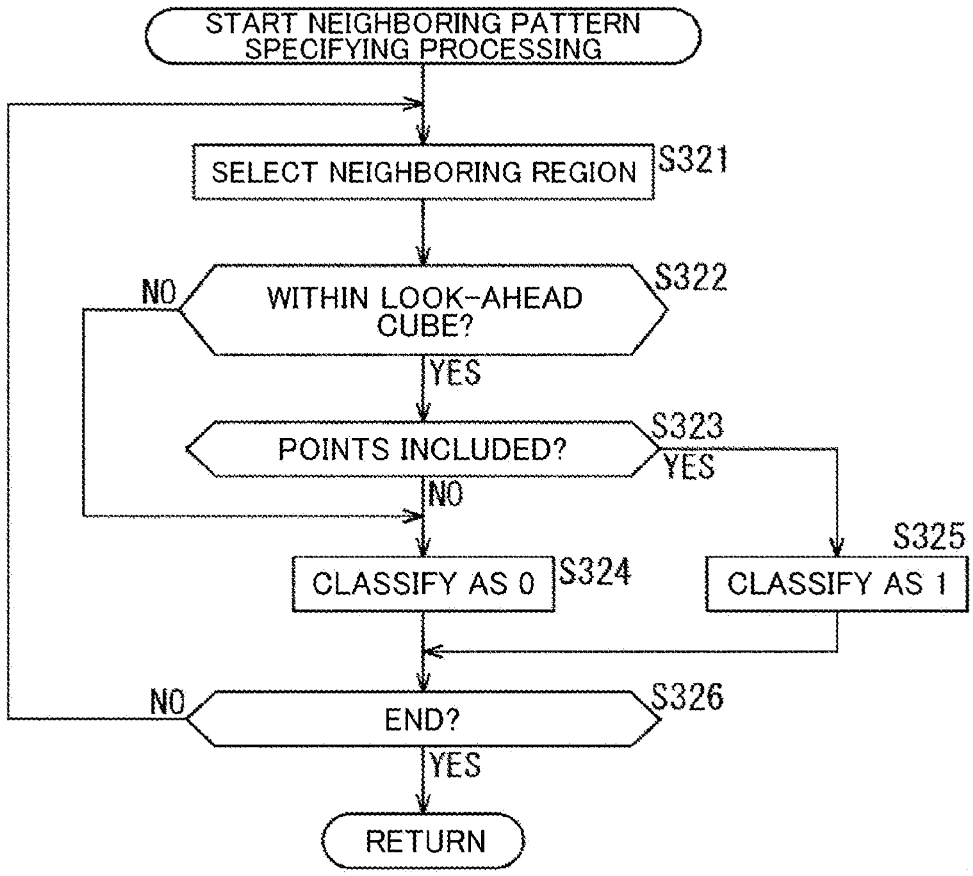
FIG. 24 is a flowchart for describing an example of a flow of neighboring pattern specifying processing.

Next, the flow of neighboring pattern specifying processing executed in step S304 of FIG. 23 will be described with reference to the flowchart of FIG. 24.

When neighboring pattern specifying processing is started, the neighboring pattern specifying unit 132 selects any of neighboring regions of a processing target region (any of voxels adjacent to a voxel to be processed) as in the case of step S161 in step S321. The neighboring pattern specifying unit 132 appropriately executes processing of steps S322 to S326 for the neighboring region.

In step S322, the neighboring pattern specifying unit 132 determines whether or not the neighboring region selected in step S321 is positioned within a look-ahead cube to be processed (a look-ahead cube to which the processing target region belongs) as in the case of step S162.

If it is determined that the neighboring region is positioned within the look-ahead cube to be processed, processing proceeds to step S323.

In step S323, the neighboring pattern specifying unit 132 determines whether or not the neighboring region includes points on the basis of geometry data (octree data) as in the case of step S163. If it is determined that the neighboring region does not include points, processing proceeds to step S324.

If it is determined in step S322 that the neighboring region is positioned outside the look-ahead cube to be processed, processing proceeds to step S324.

In step S324, the neighboring pattern specifying unit 132 classifies the neighboring region as a value "0" indicating that the neighboring region does not include points (sets the value "0" for the neighboring region) as in the case of step S164. When processing of step S324 ends, processing proceeds to step S326.

If it is determined in step S323 that the neighboring region includes points, processing proceeds to step S325.

In step S325, the neighboring pattern specifying unit 132 classifies the neighboring region as a value "1" indicating that the neighboring region includes points (sets the value "1" for the neighboring region) as in the case of step S165. When processing of step S325 ends, processing proceeds to step S326.

In step S326, the neighboring pattern specifying unit 132 determines whether or not to end neighboring pattern specifying processing as in the case of step S167. If there are unprocessed neighboring regions (neighboring regions for which no value is set) and it is determined that neighboring pattern specifying processing does not end, processing returns to step S321 and subsequent processing is repeated.

That is, any of the unprocessed neighboring regions is newly selected in step S321 and processing of steps S321 to S326 is executed as necessary for the newly selected neighboring region.

When processing of steps S321 to S326 is appropriately executed for each neighboring region and all the neighboring regions are processed, neighboring patterns of the processing target region are specified in step S326 and it is determined that neighboring pattern specifying processing ends. In that case, neighboring pattern specifying processing ends and processing returns to FIG. 23.

As described above, the neighboring pattern specifying unit 132 can specify neighboring patterns by binary representation by executing this neighboring pattern specifying processing. Accordingly, it is possible to curb an increase in memory usage.

Further, the octree coding unit 124 (geometry coding unit 101) can apply "method 1" only to voxels adjacent to corners (voxels at eight corners) by executing octree coding processing as described above. Accordingly, the coding device 100 can apply "method 1" to regions (voxels adjacent to corners) in which coding efficiency reduction can be further curbed and can curb an increase in memory usage with respect to other regions.

In neighboring pattern specifying processing, it may be collectively determined whether all neighboring regions are positioned within a look-ahead cube to be processed by obtaining the position of a processing target region (a voxel to be processed) in the look-ahead cube, as described above.

In that case, processing of step S324 may be performed on a neighboring region determined to be positioned outside the look-ahead cube to be processed, and processing of steps S323 to S325 may be appropriately performed on a neighboring region determined to be positioned within the look-ahead cube to be processed.

<Flow of Octree Decoding Processing>

Further, in this case, the decoding device 200 has the same configuration (FIG. 18) as that described in the second embodiment. Further, the geometry decoding unit 201 has the same configuration (FIG. 19) as that described in the second embodiment.

The decoding device 200 performs decoding processing through the same flow as in the case described in the second embodiment (FIG. 20). Further, the geometry decoding unit 201 performs geometry decoding processing through the same flow as in the case described in the second embodiment (FIG. 21).

Figure 25:
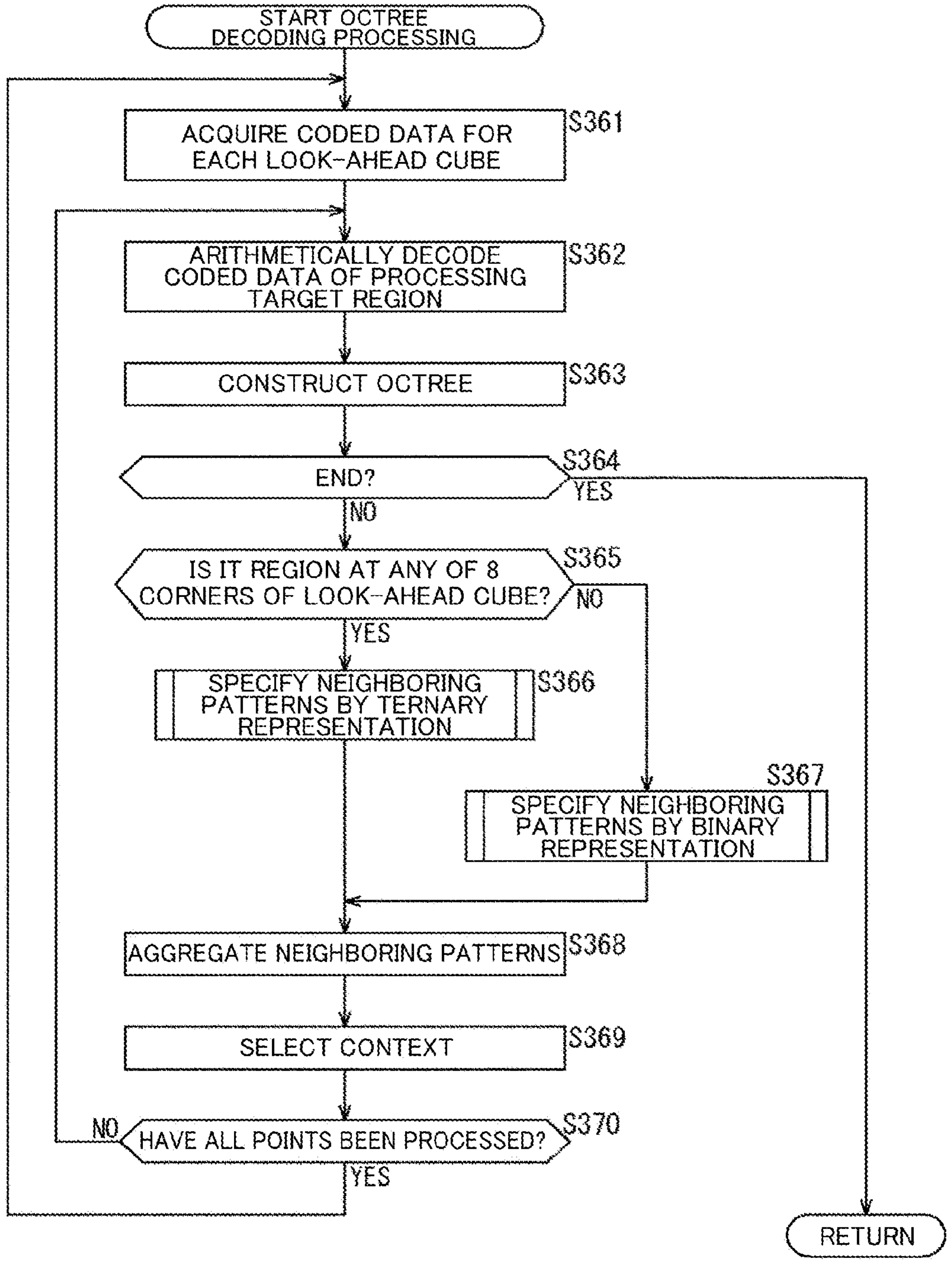
FIG. 25 is a flowchart for describing an example of a flow of octree decoding processing.

However, the octree decoding unit 221 performs octree decoding processing in the following flow. An example of the flow of octree decoding processing in this case will be described with reference to the flowchart of FIG. 25.

Figure 22:
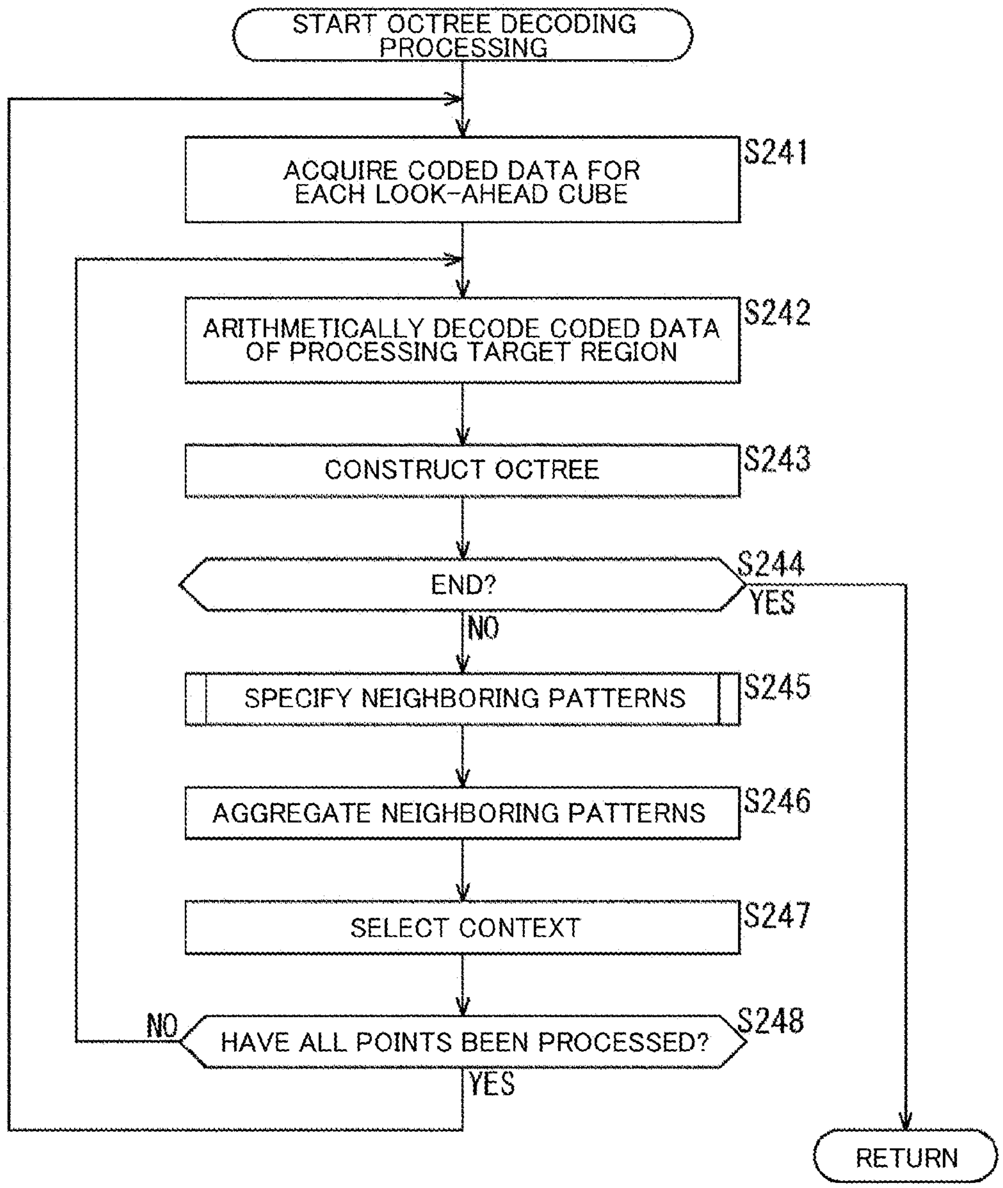
FIG. 22 is a flowchart for describing an example of a flow of octree decoding processing.

In this case, in steps S361 to S364, the same processing as steps S241 to S244 of FIG. 22 is executed.

In step S365, the neighboring pattern specifying unit 233 determines whether or not a processing target region is a region at the eight corners of a look-ahead cube (a region adjacent to a corner of the look-ahead cube) on the basis of a processing order, geometry data, and the like. If it is determined that a voxel to be processed is a voxel adjacent to a corners of the look-ahead cube, processing proceeds to step S366.

In step S366, the neighboring pattern specifying unit 233 executes neighboring pattern specifying processing to specify (detect) neighboring patterns with respect to the voxel to be processed. In this case, the neighboring pattern specifying unit 233 applies "method 1" shown in the uppermost row of the table shown in FIG. 7 to specify the neighboring patterns in ternary representation. That is, this neighboring pattern specifying processing is performed through the same flow as in the case described with reference to the flowchart of FIG. 17. That is, the same processing as step S245 of FIG. 22 is executed in step S366.

When processing of step S366 ends, processing proceeds to step S368.

If it is determined in step S365 that the voxel to be processed is a voxel that is not adjacent to a corner of the look-ahead cube, processing proceeds to step S367.

In step S367, the neighboring pattern specifying unit 233 executes neighboring pattern specifying processing to specify (detect) neighboring patterns with respect to the voxel to be processed. In this case, the neighboring pattern specifying unit 233 specifies the neighboring patterns by binary representation in the same manner as the method described in NPL 2 and NPL 3 without applying "method 1" shown in the uppermost row of the table shown in FIG. 7. That is, this neighboring pattern specifying processing is performed through the same flow as in the case described with reference to the flowchart of FIG. 24.

When processing of step S367 ends, processing proceeds to step S368.

In steps S368 to S370, the same processing as steps S246 to S248 of FIG. 22 is executed.

If it is determined in step S364 that octree decoding processing ends, octree decoding processing ends and processing returns to FIG. 21.

As described above, the octree decoding unit 221 (geometry decoding unit 201) can apply "method 1" only to voxels adjacent to corners (voxels at eight corners) by executing octree decoding processing. Accordingly, the coding device 100 can apply "method 1" to regions (voxels adjacent to corners) in which coding efficiency reduction can be further curbed and can curb an increase in memory usage with respect to other regions.

<Applying to Boundary Adjacency>

Similarly, "method 1-1-1" shown in the third row from the top of the table shown in FIG. 7 may be applied. That is, in specifying of neighboring patterns, neighboring patterns in ternary representation ("method 1") may be applied to regions adjacent to the boundary of a look-ahead cube and neighboring patterns in binary representation may be applied to other regions.

In that case, the coding device 100 has the same configuration (FIG. 12 and FIG. 13) as in the case of applying "method 1-1-2" and may execute coding processing (FIG. 14), geometry coding processing (FIG. 15), octree coding processing (FIG. 23), neighboring pattern specifying processing (FIG. 17 and FIG. 24), and the like through basically the same flow.

However, in step S302 of octree coding processing (FIG. 23), the neighboring pattern specifying unit 132 may determine whether or not a processing target region is a region adjacent to the boundary of a look-ahead cube on the basis of a processing order, geometry data, and the like. Then, processing of step S303 may be executed if the processing target region is a region adjacent to the boundary of the look-ahead cube, and processing of step S304 may be executed if the processing target region is not a region adjacent to the boundary of the look-ahead cube.

As described above, the coding device 100 can apply "method 1" only to voxels adjacent to the boundary of a look-ahead cube by executing the processing. Accordingly, the coding device 100 can apply "method 1" to regions in which coding efficiency reduction can be curbed and can curb an increase in memory usage with respect to the other regions.

Further, the decoding device 200 has the same configuration (FIG. 18 and FIG. 19) as in the case of applying "method 1-1-2" and may execute coding processing (FIG. 20), geometry coding processing (FIG. 21), octree coding processing (FIG. 25), neighboring pattern specifying processing (FIG. 17 and FIG. 24), and the like through basically the same flow.

However, in step S365 of octree decoding processing (FIG. 25), the neighboring pattern specifying unit 233 may determine whether or not a processing target region is a region adjacent to the boundary of a look-ahead cube on the basis of a processing order, geometry data, and the like. Then, processing of step S366 may be executed if the processing target region is a region adjacent to the boundary of the look-ahead cube, and processing of step S367 may be executed if the processing target region is not a region adjacent to the boundary of the look-ahead cube.

As described above, the decoding device 200 can apply "method 1" only to voxels adjacent to the boundary of a look-ahead cube by executing the processing. Accordingly, the decoding device 200 can apply "method 1" to regions in which coding efficiency reduction can be curbed and can curb an increase in memory usage with respect to other regions.

<Partial Application of Ternary Representation>

Similarly, as in "method 1-1" shown in the second row from the top of the table shown in FIG. 7, the above-mentioned "method 1" may be applied to some regions. By doing so, it is possible to curb an increase in unnecessary memory usage and curb an increase in processing load.

<Control Flags>

Further, "method 1-2" shown in the fifth row from the top of the table shown in FIG. 7 may be applied, for example. That is, a control flag relating to application of "method 1" (specifying of neighboring patterns in ternary representation) may be transmitted.

For example, the coding device 100 may generate control information for controlling specifying of neighboring patterns in ternary representation, include the control information in a bitstream, and transmit the bitstream including the control information. Then, the decoding device 200 may acquire the transmitted control information and specify neighboring patterns in ternary representation according to the control information.

<Geometry Coding Unit>

In such a case, the coding device 100 has the same configuration (FIG. 12) as that described in the first embodiment.

Figure 26:
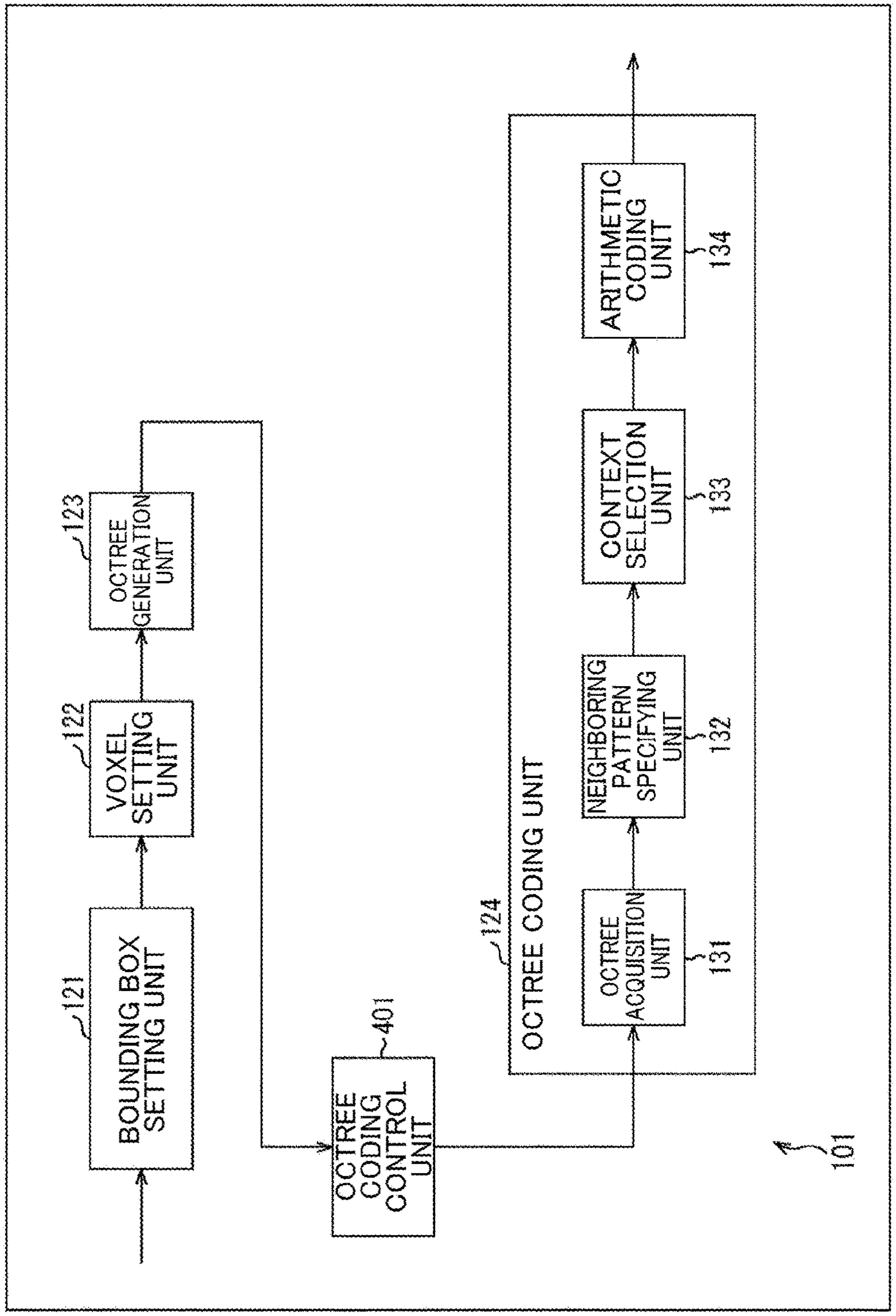
FIG. 26 is a block diagram showing an example of major components of a geometry coding unit.

FIG. 26 is a block diagram showing an example of major components of the geometry coding unit 101 (FIG. 12) in this case. As shown in FIG. 26, the geometry coding unit 101 in this case includes an octree coding control unit 401 in addition to the components shown in FIG. 13.

The octree coding control unit 401 controls specifying of neighboring patterns performed in the octree coding unit 124. For example, the octree coding control unit 401 acquires octree data supplied from the octree generation unit 123 and supplies it to the octree coding unit 124. Further, the octree coding control unit 401 generates control information (control flag) for controlling processing related to specifying of neighboring patterns performed on the octree data and supplies the control information (control flag) to the octree coding unit 124.

This control information may be any control information as long as it relates to specifying of neighboring patterns. For example, by applying "method 1-2-1" shown in the sixth row from the top of the table shown in FIG. 7, the octree coding control unit 401 may generate out_of_bounds_flag described above in <Ternary use flag>.

Further, by applying "method 1-2-2" shown in the seventh row from the top of the table shown in FIG. 7, for example, the octree coding control unit 401 may transmit out_of_bounds_enabled_flag described above in <Ternary permission flag>.

The octree coding unit 124 specifies neighboring patterns according to the control information. Further, the arithmetic coding unit 134 includes this control information in coded data of geometry data and supplies it to the bitstream generation unit 105 and the geometry decoding unit 102. The bitstream generation unit 105 includes the control information in a bitstream and transmits it to the decoding side.

By applying such control information, the coding device 100 can realize a wider variety of methods with respect to specifying of neighboring patterns in ternary representation, for example, as described above in <Control flags>, <Ternary use flag>, <Ternary permission flag>, and the like of <1. Ternary representation of neighboring patterns>.

<Flow of Geometry Coding Processing>

The coding device 100 performs coding processing through the same flow as in the case described in the first embodiment (FIG. 14). Further, the geometry coding unit 101 performs geometry coding processing in the following flow. An example of the flow of geometry coding processing in this case will be described with reference to the flowchart of FIG. 27.

In this case, when geometry coding processing is started, the same processing as steps S121 to S123 of FIG. 15 is executed in steps S401 to S403.

In step S404, the octree coding control unit 401 generates control flags related to specifying of neighboring patterns (for example, out_of_bounds_enabled_flag, out_of_bounds_flag, etc.) for each predetermined data unit.

In step S405, the octree coding unit 124 executes octree coding processing, codes an octree generated in step S403 according to the control flags generated in step S404, and generates coded data of geometry data. Details of this octree coding processing will be described later.

When processing of step S405 ends, geometry coding processing ends and processing returns to FIG. 14.

<Flow of Octree Coding Processing>

Next, an example of the flow of octree coding processing executed in step S405 of FIG. 27 will be described with reference to the flowcharts of FIG. 28 and FIG. 29.

Figure 28:
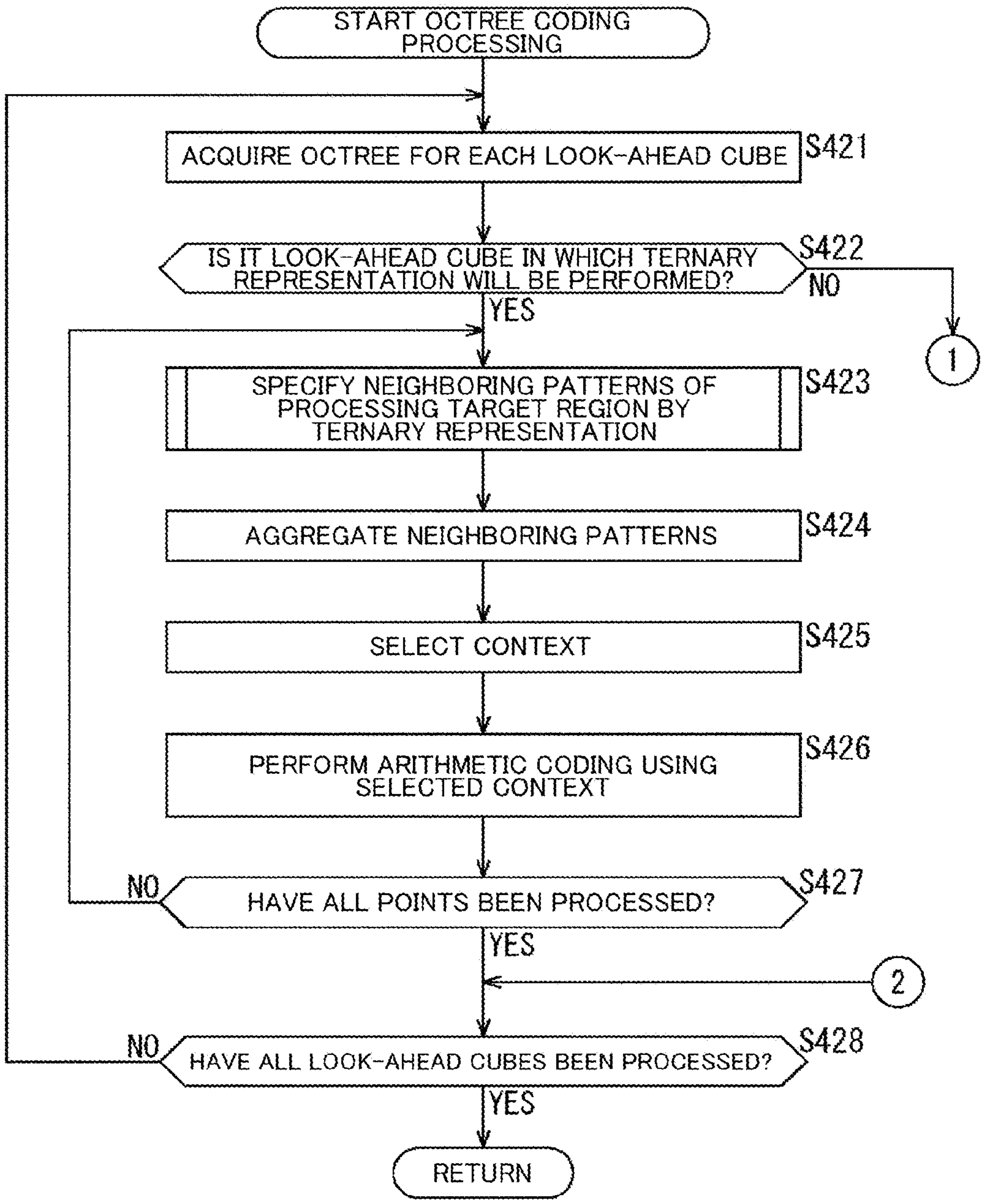
FIG. 28 is a flowchart for describing an example of a flow of octree coding processing.

When octree coding processing is started, the same processing as step S141 of FIG. 16 is executed in step S421 of FIG. 28.

Figure 27:
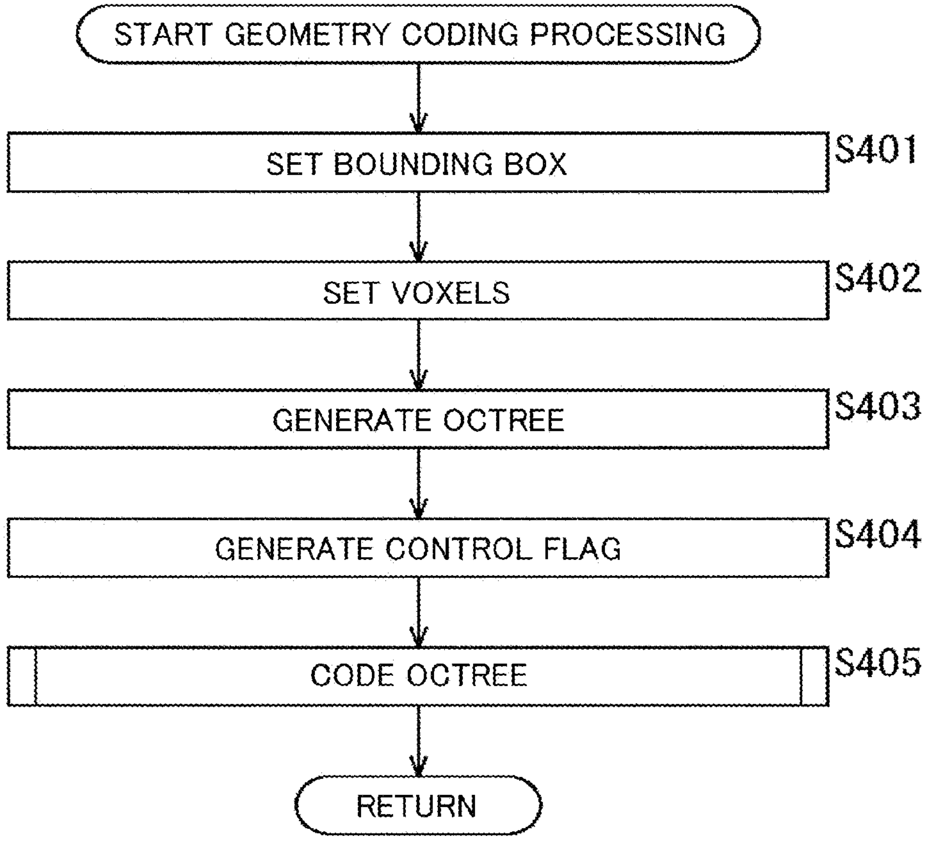
FIG. 27 is a flowchart for describing an example of a flow of geometry coding processing.

In step S422, the neighboring pattern specifying unit 132 determines whether or not a look-ahead cube to be processed is a look-ahead cube that specifies a neighboring pattern by ternary representation on the basis of the control flags generated in step S404 of FIG. 27.

For example, if out_of_bounds_flag is true and it is determined that the look-ahead cube to be processed is a look-ahead cube that specifies a neighboring pattern by ternary representation, processing proceeds to step S423.

In steps S423 to S428, the same processing as steps S142 to S147 of FIG. 16 is executed. That is, in step S423, neighboring pattern specifying processing is performed through the same flow as in the case described with reference to the flowchart of FIG. 17. That is, in this case, a neighboring pattern is specified by ternary representation, a context is selected on the basis of the neighboring pattern in ternary representation, and arithmetic coding is performed using the context.

Figure 29:
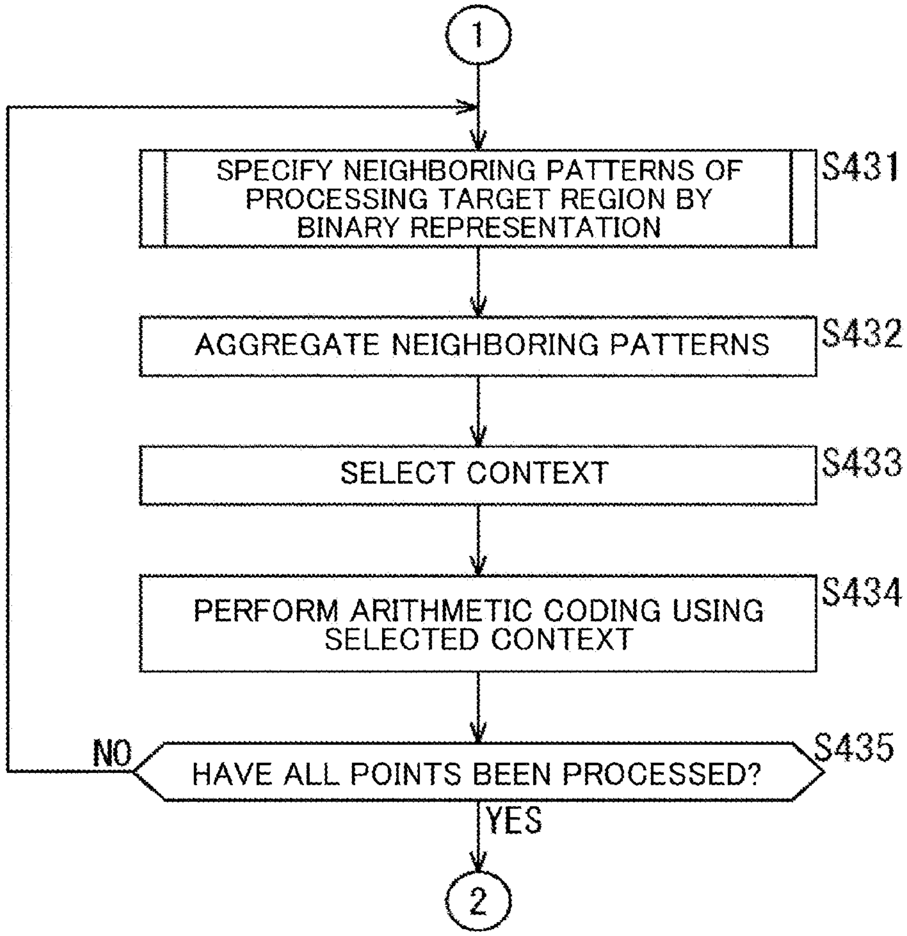
FIG. 29 is a flowchart for describing an example of the flow of octree coding processing subsequently to FIG. 28.

Further, if out_of_bounds_flag or out_of_bounds_enabled_flag is false, and it is determined that the look-ahead cube to be processed is not a look-ahead cube that specifies the neighboring pattern by ternary representation, for example, in step S422, processing proceeds to FIG. 29.

In step S431 of FIG. 29, the neighboring pattern specifying unit 132 executes neighboring pattern specifying processing to specify (detect) neighboring patterns for a voxel to be processed. In this case, the neighboring pattern specifying unit 132 specifies the neighboring patterns by binary representation in the same manner as the method described in NPL 2 and NPL 3 without applying "method 1" shown in the uppermost row of the table shown in FIG. 7. That is, this neighboring pattern specifying processing is performed through the same flow as in the case described with reference to the flowchart of FIG. 24.

When the neighboring patterns are specified by binary representation, the same processing as steps S424 to S427 is executed in steps S432 to S435. That is, the contents of these types of processing are the same as those in steps S142 to S146 of FIG. 16 except that the neighboring patterns are represented in binary representation. That is, in this case, a context is selected on the basis of the neighboring patterns in binary representation, and arithmetic coding is performed using the context.

If it is determined in step S435 that all points have been processed for the look-ahead cube to be processed, processing returns to step S428 in FIG. 28.

By executing processing as described above, the octree coding unit 124 (geometry coding unit 101) can specify neighboring patterns on the basis of control information. Accordingly, the coding device 100 can realize control of a wider variety of methods with respect to specifying of neighboring patterns by ternary representation.

<Geometry Decoding Unit>

Further, in this case, the decoding device 200 has the same configuration (FIG. 12) as that described in the second embodiment.

Figure 30:
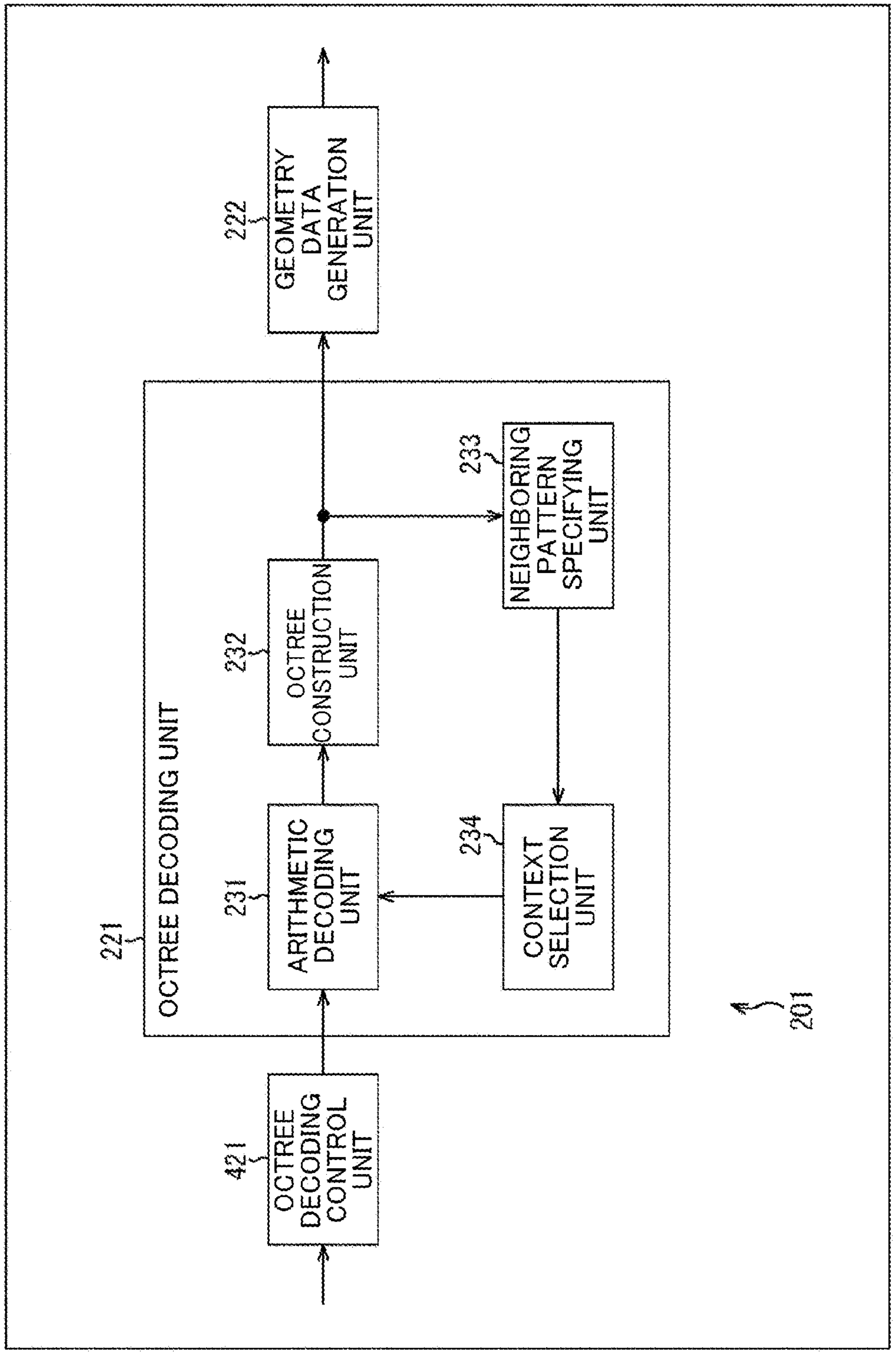
FIG. 30 is a block diagram showing an example of major components of a geometry decoding unit.

FIG. 30 is a block diagram showing an example of major components of the geometry decoding unit 201 (FIG. 19) in this case. As shown in FIG. 30, the geometry decoding unit 201 in this case includes an octree decoding control unit 421 in addition to the components shown in FIG. 19.

The octree decoding control unit 421 acquires coded data of geometry data included in a bitstream and supplies it to the octree decoding unit 221. Further, the octree decoding control unit 421 acquires control information related to specifying of neighboring patterns included in the bitstream and transmitted from the coding side and supplies it to the octree decoding unit 221.

The octree decoding unit 221 decodes the coded data on the basis of the control information. That is, the neighboring pattern specifying unit 233 specifies neighboring patterns according to the control information.

By applying such control information, the decoding device 200 can realize control by a wider variety of methods with respect to specifying of neighboring patterns by ternary representation, for example, as described above in <Control flag>, <Ternary use flag>, <Ternary permission flag>, and the like of <1. Ternary representation of neighboring patterns>.

<Flow of Geometry Decoding Processing>

The decoding device 200 performs decoding processing through the same flow as in the case described in the second embodiment (FIG. 20). Further, the geometry decoding unit 201 performs geometry decoding processing through the following flow. An example of the flow of geometry decoding processing in this case will be described with reference to the flowchart of FIG. 31.

In this case, when geometry decoding processing is started, the octree decoding control unit 421 acquires a control flag from a supplied bitstream (coded data of geometry data included in the bitstream) in step S451.

In step S452, the octree decoding unit 221 executes octree decoding processing, decodes the coded data of the geometry data (octree data), and constructs an octree. In this case, the octree decoding unit 221 specifies neighboring patterns according to the control flag acquired in step S451 in octree decoding processing. Details of octree decoding processing in this case will be described later.

In step S453, the same processing as step S222 of FIG. 21 is executed.

When processing of step S453 ends, geometry coding processing ends and processing returns to FIG. 20.

<Flow of Octree Decoding Processing>

Next, an example of the flow of octree decoding processing executed in step S452 of FIG. 31 will be described with reference to the flowcharts of FIG. 32 and FIG. 33.

Figure 32:
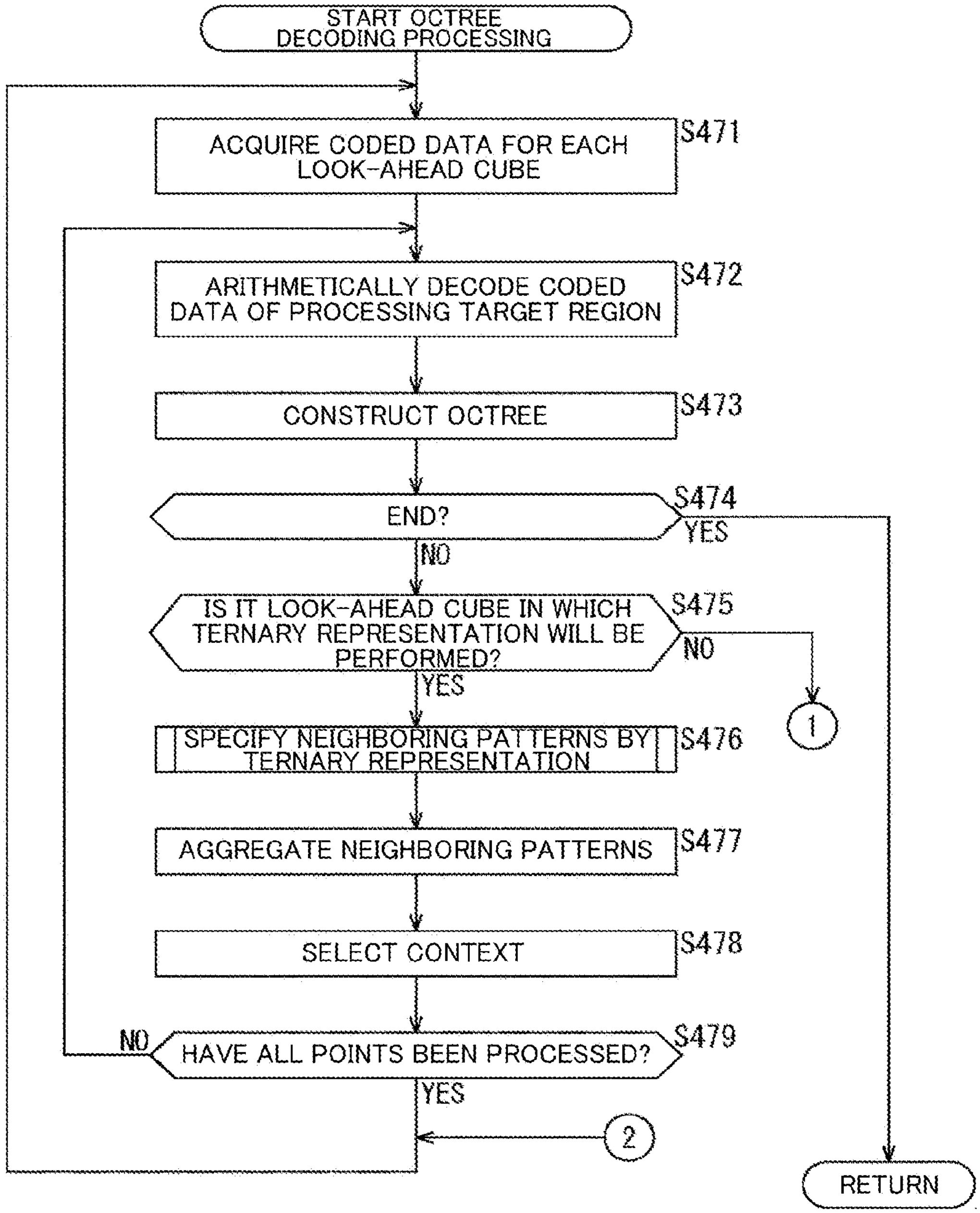
FIG. 32 is a flowchart for describing an example of a flow of octree decoding processing.

When octree decoding processing is started, the same processing as steps S241 to S244 of FIG. 22 is executed in steps S471 to S474 of FIG. 32.

Figure 31:
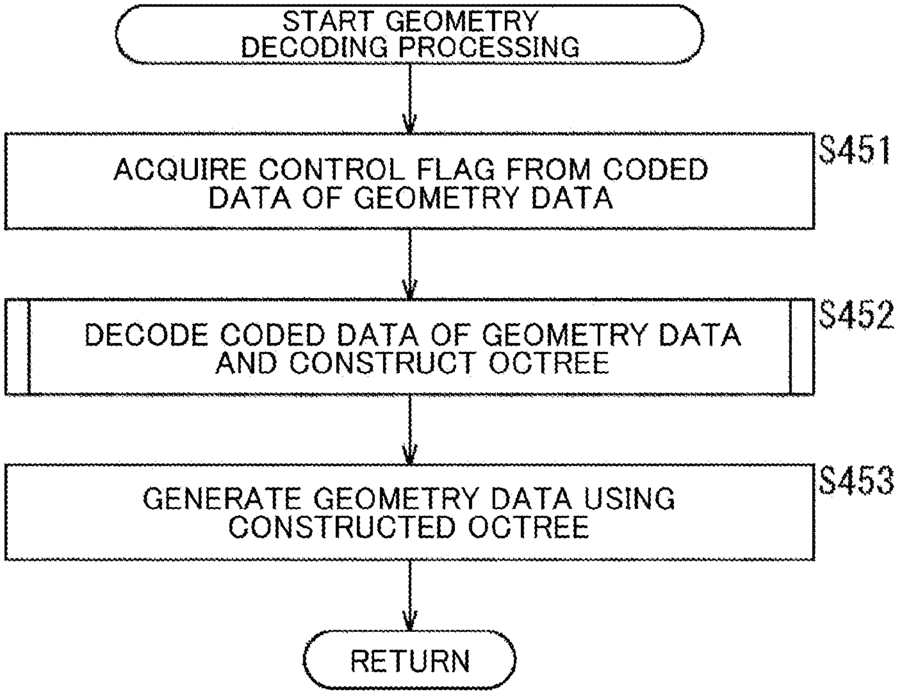
FIG. 31 is a flowchart for describing an example of a flow of geometry decoding processing.

In step S475, the neighboring pattern specifying unit 233 determines whether or not a look-ahead cube to be processed is a look-ahead cube that specifies a neighboring pattern by ternary representation on the basis of the control flag acquired in step S451 of FIG. 31.

For example, if out_of_bounds_flag is true and it is determined that the look-ahead cube to be processed is a look-ahead cube that specifies a neighboring pattern by ternary representation, processing proceeds to step S476.

In steps S476 to S479, the same processing as steps S245 to S248 of FIG. 22 is executed. That is, in step S476, neighboring pattern specifying processing is performed through the same flow as in the case described with reference to the flowchart of FIG. 17. That is, in this case, neighboring patterns are specified by ternary representation, and a context is selected on the basis of the neighboring patterns in ternary representation. Then, arithmetic coding is performed using the context in step S472.

Figure 33:
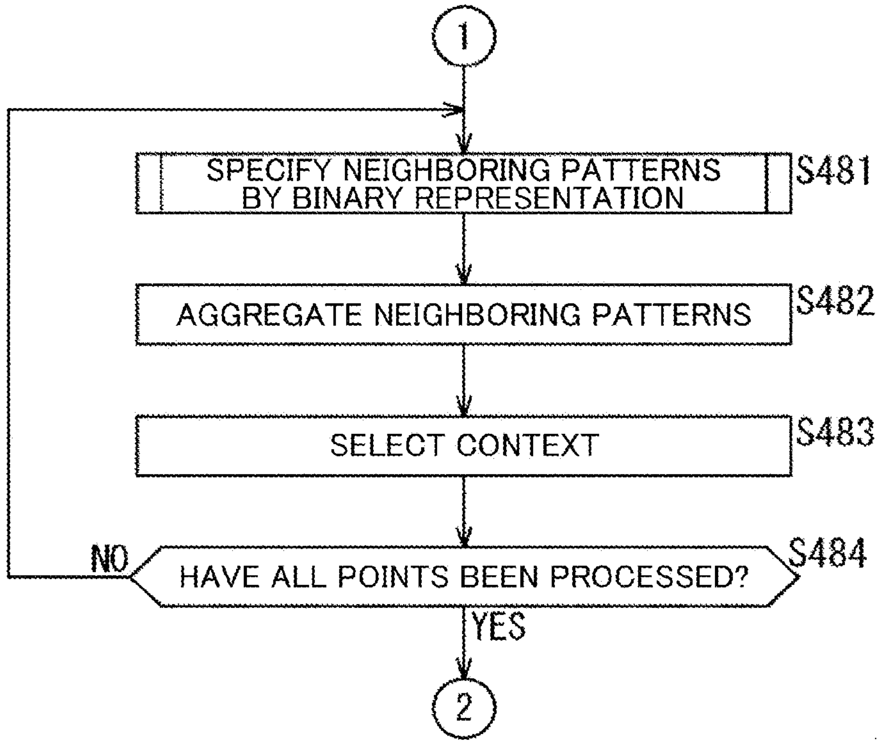
FIG. 33 is a flowchart for describing an example of the flow of octree decoding processing subsequently to FIG. 32.

Further, if out_of_bounds_flag or out_of_bounds_enabled_flag is false, and it is determined that the look-ahead cube to be processed is not a look-ahead cube that specifies the neighboring pattern by ternary representation, for example, in step S475, processing proceeds to FIG. 33.

In step S481 of FIG. 33, the neighboring pattern specifying unit 233 executes neighboring pattern specifying processing to specify (detect) neighboring patterns for a voxel to be processed. In this case, the neighboring pattern specifying unit 233 specifies the neighboring patterns by binary representation in the same manner as the method described in NPL 2 and NPL 3 without applying "method 1" shown in the uppermost row of the table shown in FIG. 7. That is, this neighboring pattern specifying processing is performed through the same flow as in the case described with reference to the flowchart of FIG. 24.

When the neighboring patterns are specified by binary representation, the same processing as steps S477 to S479 is executed in steps S482 to S484. That is, the contents of these types of processing are the same as those in steps S246 to S248 of FIG. 22 except that the neighboring patterns are represented in binary representation. That is, in this case, a context is selected on the basis of the neighboring patterns in binary representation, and arithmetic coding is performed using the context.

If it is determined in step S484 that all points have been processed for the look-ahead cube to be processed, processing returns to step S471 in FIG. 32.

By executing processing as described above, the octree decoding unit 221 (geometry decoding unit 201) can specify neighboring patterns on the basis of control information. Accordingly, the decoding device 200 can realize control of a wider variety of methods with respect to specifying of neighboring patterns in ternary representation.

<Identification Outside Bounding Box>

Further, "method 1-3" shown in the eighth row from the top of the table shown in FIG. 7 may be applied, for example. That is, it may be possible to identify whether or not neighboring voxels are positioned in a bounding box.

For example, in specifying of neighboring patterns in the coding device 100 and the decoding device 200, a neighboring region positioned outside the entire area may be regarded as a first region that does not include points.

By doing so, it is possible to apply a context that is more suitable for actual neighboring patterns, and thus it is possible to curb coding efficiency reduction (typically, improve coding efficiency).

For example, "method 1-3-1" shown in the ninth row from the top of the table shown in FIG. 7 may be applied, and it may be assumed that there are no points in neighboring voxels positioned outside a bounding box.

By doing so, in specifying of neighboring patterns in ternary representation, it is possible to distinguish between a case where neighboring voxels are positioned within another look-ahead cube and a case where they are positioned outside a bounding box. As a result, it is possible to apply a context that is more suitable for actual neighboring patterns while curbing an increase in memory usage.

Further, in specifying of neighboring patterns, "method 1-3-2" shown in the tenth row from the top of the table shown in FIG. 7 may be applied to set a value, which is different from a value set for neighboring region positioned inside a bounding box, for neighboring regions positioned outside the bounding box.

By doing so, it is possible to apply a context that is more suitable for actual neighboring patterns.

<Flow of Neighboring Pattern Specifying Processing>

With respect to a case where it is identified whether or not neighboring voxels are positioned inside a bounding box, an example of a case where neighboring voxels positioned outside the bounding box are assumed to include no points will be described ("method 1-3-1").

In this case, the neighboring pattern specifying unit 132 (neighboring pattern specifying unit 233) performs neighboring pattern specifying processing through the following flow instead of performing neighboring pattern specifying processing through the flow described with reference to the flowchart of FIG. 17.

Figure 34:
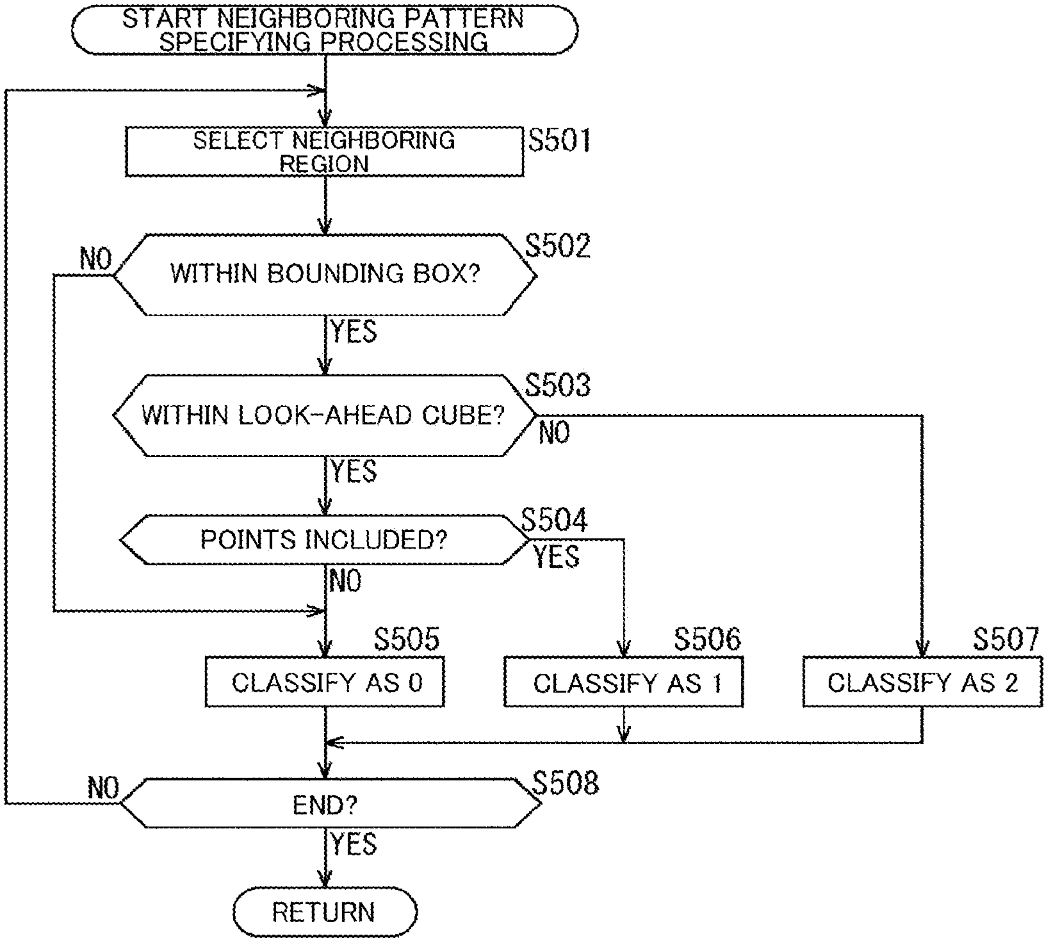
FIG. 34 is a flowchart for describing an example of a flow of neighboring pattern specifying processing.

An example of the flow of neighboring pattern specifying processing in this case will be described with reference to the flowchart of FIG. 34.

When neighboring pattern specifying processing is started, the neighboring pattern specifying unit 132 selects any of neighboring regions of a processing target region (any of voxels adjacent to a voxel to be processed) in step S501. The neighboring pattern specifying unit 132 appropriately executes processing of steps S502 to S507 for the neighboring region.

In step S502, the neighboring pattern specifying unit 132 determines whether or not the neighboring region selected in step S501 is positioned within the bounding box. If it is determined that the neighboring region is positioned within the bounding box, processing proceeds to step S503.

In steps S503 to S508, the same processing as steps S162 to S167 is executed. That is, neighboring patterns are specified by ternary representation.

If it is determined in step S502 that the neighboring region is positioned outside the bounding box, processing proceeds to step S505. That is, in this case, the neighboring region is classified as a value "0" indicating that the neighboring region does not include points (sets the value "0" for the neighboring region). As described above, the neighboring pattern specifying unit 132 can specify neighboring patterns and distinguish between a case in which neighboring voxels are positioned within a bounding box and a case in which the neighboring voxels are positioned in another look-ahead cube by ternary representation by executing neighboring pattern specifying processing. Accordingly, it is possible to apply a context more suitable for actual neighboring patterns as described above in <Identification outside bounding box> and the like of <1. Ternary representation of neighboring patterns>.

Neighboring pattern specifying processing executed by the neighboring pattern specifying unit 233 is the same as that executed by the neighboring pattern specifying unit 132, and thus description thereof will be omitted.

5. Supplement

<Computer>

A series of processing described above can be executed by hardware or software. In the case where the series of processing is executed by software, a program that configures the software is installed on a computer. Here, the computer includes, for example, a computer built in dedicated hardware and a general-purpose personal computer on which various programs are installed to be able to execute various functions.

Figure 35:
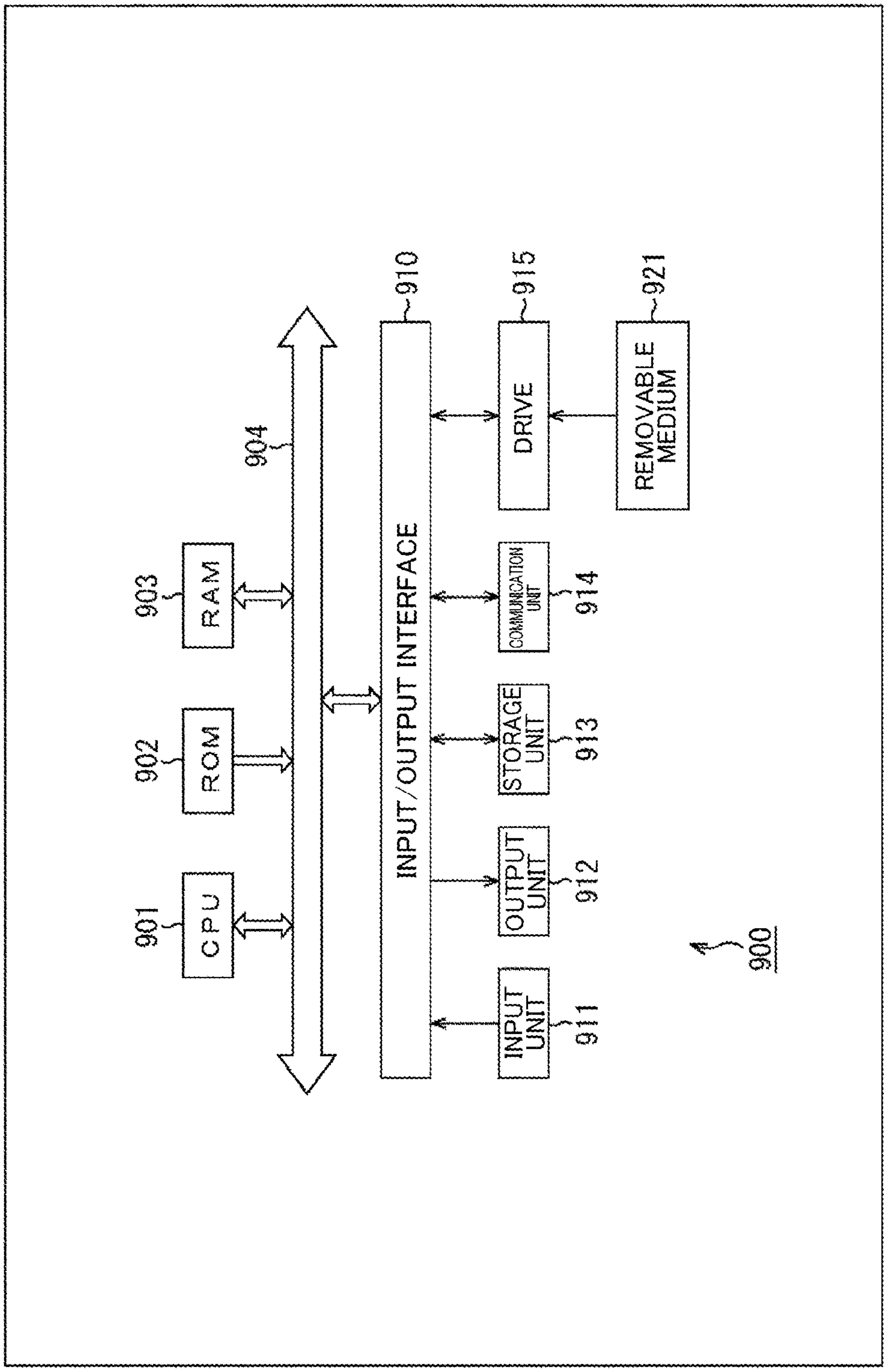
FIG. 35 is a block diagram showing an example of major components of a computer.

FIG. 35 is a block diagram illustrating an example of hardware configuration of a computer that executes the series of processing described above according to a program.

In a computer 900 illustrated in FIG. 35, a central processing unit (CPU) 901, a read only memory (ROM) 902, and a random access memory (RAM) 903 are connected to each other via a bus 904.

An input/output interface 910 is also connected to the bus 904. An input unit 911, an output unit 912, a storage unit 913, a communication unit 914, and a drive 915 are connected to the input/output interface 910.

The input unit 911 includes, for example, a keyboard, a mouse, a microphone, a touch panel, an input terminal, and the like. The output unit 912 includes, for example, a display, a speaker, an output terminal, and the like. The storage unit 913 includes, for example, a hard disk, a RAM disk, a non-volatile memory, and the like. The communication unit 914 includes, for example, a network interface. The drive 915 drives a removable medium 921 such as a magnetic disk, an optical disc, a magneto-optical disk, or a semiconductor memory.

In the computer configured as above, for example, the CPU 901 performs the above-described series of multiple steps of processing by loading a program stored in the storage unit 913 to the RAM 903 via the input/output interface 910 and the bus 904 and executing the program. Data and the like necessary for the CPU 901 to execute various kinds of processing are also appropriately stored in the RAM 903.

The program executed by the computer can be recorded on, for example, the removable medium 921 as a package medium or the like so as to be applied. In such a case, the program can be installed in the storage unit 913 via the input/output interface 910 by inserting the removable medium 921 into the drive 915.

Further, the program may also be provided via a wired or wireless transmission medium such as a local area network, the Internet, or digital satellite broadcasting. In such a case, the program can be received by the communication unit 914 and installed in the storage unit 913.

In addition, this program can be installed in advance in the ROM 902 or the storage unit 913.

<Application Target of Present Technology>

Although cases in which the present technology is applied to coding/decoding of point cloud data have been described above, the present technology is not limited to such examples and can be applied to coding/decoding of 3D data in any standard. That is, various types of processing such as coding/decoding methods, and specifications of various types of data such as 3D data and metadata may be arbitrary as long as they does not contradict the above-described present technology. In addition, the above-described some processing and specifications may be omitted as long as it does not contradict the present technology.

Moreover, although the coding device 100 and the decoding device 200 have been described above as examples to which the present technology is applied, the present technology can be applied to any configuration.

For example, the present technology can be applied to various electronic apparatuses such as transmitters and receivers (e.g., television receivers and cellular phones) in satellite broadcasting, wired broadcasting such as cable TV, transmission on the Internet, transmission to terminals according to cellular communication, and the like, or devices (e.g., hard disk recorders and cameras) that record images in media such as an optical disc, a magnetic disk, and a flash memory or reproduce images from these storage media.

Furthermore, for example, the present technology can also be implemented as a part of components of a device, such as a processor (e.g., a video processor) serving as a system large scale integration (LSI) circuit or the like, a module (e.g., a video module) using a plurality of processors and the like, a unit (e.g., a video unit) using a plurality of modules and the like, or a set (e.g., a video set) of units having additional other functions.

In addition, the present technology can also be applied to, for example, a network system composed of a plurality of devices. For example, the present technology can be implemented as cloud computing in which a function is shared and processed in common by a plurality of devices via a network. For example, the present technology may also be implemented in a cloud service that provides services with respect to images (moving images) to any terminals such as a computer, an audio visual (AV) apparatus, a portable information processing terminal, an Internet of Things (IoT) device, and the like.

Meanwhile, in the present description, the system means a set of a plurality of components (devices, modules (parts), etc.), and it does not matter whether or not all the components are arranged in a single housing. Therefore, a plurality of devices housed in separate housings and connected via a network, and one device in which a plurality of modules are housed in one housing are both systems.

<Fields/Applications to which Present Technology is Applicable>

Systems, devices, processing units and the like to which the present technology is applied can be used, for example, in any field such as transportation, medical care, crime prevention, agriculture, livestock industry, mining, beauty, factories, home appliances, weather, and nature monitoring. In addition, applications thereof are arbitrary.

<Others>

Meanwhile, in the present description, "flag" is information for identifying a plurality of states and includes not only information used to identify two states of true (1) and false (0) but also information capable of identifying three or more states. Accordingly, this "flag" can have not only two values of I/O but also three or more values. That is, the number of bits constituting this "flag" is arbitrary and it may be 1 bit or a plurality of bits. In addition, identification information (also including a flag) is assumed to have not only a form in which the identification information is included in a bitstream but also a form in which difference information of the identification information with respect to certain reference information is included in a bitstream, and thus "flag" and "identification information" includes only the information itself but also difference information with respect to reference information in the present description.

Furthermore, various types of information (metadata and the like) about coded data (bitstreams) may be transmitted or recorded in any form as long as they are associated with the coded data. Here, the term "associate" means, for example, making other data available (linkable) when one piece of data is processed. That is, associated data may be collected as one piece of data or may be individual data. For example, information associated with coded data (image) may be transmitted on a transmission path different from that for the coded data (image). Further, for example, information associated with coded data (image) may be recorded on a recording medium (or another recording area of the same recording medium) different from that for the coded data (image). Meanwhile, this "association" may be for part of data, not the entire data. For example, an image and information corresponding to the image may be associated with each other in an arbitrary unit such as a plurality of frames, one frame, or a part within a frame.

Meanwhile, in the present description, the terms "compose", "multiplex", "add", "integrate", "include", "store", "put in", "introduce", "insert", and the like mean combining a plurality of things into one, for example, combining coded data and metadata into one piece of data and means a method of the aforementioned "association".

In addition, embodiments of the present technology are not limited to the above-described embodiments, and various modifications can be made without departing from the gist of the present technology.

For example, a configuration described as one device (or one processing unit) may be divided to be configured as a plurality of devices (or processing units). Conversely, a configuration described as a plurality of devices (or processing units) in the above description may be collectively configured as one device (or one processing unit). Further, it goes without saying that components other than those described above may be added to the configuration of each device (or each processing unit). Furthermore, a part of the configuration of one device (or one processing unit) may be included in the configuration of another device (or another processing unit) as long as the configuration or operation of the entire system is substantially the same.

Further, for example, the program described above may be executed in any device. In such a case, the device may have necessary functions (functional blocks and the like) to be able to obtain necessary information.

Further, for example, respective steps of a flowchart may be executed by one device or by a plurality of devices in a shared manner. Furthermore, in a case where a plurality of kinds of processing are included in a single step, the plurality of kinds of processing may be executed by one device or by a plurality of devices in a shared manner. In other words, a plurality of kinds of processing included in a single step may be executed as processing for a plurality of steps. Conversely, processing described as a plurality of steps may be collectively executed as a single step.

In addition, for example, a program executed by a computer may be executed such that processing steps describing the program are executed in chronological order according to the order described in the present description or are executed in parallel or individually at a necessary timing such as in response to a call. That is, as long as no contradiction arises, each processing step may be executed in an order different from the order described above. Furthermore, the kinds of processing of steps describing the program may be executed in parallel with the processing of another program or may be executed in combination with the processing of the other program.

In addition, for example, a plurality of technologies with respect to the present technology can be implemented independently alone as long as no contradiction arises, for example. It goes without saying that any number of the present technologies can also be implemented in parallel. For example, part or all of the present technology described in any of the embodiments may be implemented in combination with part or all of the present technology described in the other embodiments. Further, part or all of the above-described present technology may be implemented in combination with other technologies not described above.

Meanwhile, the present technology can also take the following configurations.

(1) An information processing device including, on the basis of position information representing positions of points of a point cloud that represents an object in a three-dimensional shape as a set of points in units of first regions that are three-dimensional regions that divide an entire area corresponding to a three-dimensional area including the object into a plurality of regions, for each second region that is a three-dimensional region composed of a plurality of the first regions, a neighboring pattern specifying unit that identifies whether or not each neighboring region that is the first region adjacent to a processing target region that is the first region to be processed includes points or is positioned outside the second region including the processing target region and specifies a neighboring pattern that is a pattern of an identification result of each neighboring region, for each of the first regions including the points, a context selection unit that selects a context according to the neighboring pattern specified by the neighboring pattern specifying unit with respect to each of the first regions including the points, and a coding unit that codes the position information for each of the first regions using the context selected by the context selection unit to generate coded data of the position information.

(2) The information processing device according to (1), wherein the first regions are rectangular, and the neighboring regions are the first regions adjacent to six faces of the processing target region.

(3) The information processing device according to (1) or (2), wherein the position information has a tree structure, and the neighboring pattern specifying unit specifies the neighboring pattern of each first region including the points for each layer of the tree structure.

(4) The information processing device according to (3), wherein the entire area is a bounding box, the first region is a voxel, and the tree structure is an octree.

(5) The information processing device according to any one of (1) to (4), further including a bitstream generation unit that generates a bitstream including coded data of the position information generated by the coding unit.

(6) The information processing device according to (5), further including a generation unit that generates control information for controlling specifying of the neighboring pattern by the neighboring pattern specifying unit, wherein the bitstream generation unit generates a bitstream including the control information generated by the generation unit.

(7) The information processing device according to any one of (1) to (6), wherein the neighboring pattern specifying unit identifies whether or not each of the neighboring regions includes the points or is positioned outside the second region including the processing target region to specify the neighboring pattern if the processing target region is the first region adjacent to a boundary of the second region, and identifies whether or not each of the neighboring regions includes the points to specify the neighboring pattern if the processing target region is the first region that is not adjacent to a boundary of the second region.

(8) The information processing device according to any one of (1) to (6), wherein the neighboring pattern specifying unit identifies whether or not each of the neighboring regions includes the points or is positioned outside the second region including the processing target region to specify the neighboring pattern if the processing target region is the first region adjacent to a corner of the second region, and identifies whether or not each of the neighboring regions includes the points to specify the neighboring pattern if the processing target region is the first region that is not adjacent to a corner of the second region.

(9) The information processing device according to any one of (1) to (8), wherein the neighboring pattern specifying unit further regards the neighboring region positioned outside the entire area as the first region that does not include the points and specifies the neighboring pattern.

(10) An information processing method including, on the basis of position information representing positions of points of a point cloud that represents an object in a three-dimensional shape as a set of points in units of first regions that are three-dimensional regions that divide an entire area corresponding to a three-dimensional area including the object into a plurality of regions, for each second region that is a three-dimensional region composed of a plurality of the first regions, identifying whether or not each neighboring region that is the first region adjacent to a processing target region that is the first region to be processed includes points or is positioned outside the second region including the processing target region and specifying a neighboring pattern that is a pattern of an identification result of each neighboring region, for each of the first regions including the points, selecting a context according to the specified neighboring pattern with respect to each of the first regions including the points, and coding the position information for each of the first regions using the selected context to generate coded data of the position information.

(11) An information processing device including, on the basis of a decoding result of coded data of position information representing positions of points of a point cloud that represents an object in a three-dimensional shape as a set of points in units of first regions that are three-dimensional regions that divide an entire area corresponding to a three-dimensional area including the object into a plurality of regions, for each second region that is a three-dimensional region composed of a plurality of the first regions, a neighboring pattern specifying unit that identifies whether or not each neighboring region that is the first region adjacent to a processing target region that is the first region to be processed includes points or is positioned outside the second region including the processing target region and specifies a neighboring pattern that is a pattern of an identification result of each neighboring region, for each of the first regions including the points, a context selection unit that selects a context according to the neighboring pattern specified by the neighboring pattern specifying unit with respect to each of the first regions including the points, and a decoding unit that decodes the coded data using the context selected by the context selection unit to generate the position information.

(12) The information processing device according to (11), wherein the first regions are rectangular, and the neighboring regions are the first regions adjacent to six faces of the processing target region.

(13) The information processing device according to (11) or (12), further including a hierarchization unit that hierarchizes the position information generated by the decoding unit to generate position information having a tree structure, wherein the neighboring pattern specifying unit specifies the neighboring pattern of each first region including the points for each layer of the tree structure.

(14) The information processing device according to (13), wherein the entire area is a bounding box, the first region is a voxel, and the position information having the tree structure is an octree.

(15) The information processing device according to (14), further including a generation unit that generates position information representing the position of each point in coordinates using the octree generated by the hierarchization unit.

(16) The information processing device according to any one of (11) to (15), wherein the neighboring pattern specifying unit identifies whether or not each of the neighboring regions includes the points or is positioned outside the second region including the processing target region to specify the neighboring pattern if the processing target region is the first region adjacent to a boundary of the second region, and identifies whether or not each of the neighboring regions includes the points to specify the neighboring pattern if the processing target region is the first region that is not adjacent to a boundary of the second region.

(17) The information processing device according to any one of (11) to (15), wherein the neighboring pattern specifying unit identifies whether or not each of the neighboring regions includes the points or is positioned outside the second region including the processing target region to specify the neighboring pattern if the processing target region is the first region adjacent to a corner of the second region, and identifies whether or not each of the neighboring regions includes the points to specify the neighboring pattern if the processing target region is the first region that is not adjacent to a corner of the second region.

(18) The information processing device according to any one of (11) to (17), wherein the neighboring pattern specifying unit specifies the neighboring pattern according to control information for controlling specifying of the neighboring pattern included in a bitstream including the coded data.

(19) The information processing device according to any one of (11) to (18), wherein the neighboring pattern specifying unit further regards the neighboring region positioned outside the entire area as the first region that does not include the points and specifies the neighboring pattern.

(20) An information processing method including, on the basis of a decoding result of coded data of position information representing positions of points of a point cloud that represents an object in a three-dimensional shape as a set of points in units of first regions that are three-dimensional regions that divide an entire area corresponding to a three-dimensional area including the object into a plurality of regions, for each second region that is a three-dimensional region composed of a plurality of the first regions, identifying whether or not each neighboring region that is the first region adjacent to a processing target region that is the first region to be processed includes points or is positioned outside the second region including the processing target region and specifying a neighboring pattern that is a pattern of an identification result of each neighboring region, for each of the first regions including the points, selecting a context according to the specified neighboring pattern with respect to each of the first regions including the points, and decoding the coded data using the selected context to generate the position information.

REFERENCE SIGNS LIST

100 Coding device
101 Geometry coding unit
102 Geometry decoding unit
103 Point cloud generation unit
104 Attribute coding unit
105 Bitstream generation unit
121 Bounding box setting unit
122 Voxel setting unit
123 Octree generation unit
124 Octree coding unit
131 Octree acquisition unit
132 Neighboring pattern specifying unit
133 Context selection unit
134 Arithmetic coding unit
200 Decoding device
201 Geometry decoding unit
202 Attribute decoding unit
203 Point cloud generation unit
221 Octree decoding unit
222 Geometry data generation unit
231 Arithmetic decoding unit
232 Octree construction unit
233 Neighboring pattern specifying unit
234 Context selection unit
401 Octree coding control unit
421 Octree decoding control unit

The invention claimed is:

1. An information processing device comprising:

a neighboring pattern specifying unit that, on the basis of position information representing positions of points of a point cloud that represents an object in a three-dimensional shape as a set of points in units of first regions that are three-dimensional regions that divide an entire area corresponding to a three-dimensional area including the object into a plurality of regions, and for each second region that is a three-dimensional region composed of a plurality of the first regions, is configured to identify whether or not each neighboring region that is the first region adjacent to a processing target region that is the first region to be processed includes points or is positioned outside the second region including the processing target region, and specify a neighboring pattern that is a pattern of an identification result of each neighboring region, for each of the first regions that have been identified to include the points;

a context selection unit that is configured to select a context according to the neighboring pattern specified by the neighboring pattern specifying unit with respect to each of the first regions including the points; and a coding unit that is configured to code the position information for each of the first regions using the context selected by the context selection unit to generate coded data of the position information, wherein the neighboring pattern specifying unit, the context selection unit, and the coding unit are each implemented via at least one processor.

2. The information processing device according to claim 1, wherein the first regions are rectangular, and the neighboring regions are the first regions adjacent to six faces of the processing target region.

3. The information processing device according to claim 1, wherein the position information has a tree structure, wherein the neighboring pattern specifying unit specifies the neighboring pattern of each first region including the points for each layer of the tree structure.

4. The information processing device according to claim 3, wherein the entire area is a bounding box, the first regions are voxels, and the tree structure is an octree.

5. The information processing device according to claim 1, further comprising a bitstream generation unit that generates a bitstream including coded data of the position information generated by the coding unit, wherein the bitstream generation unit is implemented via at least one processor.

6. The information processing device according to claim 5, further comprising a generation unit that generates control information for controlling specifying of the neighboring pattern by the neighboring pattern specifying unit, wherein the bitstream generation unit generates a bitstream including the control information generated by the generation unit, and wherein the generation unit is implemented via at least one processor.

7. The information processing device according to claim 1, wherein the neighboring pattern specifying unit identifies whether or not each of the neighboring regions includes the points or is positioned outside the second region including the processing target region to specify the neighboring pattern if the processing target region is the first region adjacent to a boundary of the second region, and identifies whether or not each of the neighboring regions includes the points to specify the neighboring pattern if the processing target region is the first region that is not adjacent to a boundary of the second region.

8. The information processing device according to claim 1, wherein the neighboring pattern specifying unit identifies whether or not each of the neighboring regions includes the points or is positioned outside the second region including the processing target region to specify the neighboring pattern if the processing target region is the first region adjacent to a corner of the second region, and identifies whether or not each of the neighboring regions includes the points to specify the neighboring pattern if the processing target region is the first region that is not adjacent to a corner of the second region.

9. The information processing device according to claim 1, wherein the neighboring pattern specifying unit further regards the neighboring region positioned outside the entire area as the first region that does not include the points and specifies the neighboring pattern.

10. An information processing method comprising:

identifying, on the basis of position information representing positions of points of a point cloud that represents an object in a three-dimensional shape as a set of points in units of first regions that are three-dimensional regions that divide an entire area corresponding to a three-dimensional area including the object into a plurality of regions, and for each second region that is a three-dimensional region composed of a plurality of the first regions, whether or not each neighboring region that is the first region adjacent to a processing target region that is the first region to be processed includes points or is positioned outside the second region including the processing target region;

specifying a neighboring pattern that is a pattern of an identification result of each neighboring region, for each of the first regions that have been identified to include the points;

selecting a context according to the specified neighboring pattern with respect to each of the first regions including the points; and coding the position information for each of the first regions using the selected context to generate coded data of the position information.

11. An information processing device comprising:

a neighboring pattern specifying unit that, on the basis of a decoding result of coded data of position information representing positions of points of a point cloud that represents an object in a three-dimensional shape as a set of points in units of first regions that are three-dimensional regions that divide an entire area corresponding to a three-dimensional area including the object into a plurality of regions, and for each second region that is a three-dimensional region composed of a plurality of the first regions, is configured to identify whether or not each neighboring region that is the first region adjacent to a processing target region that is the first region to be processed includes points or is positioned outside the second region including the processing target region, and specify a neighboring pattern that is a pattern of an identification result of each neighboring region, for each of the first regions that have been identified to include the points;

a context selection unit that is configured to select a context according to the neighboring pattern specified by the neighboring pattern specifying unit with respect to each of the first regions including the points; and a decoding unit that is configured to decode the coded data using the context selected by the context selection unit to generate the position information, wherein the neighboring pattern specifying unit, the context selection unit, and the decoding unit are each implemented via at least one processor.

12. The information processing device according to claim 11, wherein the first regions are rectangular, and the neighboring regions are the first regions adjacent to six faces of the processing target region.

13. The information processing device according to claim 11, further comprising a hierarchization unit that hierarchizes the position information generated by the decoding unit to generate position information having a tree structure, wherein the neighboring pattern specifying unit specifies the neighboring pattern of each first region including the points for each layer of the tree structure, and wherein the hierarchization unit is implemented via at least one processor.

14. The information processing device according to claim 13, wherein the entire area is a bounding box, the first regions are voxels, and the position information having the tree structure is an octree.

15. The information processing device according to claim 14, further comprising a generation unit that generates position information representing the position of each point in coordinates using the octree generated by the hierarchization unit, wherein the generation unit is implemented via at least one processor.

16. The information processing device according to claim 11, wherein the neighboring pattern specifying unit identifies whether or not each of the neighboring regions includes the points or is positioned outside the second region including the processing target region to specify the neighboring pattern if the processing target region is the first region adjacent to a boundary of the second region, and identifies whether or not each of the neighboring regions includes the points to specify the neighboring pattern if the processing target region is the first region that is not adjacent to a boundary of the second region.

17. The information processing device according to claim 11, wherein the neighboring pattern specifying unit identifies whether or not each of the neighboring regions includes the points or is positioned outside the second region including the processing target region to specify the neighboring pattern if the processing target region is the first region adjacent to a corner of the second region, and identifies whether or not each of the neighboring regions includes the points to specify the neighboring pattern if the processing target region is the first region that is not adjacent to a corner of the second region.

18. The information processing device according to claim 11, wherein the neighboring pattern specifying unit specifies the neighboring pattern according to control information for controlling specifying of the neighboring pattern included in a bitstream including the coded data.

19. The information processing device according to claim 11, wherein the neighboring pattern specifying unit further regards the neighboring region positioned outside the entire area as the first region that does not include the points and specifies the neighboring pattern.

20. An information processing method comprising:

identifying, on the basis of a decoding result of coded data of position information representing positions of points of a point cloud that represents an object in a three-dimensional shape as a set of points in units of first regions that are three-dimensional regions that divide an entire area corresponding to a three-dimensional area including the object into a plurality of regions, and for each second region that is a three-dimensional region composed of a plurality of the first regions, whether or not each neighboring region that is the first region adjacent to a processing target region that is the first region to be processed includes points or is positioned outside the second region including the processing target region;

specifying a neighboring pattern that is a pattern of an identification result of each neighboring region, for each of the first regions that have been identified to include the points;

selecting a context according to the specified neighboring pattern with respect to each of the first regions including the points; and decoding the coded data using the selected context to generate the position information.

* * * * *